(12) United States Patent (10) Patent No.: US 12,579,186 B1

Tenbuuren et al. (45) Date of Patent: Mar. 17, 2026

(54) SYSTEMS AND METHODS FOR IMAGE-BASED NETWORK OPERATIONS

(71) Applicant: DK Crown Holdings Inc., Boston, MA (US)

(72) Inventors: Aaron Tenbuuren, Jamaica Plain, MA (US); Sam MacGinty, Boston, MA (US)

(73) Assignee: DK Crown Holdings Inc., Boston, MA (US)

( * ) Notice: Subject to any disclaimer, the term of this patent is extended or adjusted under 35 U.S.C. 154(b) by 0 days.

(21) Appl. No.: 19/219,493

(22) Filed: May 27, 2025

(51) Int. Cl.
| | |
|---|---|
| *G06F 16/583* | (2019.01) |
| *G06F 16/535* | (2019.01) |
| *G06F 16/538* | (2019.01) |
| *G06V 10/764* | (2022.01) |
| *G06V 30/10* | (2022.01) |

(52) U.S. Cl.
CPC .......... *G06F 16/583* (2019.01); *G06F 16/535* (2019.01); *G06F 16/538* (2019.01); *G06V 10/764* (2022.01); *G06V 30/10* (2022.01); *G06V 2201/07* (2022.01)

(58) Field of Classification Search
None
See application file for complete search history.

(56) References Cited

U.S. PATENT DOCUMENTS

| | | | |
|---|---|---|---|
| 2019/0318405 A1* | 10/2019 | Hu | .......... G06V 10/82 |
| 2020/0301965 A1* | 9/2020 | Cormican | ............. G06F 16/735 |
| 2022/0292135 A1* | 9/2022 | Fleischman | ......... G06F 3/04842 |
| 2024/0220534 A1* | 7/2024 | Meany | .................... G06F 16/55 |
| 2024/0256592 A1* | 8/2024 | O'Neill | ................. G06F 16/435 |

FOREIGN PATENT DOCUMENTS

| | | | | |
|---|---|---|---|---|
| CN | 107315812 A | * 11/2017 | ............. | G06F 18/22 |

* cited by examiner

*Primary Examiner* — Bernard Krasnic
(74) *Attorney, Agent, or Firm* — Foley & Lardner LLP

(57) ABSTRACT

Systems and methods for image-based network operations are disclosed. A system can receive image data from a capture device, the image data comprising a plurality of pixels representing an environment. The system can generate a set of values from the plurality of pixels, each value representative of an attribute or category associated with one of a plurality of live events. The system can filter the set of values by matching a subset of the set of values to one or more predetermined values. The system can execute a search operation according to at least one value of the subset to generate a set of search results comprising a plurality of content items, each content item corresponding to a respective live event. The system can update a graphical user interface to present at least a subset of the plurality of content items.

16 Claims, 13 Drawing Sheets

400

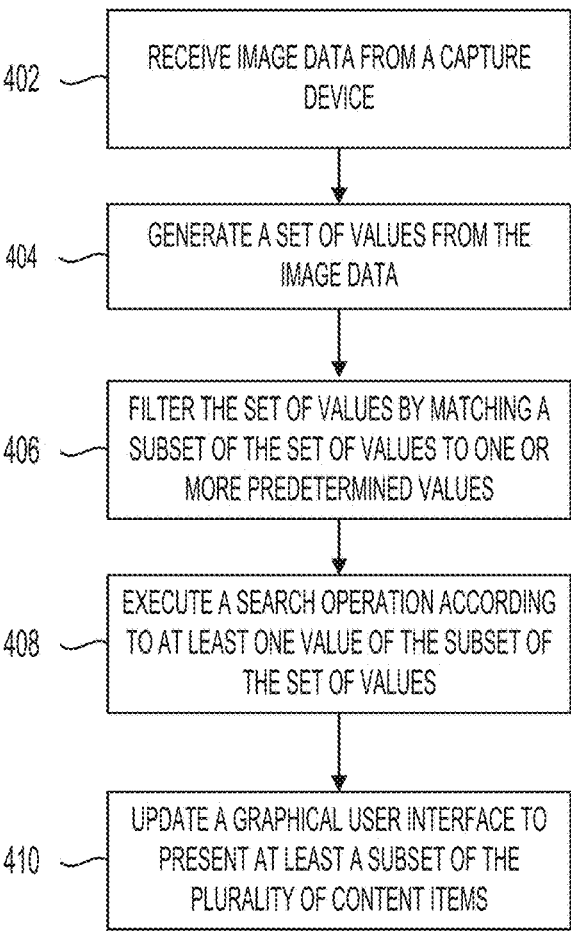

402   RECEIVE IMAGE DATA FROM A CAPTURE DEVICE

404   GENERATE A SET OF VALUES FROM THE IMAGE DATA

406   FILTER THE SET OF VALUES BY MATCHING A SUBSET OF THE SET OF VALUES TO ONE OR MORE PREDETERMINED VALUES

408   EXECUTE A SEARCH OPERATION ACCORDING TO AT LEAST ONE VALUE OF THE SUBSET OF THE SET OF VALUES

410   UPDATE A GRAPHICAL USER INTERFACE TO PRESENT AT LEAST A SUBSET OF THE PLURALITY OF CONTENT ITEMS

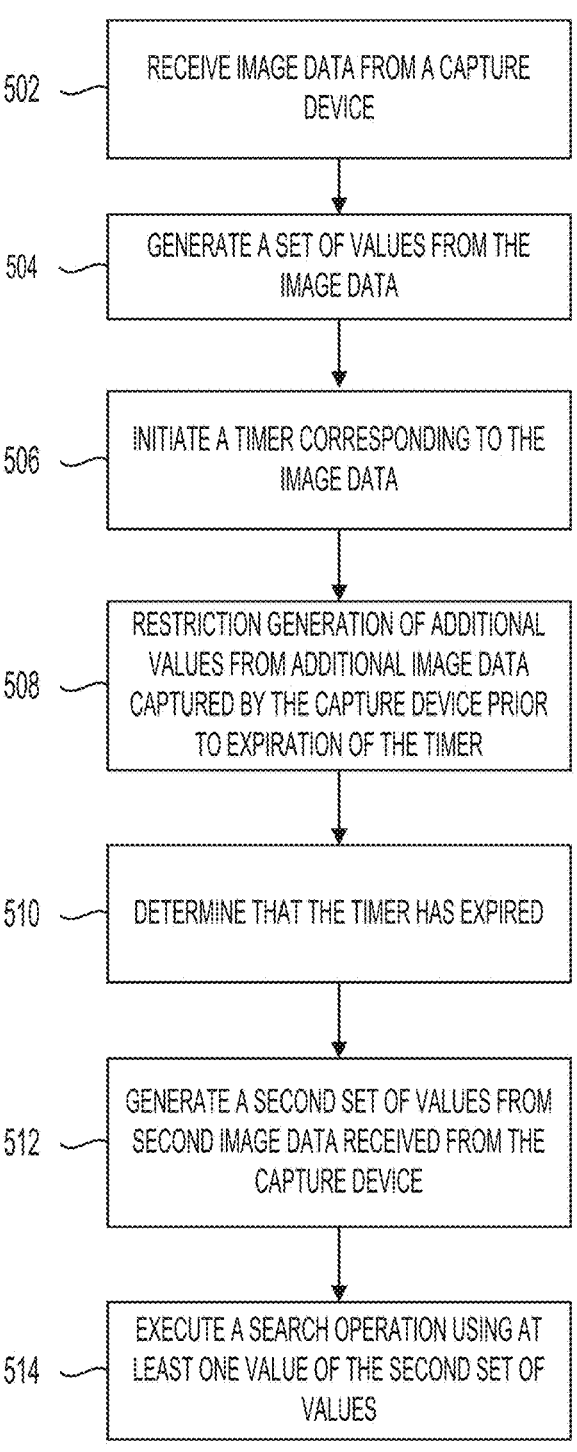

502   RECEIVE IMAGE DATA FROM A CAPTURE DEVICE

504   GENERATE A SET OF VALUES FROM THE IMAGE DATA

506   INITIATE A TIMER CORRESPONDING TO THE IMAGE DATA

508   RESTRICTION GENERATION OF ADDITIONAL VALUES FROM ADDITIONAL IMAGE DATA CAPTURED BY THE CAPTURE DEVICE PRIOR TO EXPIRATION OF THE TIMER

510   DETERMINE THAT THE TIMER HAS EXPIRED

512   GENERATE A SECOND SET OF VALUES FROM SECOND IMAGE DATA RECEIVED FROM THE CAPTURE DEVICE

514   EXECUTE A SEARCH OPERATION USING AT LEAST ONE VALUE OF THE SECOND SET OF VALUES

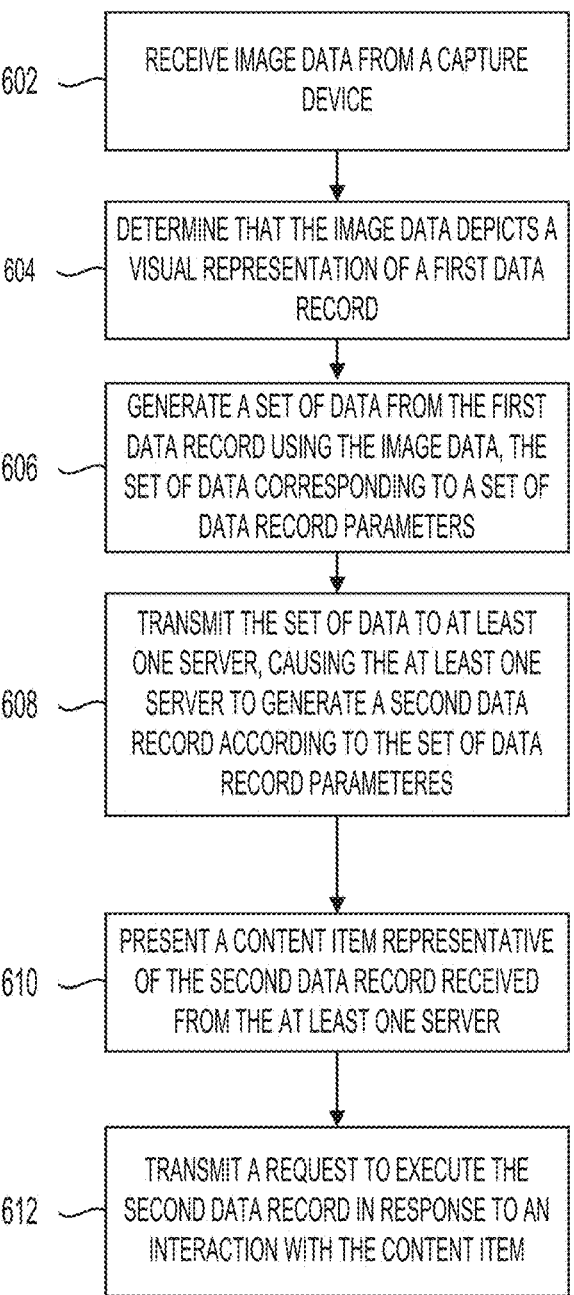

602 — RECEIVE IMAGE DATA FROM A CAPTURE DEVICE

604 — DETERMINE THAT THE IMAGE DATA DEPICTS A VISUAL REPRESENTATION OF A FIRST DATA RECORD

606 — GENERATE A SET OF DATA FROM THE FIRST DATA RECORD USING THE IMAGE DATA, THE SET OF DATA CORRESPONDING TO A SET OF DATA RECORD PARAMETERS

608 — TRANSMIT THE SET OF DATA TO AT LEAST ONE SERVER, CAUSING THE AT LEAST ONE SERVER TO GENERATE A SECOND DATA RECORD ACCORDING TO THE SET OF DATA RECORD PARAMETERES

610 — PRESENT A CONTENT ITEM REPRESENTATIVE OF THE SECOND DATA RECORD RECEIVED FROM THE AT LEAST ONE SERVER

612 — TRANSMIT A REQUEST TO EXECUTE THE SECOND DATA RECORD IN RESPONSE TO AN INTERACTION WITH THE CONTENT ITEM

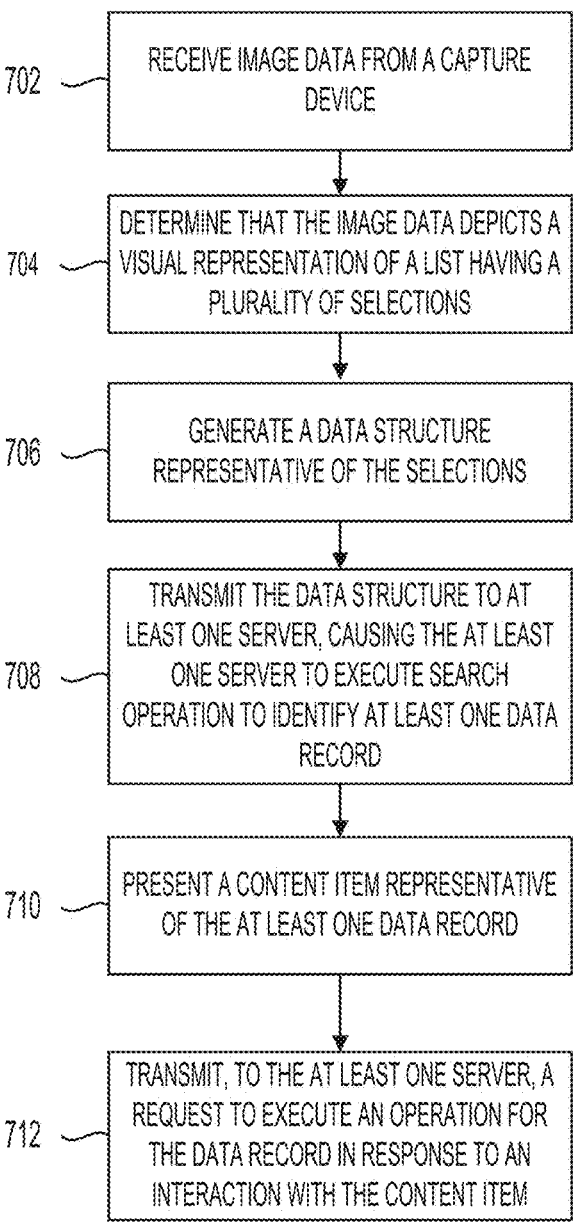

702 — RECEIVE IMAGE DATA FROM A CAPTURE DEVICE

704 — DETERMINE THAT THE IMAGE DATA DEPICTS A VISUAL REPRESENTATION OF A LIST HAVING A PLURALITY OF SELECTIONS

706 — GENERATE A DATA STRUCTURE REPRESENTATIVE OF THE SELECTIONS

708 — TRANSMIT THE DATA STRUCTURE TO AT LEAST ONE SERVER, CAUSING THE AT LEAST ONE SERVER TO EXECUTE SEARCH OPERATION TO IDENTIFY AT LEAST ONE DATA RECORD

710 — PRESENT A CONTENT ITEM REPRESENTATIVE OF THE AT LEAST ONE DATA RECORD

712 — TRANSMIT, TO THE AT LEAST ONE SERVER, A REQUEST TO EXECUTE AN OPERATION FOR THE DATA RECORD IN RESPONSE TO AN INTERACTION WITH THE CONTENT ITEM

SYSTEMS AND METHODS FOR IMAGE-BASED NETWORK OPERATIONS

BACKGROUND

Providing synchronized information is useful for networked computing environments including multiple computing systems. Information can be shared using different formats or protocols. It is challenging to provide synchronized information efficiently in computing systems via computer networks having different types of computing devices.

SUMMARY

At least one aspect relates to a system. The system can include one or more processors coupled to non-transitory memory. The system can receive image data from a capture device, the image data comprising a plurality of pixels representing an environment. The system can generate a set of values from the plurality of pixels of the image data, each value of the set of values representative of an attribute or category associated with one of a plurality of live events. The system can filter the set of values by matching a subset of the set of values to one or more predetermined values. The system can execute a search operation according to at least one value of the subset of the set of values to generate a set of search results comprising a plurality of content items, each content item of the plurality of content items corresponding to a respective live event of the plurality of live events. The system can update a graphical user interface to present at least a subset of the plurality of content items.

In some implementations, the system can generate the set of values by providing at least a subset of the plurality of pixels of the image data as input to a machine-learning model. In some implementations, the machine-learning model is an optical character recognition model. In some implementations, the machine-learning model is an object detection model configured to generate a classification of at least one object represented in the plurality of pixels, wherein at least one of the set of values corresponds to the classification. In some implementations, the machine-learning model comprises a multi-modal language model configured to generate at least one token as output using at least the plurality of pixels as input, wherein the set of values is generated based at least on the token.

In some implementations, the system can receive an update to the one or more predetermined values from at least one server. In some implementations, the system can detect an interaction with a first graphical element representing a first search result of the set of search results. In some implementations, the system can transmit, to at least one server, a request to generate a data record corresponding to the first search result. In some implementations, the system can update the graphical user interface to indicate at least one of the set of values upon determining that a first feature is represented in a set of images captured using the capture device over a predetermined time period. In some implementations, the system can execute the search operation upon determining that the first feature is represented in the set of images over the predetermined time period. In some implementations, the system can update the graphical user interface to present the set of values with the image data captured by the capture device.

At least one other aspect relates to a method. The method can be performed, for example, by one or more processors coupled to non-transitory memory. The method can include receiving image data from a capture device, the image data comprising a plurality of pixels representing an environment. The method can include generating a set of values from the plurality of pixels of the image data, each value of the set of values representative of an attribute or category associated with one of a plurality of live events. The method can include filtering the set of values by matching a subset of the set of values to one or more predetermined values. The method can include executing a search operation according to at least one value of the subset of the set of values to generate a set of search results comprising a plurality of content items, each content item of the plurality of content items corresponding to a respective live event of the plurality of live events. The method can include updating a graphical user interface to present at least a subset of the plurality of content items.

In some implementations, the method can include generating the set of values by providing at least a subset of the plurality of pixels of the image data as input to a machine-learning model. In some implementations, the machine-learning model is an optical character recognition model. In some implementations, the machine-learning model is an object detection model configured to generate a classification of at least one object represented in the plurality of pixels, wherein at least one of the set of values corresponds to the classification. In some implementations, the machine-learning model comprises a multi-modal language model configured to generate at least one token as output using at least the plurality of pixels as input, wherein the set of values is generated based at least on the token.

In some implementations, the method can include receiving an update to the one or more predetermined values from at least one server. In some implementations, the method can include detecting an interaction with a first graphical element representing a first search result of the set of search results. In some implementations, the method can include transmitting, to at least one server, a request to generate a data record corresponding to the first search result. In some implementations, the method can include updating the graphical user interface to indicate at least one of the set of values upon determining that a first feature is represented in a set of images captured using the capture device over a predetermined time period. In some implementations, the method can include executing the search operation upon determining that the first feature is represented in the set of images over the predetermined time period. In some implementations, the method can include updating the graphical user interface to present the set of values with the image data captured by the capture device.

At least one aspect relates to a system. The system can include one or more processors coupled to non-transitory memory. The system can receive first image data from a capture device, the first image data comprising a plurality of first pixels representing an environment. The system can generate a first set of values from the plurality of first pixels. The system can initiate a timer corresponding to the first image data. The system can restrict generation of additional values from additional image data captured by the capture device prior to expiration of the timer. The system can determine that the timer corresponding to the first image data has expired. The system can generate, responsive to determining that the timer has expired, a second set of values from a plurality of second pixels of second image data received from the capture device. The system can execute a search operation using at least one first value of the second set of values.

In some implementations, the system can update a graphical user interface to indicate the first set of values prior to expiration of the timer. In some implementations, the system can update the graphical user interface to indicate the second set of values following expiration of the timer. In some implementations, the system can execute the search operation in response to an interaction with a graphical element representing the at least one first value. In some implementations, the system can initiate a second timer corresponding to the second image data. In some implementations, the system can restrict generation of second additional values from second additional image data captured by the capture device prior to expiration of the timer. In some implementations, the system can present updated image data via a graphical user interface prior to expiration of the timer. In some implementations, the system can maintain presentation of the first set of values via a graphical user interface prior to expiration of the timer. In some implementations, the system can present a graphical indicator representative of a state of the timer via a graphical user interface. In some implementations, the system can rank the first set of values based on the plurality of first pixels of the first image data. In some implementations, the system can present the first set of values with the first image data via a graphical user interface. In some implementations, a duration of the timer is specified in one or more configuration settings.

At least one other aspect relates to a method. The method can be performed, for example, by one or more processors coupled to non-transitory memory. The method can include receiving first image data from a capture device, the first image data comprising a plurality of first pixels representing an environment. The method can include generating a first set of values from the plurality of first pixels. The method can include initiating a timer corresponding to the first image data. The method can include restricting generation of additional values from additional image data captured by the capture device prior to expiration of the timer. The method can include determining that the timer corresponding to the first image data has expired. The method can include generating, responsive to determining that the timer has expired, a second set of values from a plurality of second pixels of second image data received from the capture device. The method can include executing a search operation using at least one first value of the second set of values.

In some implementations, the method can include updating a graphical user interface to indicate the first set of values prior to expiration of the timer. In some implementations, the method can include updating the graphical user interface to indicate the second set of values following expiration of the timer. In some implementations, the method can include executing the search operation in response to an interaction with a graphical element representing the at least one first value. In some implementations, the method can include initiating a second timer corresponding to the second image data. In some implementations, the method can include restricting generation of second additional values from second additional image data captured by the capture device prior to expiration of the timer. In some implementations, the method can include presenting updated image data via a graphical user interface prior to expiration of the timer. In some implementations, the method can include maintaining presentation of the first set of values via a graphical user interface prior to expiration of the timer. In some implementations, the method can include presenting a graphical indicator representative of a state of the timer via a graphical user interface. In some implementations, the method can include ranking the first set of values based on the plurality of first pixels of the first image data. In some implementations, the method can include presenting the first set of values with the first image data via a graphical user interface. In some implementations, a duration of the timer is specified in one or more configuration settings.

At least one aspect relates to a system. The system can include one or more processors coupled to non-transitory memory. The system can receive image data from a capture device, where the first image data comprises a plurality of pixels. The system can determine that the plurality of pixels depict a visual representation of a first data record satisfying a predetermined criterion, where the first data record corresponds to a set of data record parameters. The system can generate a set of data from the first data record using at least a subset of the plurality of pixels of the image data corresponding to the visual representation, where the set of data is indicative of the set of data record parameters. The system can transmit the set of data to at least one server, causing the at least one server to identify a second data record according to the set of data record parameters. The system can present, via a graphical user interface, a content item representative of the second data record received from the at least one server. The system can transmit, to the at least one server, a request to execute the second data record in response to an interaction with the content item.

In some implementations, the system can receive a modification to at least a portion of the set of data. In some implementations, the system can update the set of data according to the modification prior to transmitting the set of data to the at least one server. In some implementations, the visual representation comprises a plurality of conditional events. In some implementations, the set of data comprises a set of values representative of a plurality of selections for the plurality of conditional events. In some implementations, the system can determine that the plurality of pixels depict the visual representation of the first data record satisfying the predetermined criterion in response to determining that the plurality of pixels corresponds to a classification associated with the predetermined criterion. In some implementations, the system can determine that the plurality of pixels depict the visual representation of the first data record satisfying the predetermined criterion using a machine-learning model. In some implementations, the machine-learning model comprises one or more of an optical character recognition (OCR) model, an object detection model, or a multi-modal language model. In some implementations, the first data record comprises a plurality of selections. In some implementations, the system can generate the set of data from the first data record using a machine-learning model. In some implementations, the system can transmit the set of data to the at least one server in a request to perform a search operation for one or more data records corresponding to the set of data. In some implementations, the request to execute the second data record comprises at least one additional data record parameter.

At least one other aspect relates to a method. The method can be performed, for example, by one or more processors coupled to non-transitory memory. The method can include receiving image data from a capture device, where the first image data comprises a plurality of pixels. The method can include determining that the plurality of pixels depict a visual representation of a first data record satisfying a predetermined criterion, where the first data record corresponds to a set of data record parameters. The method can include generating a set of data from the first data record using at least a subset of the plurality of pixels of the image data corresponding to the visual representation, where the set of data is indicative of the set of data record parameters. The method can include transmitting the set of data to at least one server, causing the at least one server to identify a second data record according to the set of data record parameters. The method can include presenting, via a graphical user interface, a content item representative of the second data record received from the at least one server. The method can include transmitting, to the at least one server, a request to execute the second data record in response to an interaction with the content item.

In some implementations, the method can include receiving a modification to at least a portion of the set of data. In some implementations, the method can include updating the set of data according to the modification prior to transmitting the set of data to the at least one server. In some implementations, the visual representation comprises a plurality of conditional events. In some implementations, the set of data comprises a set of values representative of a plurality of selections for the plurality of conditional events. In some implementations, the method can include determining that the plurality of pixels depict the visual representation of the first data record satisfying the predetermined criterion in response to determining that the plurality of pixels corresponds to a classification associated with the predetermined criterion. In some implementations, the method can include determining that the plurality of pixels depict the visual representation of the first data record satisfying the predetermined criterion using a machine-learning model. In some implementations, the machine-learning model comprises one or more of an optical character recognition (OCR) model, an object detection model, or a multi-modal language model. In some implementations, the first data record comprises a plurality of selections. In some implementations, the method can include generating the set of data from the first data record using a machine-learning model. In some implementations, the method can include transmitting the set of data to the at least one server in a request to perform a search operation for one or more data records corresponding to the set of data. In some implementations, the request to execute the second data record comprises at least one additional data record parameter.

At least one aspect relates to a system. The system can include one or more processors coupled to non-transitory memory. The system can receive image data from a capture device, the image data comprising a plurality of pixels. The system can determine that the plurality of pixels depict a visual representation of a list having a plurality of selections. The system can generate a data structure representative of the plurality of selections using at least a subset of the plurality of pixels corresponding to the visual representation of the list. The system can transmit the data structure to at least one server, causing the at least one server to execute a search operation to identify at least one data record using at least one selection of the plurality of selections of the list as at least part of a search query. The system can present, via a graphical user interface, a content item representative of the at least one data record that is received from the at least one server. The system can transmit, to the at least one server, a request to execute an operation for the at least one data record in response to an interaction with the content item.

In some implementations, the system can receive, from the at least one server, a plurality of content items respectively corresponding to the plurality of selections of the list. In some implementations, the system can present the plurality of selections via a graphical user interface. In some implementations, the system can receive an interaction with the graphical user interface. In some implementations, responsive to the interaction, the system can transmit a second data structure to the at least one server, causing the at least one server to generate a second list comprising at least one selection of the plurality of selections of the list.

In some implementations, the data structure causes the at least one server to map one or more attributes of the at least one selection to a plurality of data records to identify the at least one data record. In some implementations, the system can transmit the data structure to the at least one server in response to an interaction with an indication of the at least one selection presented via the graphical user interface. In some implementations, the list corresponds to a third-party computing system different from the at least one server.

In some implementations, the system can receive a modification to at least a portion of the data structure. In some implementations, the system can update the data structure according to the modification prior to transmitting the data structure to the at least one server. In some implementations, the system can generate the data structure using a machine-learning model. In some implementations, the machine-learning model comprises one or more of an OCR model, an object detection model, or a multimodal language model. In some implementations, the request to execute the operation for the at least one data record comprises at least one additional data record parameter.

At least one other aspect relates to a method. The method can be performed, for example, by one or more processors coupled to non-transitory memory. The method can include receiving image data from a capture device, the image data comprising a plurality of pixels. The method can include determining that the plurality of pixels depict a visual representation of a list having a plurality of selections. The method can include generating a data structure representative of the plurality of selections using at least a subset of the plurality of pixels corresponding to the visual representation of the list. The method can include transmitting the data structure to at least one server, causing the at least one server to execute a search operation to identify at least one data record using at least one selection of the plurality of selections of the list as at least part of a search query. The method can include presenting, via a graphical user interface, a content item representative of the at least one data record that is received from the at least one server. The method can include transmitting to the at least one server a request to execute an operation for the at least one data record in response to an interaction with the content item.

In some implementations, the method can include receiving from the at least one server a plurality of content items respectively corresponding to the plurality of selections of the list. In some implementations, the method can include presenting the plurality of selections via a graphical user interface. In some implementations, the method can include receiving an interaction with the graphical user interface. In some implementations, responsive to the interaction, the method can include transmitting a second data structure to the at least one server, causing the at least one server to generate a second list comprising at least one selection of the plurality of selections of the list.

In some implementations, the data structure causes the at least one server to map one or more attributes of the at least one selection to a plurality of data records to identify the at least one data record. In some implementations, the method can include transmitting the data structure to the at least one server in response to an interaction with an indication of the at least one selection presented via the graphical user interface. In some implementations, the list corresponds to a third-party computing system different from the at least one server.

In some implementations, the method can include receiving a modification to at least a portion of the data structure. In some implementations, the method can include updating the data structure according to the modification prior to transmitting the data structure to the at least one server. In some implementations, the method can include generating the data structure using a machine-learning model. In some implementations, the machine-learning model comprises one or more of an OCR model, an object detection model, or a multimodal language model. In some implementations, the request to execute the operation for the at least one data record comprises at least one additional data record parameter.

At least one aspect relates to a system. The system can include one or more processors coupled to non-transitory memory. The system can receive image data from a capture device, the image data comprising a plurality of pixels. The system can determine a context for the image data using the plurality of pixels. Responsive to determining that the context satisfies a context condition, the system can generate a set of attributes corresponding to the context. The system can transmit, to at least one server, a search request comprising the set of attributes corresponding to the context, the search request identifying a search category, causing the at least one server to map the set of attributes to at least one live event. The system can receive, from the at least one server, a set of data records in response to the search request, wherein the set of data records is selected according to the search category and the at least one live event. The system can present a set of content items representative of the set of data records via a graphical user interface.

In some implementations, the system can receive an interaction with a first content item of the set of content items. In some implementations, the system can transmit a request to the at least one server to generate a data record corresponding to the first content item in response to the interaction. In some implementations, the system can determine that the plurality of pixels depict the context satisfying the context condition based on the plurality of pixels depicting a broadcast of a live event. In some implementations, the system can generate the set of attributes to include at least an identifier of the live event. In some implementations, the system can classify the at least one live event using the plurality of pixels and a machine-learning model. In some implementations, the system can generate the set of attributes corresponding to the context in response to an interaction with the graphical user interface. In some implementations, the system can present a classification of the context via the graphical user interface prior to receiving the interaction. In some implementations, the set of attributes comprises one or more of location data, time data, or a classification of the context. In some implementations, the system can transmit, to the at least one server, a second search request for one or more lists or one or more selections. In some implementations, the system can receive, from the at least one server, the one or more lists or the one or more selections in response to the second search request. In some implementations, the system can generate the set of attributes to include an indication that the context corresponds to broadcast content.

At least one other aspect relates to a method. The method can be performed, for example, by one or more processors coupled to non-transitory memory. The method can include receiving image data from a capture device, the image data comprising a plurality of pixels. The method can include determining a context for the image data using the plurality of pixels. Responsive to determining that the context satisfies a context condition, the method can include generating a set of attributes corresponding to the context. The method can include transmitting, to at least one server, a search request comprising the set of attributes corresponding to the context, the search request identifying a search category, causing the at least one server to map the set of attributes to at least one live event. The method can include receiving, from the at least one server, a set of data records in response to the search request, wherein the set of data records is selected according to the search category and the at least one live event. The method can include presenting a set of content items representative of the set of data records via a graphical user interface.

In some implementations, the method can include receiving an interaction with a first content item of the set of content items. In some implementations, the method can include transmitting a request to the at least one server to generate a data record corresponding to the first content item in response to the interaction. In some implementations, the method can include determining that the plurality of pixels depict the context satisfying the context condition based on the plurality of pixels depicting a broadcast of a live event. In some implementations, the method can include generating the set of attributes to include at least an identifier of the live event. In some implementations, the method can include classifying the at least one live event using the plurality of pixels and a machine-learning model. In some implementations, the method can include generating the set of attributes corresponding to the context in response to an interaction with the graphical user interface. In some implementations, the method can include presenting a classification of the context via the graphical user interface prior to receiving the interaction. In some implementations, the set of attributes comprises one or more of location data, time data, or a classification of the context. In some implementations, the method can include transmitting, to the at least one server, a second search request for one or more lists or one or more selections. In some implementations, the method can include receiving, from the at least one server, the one or more lists or the one or more selections in response to the second search request. In some implementations, the method can include generating the set of attributes to include an indication that the context corresponds to broadcast content.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form, for example, by appropriate computer programs, which may be carried on appropriate carrier media (computer readable media), which may be tangible carrier media (e.g., disks) or intangible carrier media (e.g., communications signals). Aspects may also be implemented using any suitable apparatus, which may take the form of programmable computers running computer programs arranged to implement the aspect. As used in the specification and in the claims, the singular form of 'a,' 'an,' and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 4 illustrates a flowchart of a method for processing image data and executing search operations, in accordance with one or more implementations;

FIG. 5 illustrates a flowchart of a method for local network search optimization based on timers, in accordance with one or more implementations;

FIG. 6 illustrates a flowchart of a method for generating network data structures from local peripheral signals, in accordance with one or more implementations;

FIG. 7 illustrates a flowchart of a method for automatic network connections from local network data, in accordance with one or more implementations.

DETAILED DESCRIPTION

Below are detailed descriptions of various concepts related to, and approaches, methods, apparatuses, and systems for implementing the various techniques described herein. The various concepts introduced above and discussed in greater detail below may be implemented in any of numerous ways, as the described concepts are not limited to any particular manner of implementation. Examples of specific implementations and applications are provided primarily for illustrative purposes For purposes of reading the description of the various implementations below, the following descriptions of the sections of the Specification and their respective contents may be helpful.

Section A describes a network environment and computing environment to implement embodiments described herein.

Section B describes systems and methods for image-based network search.

Section C describes systems and methods for local network search optimization based on timers.

Section D describes systems and methods for generating network data structures from local peripheral signals.

Section E describes systems and methods for automatic network connections from local network data.

Section F describes systems and methods for data structure searching based on network content.

A. Computing and Network Environment for Managing Network Sessions of Network Applications Referring to FIG. 1A, an embodiment of a network environment is depicted for managing network sessions of network applications. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more agents 103a-103n and one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Figure 1A:
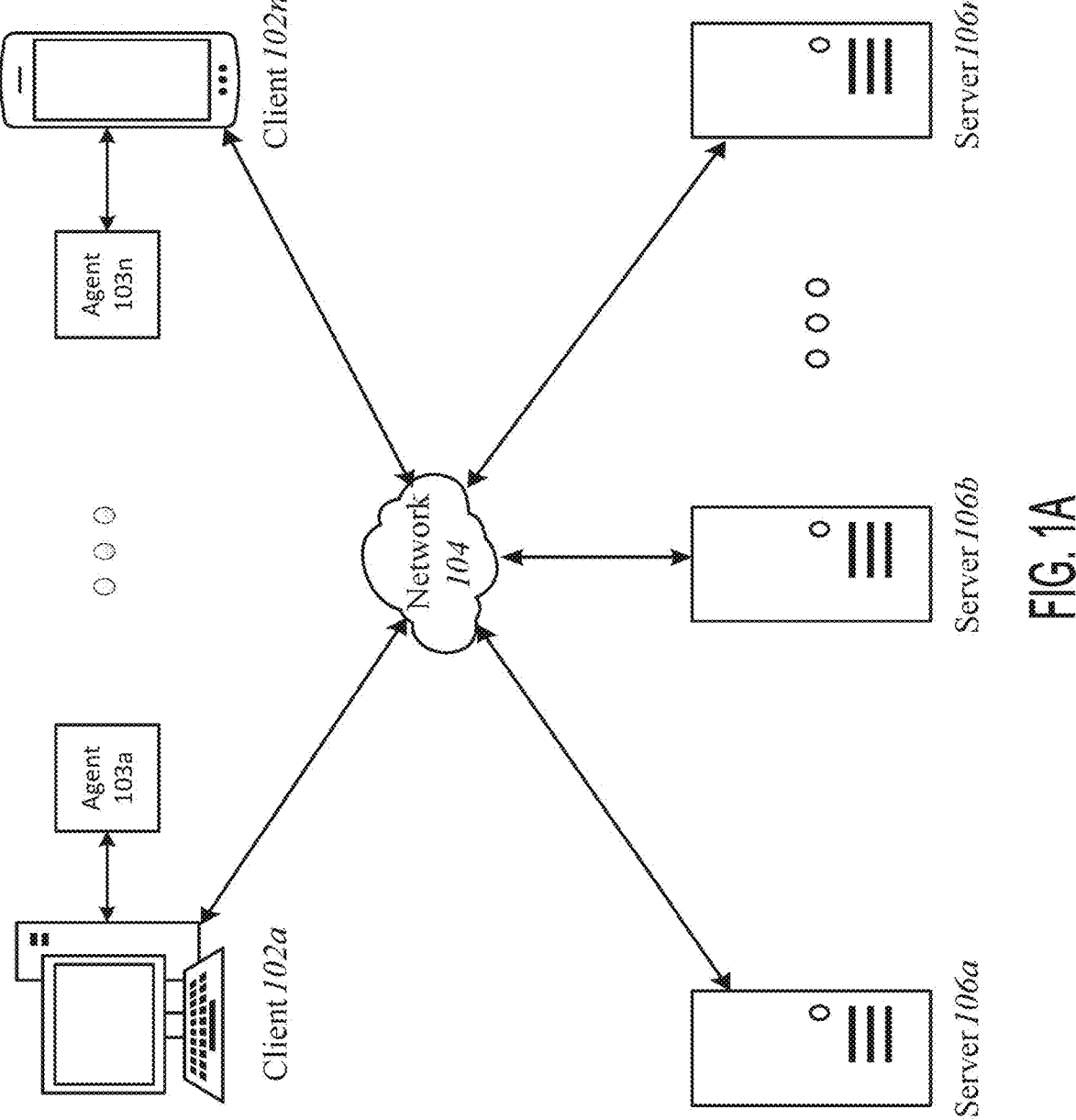
FIG. 1A is a block diagram depicting an embodiment of a network environment comprising a client device in communication with a server device.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel, or satellite band. The wireless links may also include any cellular network standards used to communicate among mobile devices, including standards that qualify as 1G, 2G, 3G, 4G, or 5G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods, e.g., FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN) (e.g., Intranet), a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 (not shown) or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or remote machines 106 can operate according to one type of operating system platform (e.g., WINDOWS NT, manufactured by Microsoft Corp. of Redmond, Washington), while one or more of the other servers 106 can operate according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks 104. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc.; the HYPER-V hypervisors provided by Microsoft, or others. Hosted hypervisors may run within an operating system on a second software level. Examples of hosted hypervisors may include VMware Workstation and VIRTUALBOX.

Management of the machine farm 38 may be decentralized. For example, one or more servers 106 may comprise components, subsystems, and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 106 may be in the path between any two communicating servers.

Figure 1B:
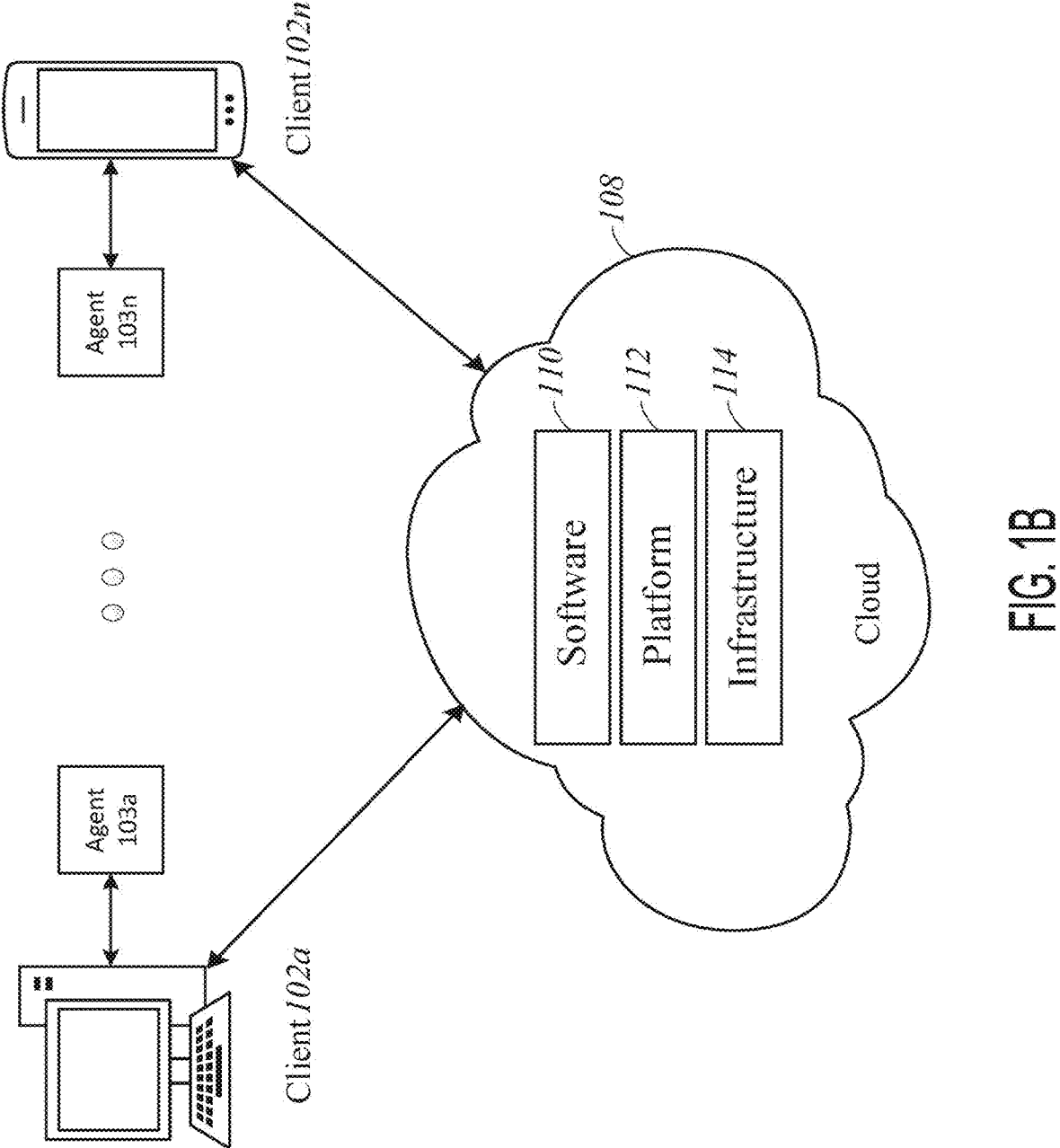
FIG. 1B is a block diagram depicting a cloud computing environment comprising a client device in communication with cloud service providers.

Referring to FIG. 1B, a cloud computing environment is depicted for managing network sessions of network applications. A cloud computing environment may provide client 102 with one or more resources provided by a network environment. The cloud computing environment may include one or more clients 102a-102n, in communication with respective agents 103a-103n and with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms, or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds 108 may be connected to the servers 106 over a public network 104. Private clouds 108 may include private servers 106 that are physically maintained by clients 102 or owners of clients. Private clouds 108 may be connected to the servers 106 over a private network 104. Hybrid clouds 108 may include both the private and public networks 104 and servers 106.

The cloud 108 may also include a cloud based delivery, e.g., Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington; RACKSPACE CLOUD provided by Rackspace US, Inc., of San Antonio, Texas; Google Compute Engine provided by Google Inc. of Mountain View, California; or RIGHTSCALE provided by RightScale, Inc., of Santa Barbara, California. PaaS providers may offer functionality provided by IaaS, including, e.g., storage, networking, servers, or virtualization, as well as additional resources such as, e.g., the operating system, middleware, or runtime resources. Examples of PaaS include WINDOWS AZURE provided by Microsoft Corporation of Redmond, Washington; Google App Engine provided by Google Inc.; and HEROKU provided by Heroku, Inc., of San Francisco, California. SaaS providers may offer the resources that PaaS provides, including storage, networking, servers, virtualization, operating system, middleware, or runtime resources. In some embodiments, SaaS providers may offer additional resources, including, e.g., data and application resources. Examples of SaaS include GOOGLE APPS provided by Google Inc.; SALESFORCE provided by Salesforce.com Inc. of San Francisco, California; or OFFICE 365 provided by Microsoft Corporation. Examples of SaaS may also include data storage providers, e.g., DROPBOX provided by Dropbox, Inc., of San Francisco, California; Microsoft SKYDRIVE provided by Microsoft Corporation; Google Drive provided by Google Inc.; or Apple ICLOUD provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages, including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g., GOOGLE CHROME, Microsoft INTERNET EXPLORER, or Mozilla Firefox provided by Mozilla Foundation of Mountain View, California). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
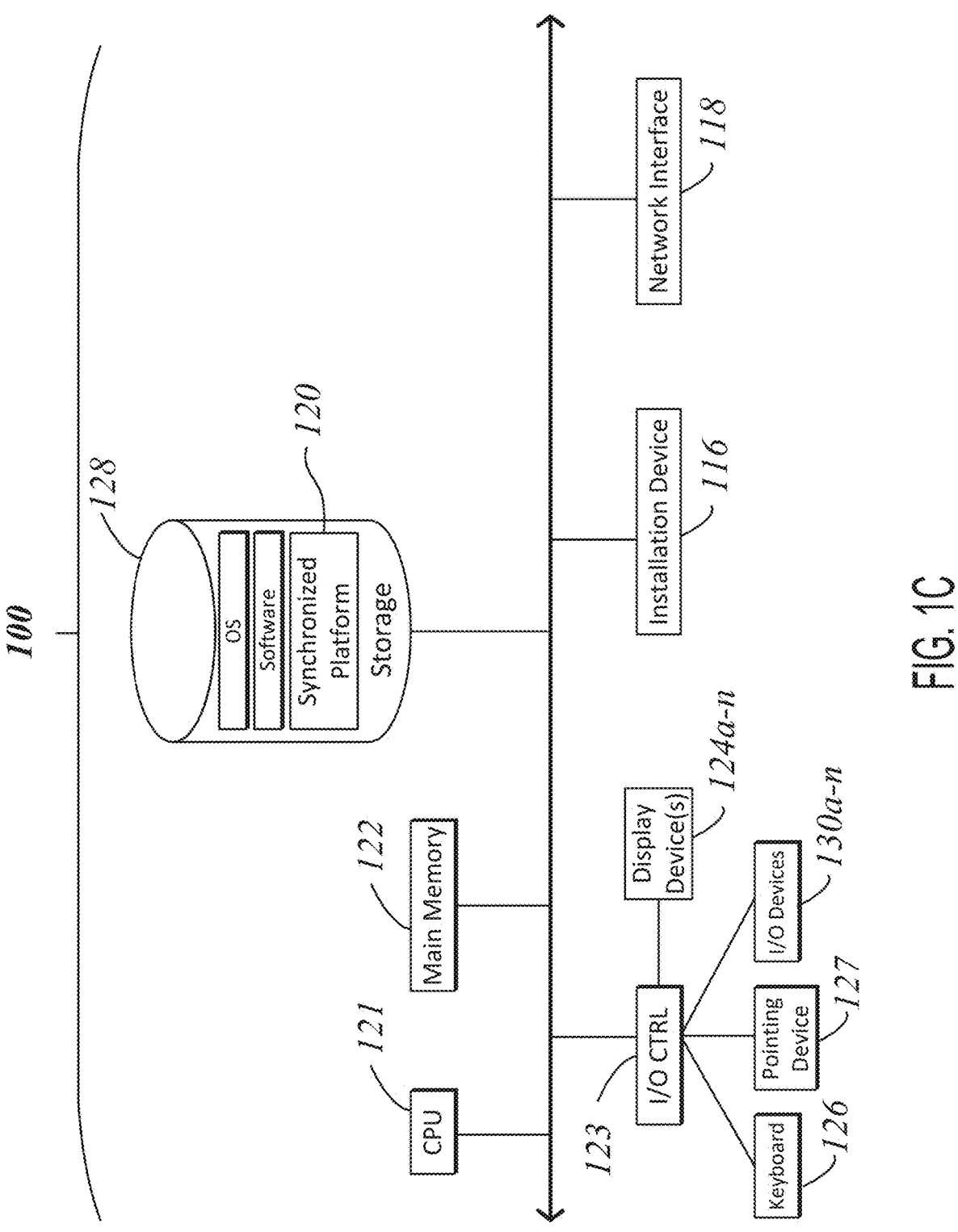
FIGS. 1C and 1D are block diagrams depicting embodiments of computing devices useful in connection with the methods and systems described herein.
Figure 1D:
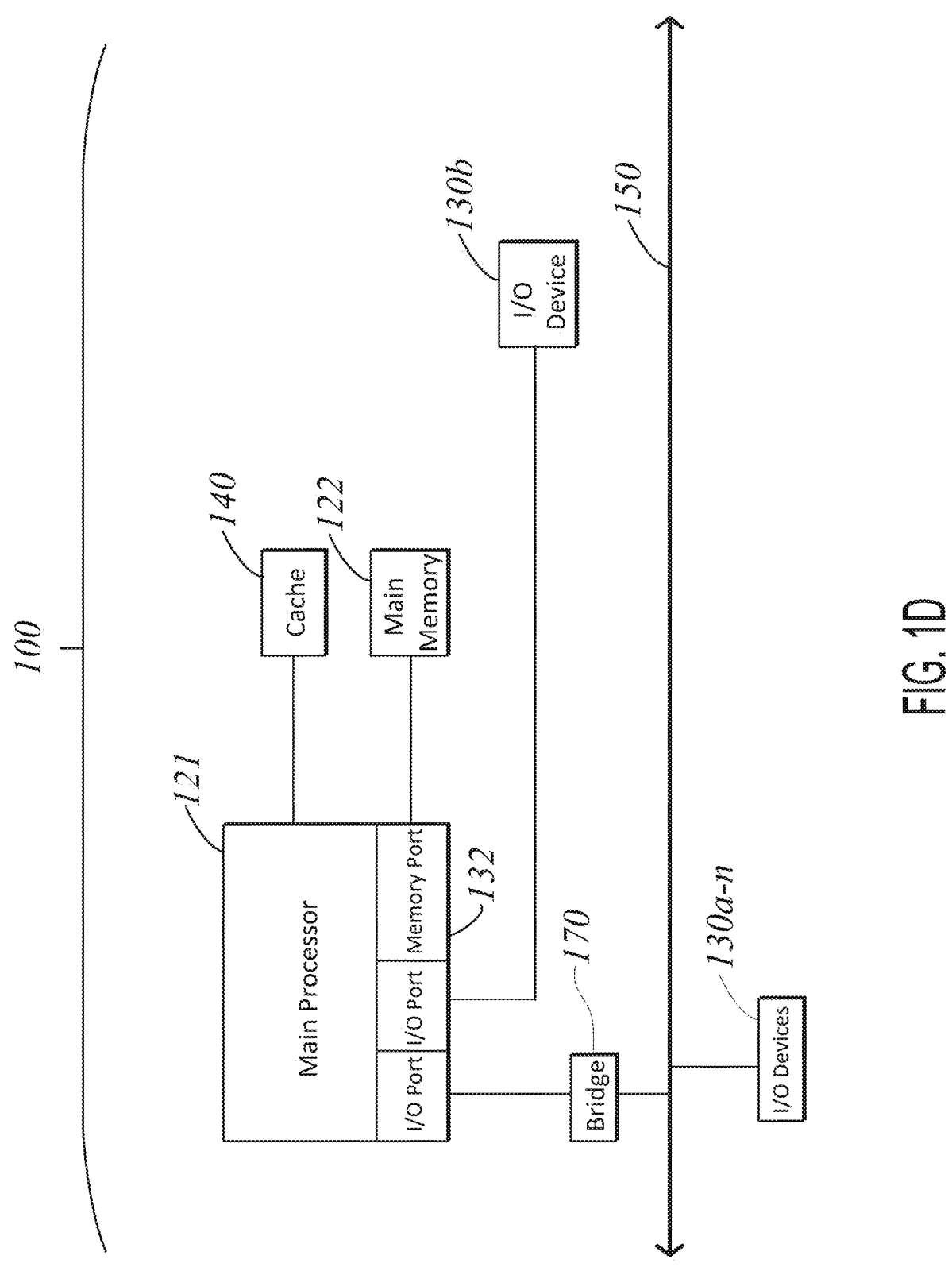

The client 102 and server 106 may be deployed as and/or executed on any type and form of computing device, e.g., a computer, network device or appliance capable of communicating on any type and form of network and performing the operations described herein. FIGS. 1C and 1D depict block diagrams of a computing device 100 useful for practicing an embodiment of the client 102 or a server 106, for managing network sessions of network applications. As shown in FIGS. 1C and 1D, each computing device 100 includes a central processing unit 121 and a main memory unit 122. As shown in FIG. 1C, a computing device 100 may include a storage device 128, an installation device 116, a network interface 118, an I/O controller 123, display devices 124a-124n, a keyboard 126, and a pointing device 127, e.g., a mouse. The storage device 128 may include, without limitation, an operating system, software, and synchronized platform 120, which can implement any of the features of the data processing system 205 described herein below in conjunction with FIG. 2. As shown in FIG. 1D, each computing device 100 may also include additional optional elements, e.g., a memory port 132, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g., those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5, INTEL CORE i7, and INTEL CORE i9.

Main memory unit 122 may include one or more memory chips capable of storing data and allowing any storage location to be directly accessed by the microprocessor 121. Main memory unit 122 may be volatile and faster than storage 128 memory. Main memory units 122 may be dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 132. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus 150 while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provide for facial recognition which may be utilized as an input for different purposes including authentication and other commands. Some devices 130a-130n provides for voice recognition and inputs, including, e.g., Microsoft KINECT, SIRI for IPHONE by Apple, Google Now, or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality, including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augmented reality devices. The I/O devices 130a-130n may be controlled by an I/O controller 123 as shown in FIG. 1C. The I/O controller 123 may control one or more I/O devices 130a-130n, such as, e.g., a keyboard 126 and a pointing device 127, e.g., a mouse or optical pen. Furthermore, an I/O device 130 may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g., a USB bus, a SCSI bus, a Fire Wire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g., stereoscopy, polarization filters, active shutters, or autostereoscopic. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect, or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g., one or more hard disk drives or redundant arrays of independent disks) for storing an operating system or other related software, and for storing application software programs such as any program related to the synchronized platform 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via an I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software 110 can be run from a bootable medium, for example, a bootable CD, e.g., KNOPPIX, a bootable CD for GNU/Linux that is available as a GNU/Linux distribution from knoppix.net.

Client device 100 may also install software 110 or application from an application distribution platform 112. Examples of application distribution platforms 112 include the App Store for iOS provided by Apple, Inc.; the Mac App Store provided by Apple, Inc.; GOOGLE PLAY for Android OS provided by Google Inc.; Chrome Webstore for CHROME OS provided by Google Inc.; and Amazon Appstore for Android OS and KINDLE FIRE provided by Amazon.com, Inc. An application distribution platform 112 may facilitate installation of software 110 on a client device 102. An application distribution platform 112 may include a repository of applications on a server 106 or a cloud 108, which the clients 102a-102n may access over a network 104. An application distribution platform 112 may include an application developed and provided by various developers. A user of a client device 102 may select, purchase, and/or download an application via the application distribution platform 112.

Furthermore, the computing device 100 may include a network interface 118 to interface to the network 104 through a variety of connections, including, but not limited to, standard telephone lines, LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol, e.g., Secure Socket Layer (SSL) or Transport Layer Security (TLS), or the Citrix Gateway Protocol manufactured by Citrix Systems, Inc., of Ft. Lauderdale, Florida. The network interface 118 may comprise a built-in network adapter, network interface card, PCMCIA network card, EXPRESSCARD network card, card bus network adapter, wireless network adapter, USB network adapter, modem, or any other device suitable for interfacing between the computing device 100 and any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to, WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Washington; MAC OS and iOS, manufactured by Apple, Inc., of Cupertino, California; and Linux, a freely-available operating system, e.g., Linux Mint distribution ("distro") or Ubuntu, distributed by Canonical Ltd. of London, United Kingdom; or Unix or other Unix-like derivative operating systems; and Android, designed by Google, of Mountain View, California, among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, a PLAYSTATION 4, PLAYSTATION 5, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, NINTENDO WII U, or a NINTENDO SWITCH device manufactured by Nintendo Co., Ltd., of Kyoto, Japan, an XBOX 360, an XBOX ONE, an XBOX ONE S, an XBOX ONE X, an XBOX SERIES S, or an XBOX SERIES X, manufactured by the Microsoft Corporation of Redmond, Washington.

In some embodiments, the computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform.

For example, the IPOD Touch may access the Apple App Store. In some embodiments, the computing device 100 is a portable media player or digital audio player supporting file formats, including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet, e.g., the IPAD line of devices by Apple; GALAXY TAB family of devices by Samsung; or KINDLE FIRE, by Amazon.com, Inc., of Seattle, Washington. In other embodiments, the computing device 100 is an eBook reader, e.g., the KINDLE family of devices by Amazon.com, or NOOK family of devices by Barnes & Noble, Inc., of New York City, New York.

In some embodiments, the communications device 102 includes a combination of devices, e.g., a smartphone combined with a digital audio player or portable media player. For example, one of these embodiments is a smartphone, e.g., the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g., a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 are monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods for Image-Based Network Search

The techniques described herein relate to systems and methods for image-based network operations. Computing systems can execute various operations based on image data captured by peripheral devices. Image data can include visual representations of objects, text, or other content in an environment. To process image data, computing systems may implement machine learning models updated/trained to detect patterns or features in image data. For example, optical character recognition models can identify text characters in images, while object detection models can classify objects depicted in images. Multi-modal language models can generate textual descriptions or labels for image content.

The techniques described herein can address various technical limitations of conventional network systems by providing systems and methods for efficient, context-aware image-based network operations. The techniques described herein can employ machine learning models to generate sets of values from captured image data, with each value corresponding to an attribute or category associated with detected content. The generated values can be filtered by matching against predetermined values to identify relevant elements. Search operations can then be executed based on the filtered values to retrieve content items related to live events or other contextual information.

In some implementations, the techniques can utilize different types of machine learning models to process image data. For example, optical character recognition models can identify text in images. Object detection models can classify visual elements and generate corresponding labels. Multi-modal language models can produce descriptive tokens based on image content. The outputs of such models can be used to generate sets of values representing attributes or categories of detected image elements. The techniques can filter these values by matching against predetermined sets of values, which can be dynamically updated based on current events or user preferences. Search operations can then be executed using the filtered values to retrieve relevant content items.

The techniques described herein can provide improved efficiency and contextual awareness for image-based network operations. By employing machine learning models to generate filtered sets of values from image data, the techniques can enable more flexible and targeted search operations compared to conventional approaches. The ability to dynamically update filtering criteria can allow systems to adapt to changing contexts or user needs. Additionally, by integrating image-derived data with other contextual information, the techniques can provide more relevant and timely results for image-based queries and actions. The methods described can be implemented across multiple connected devices, enabling synchronized image-based operations in networked environments.

Figure 2:
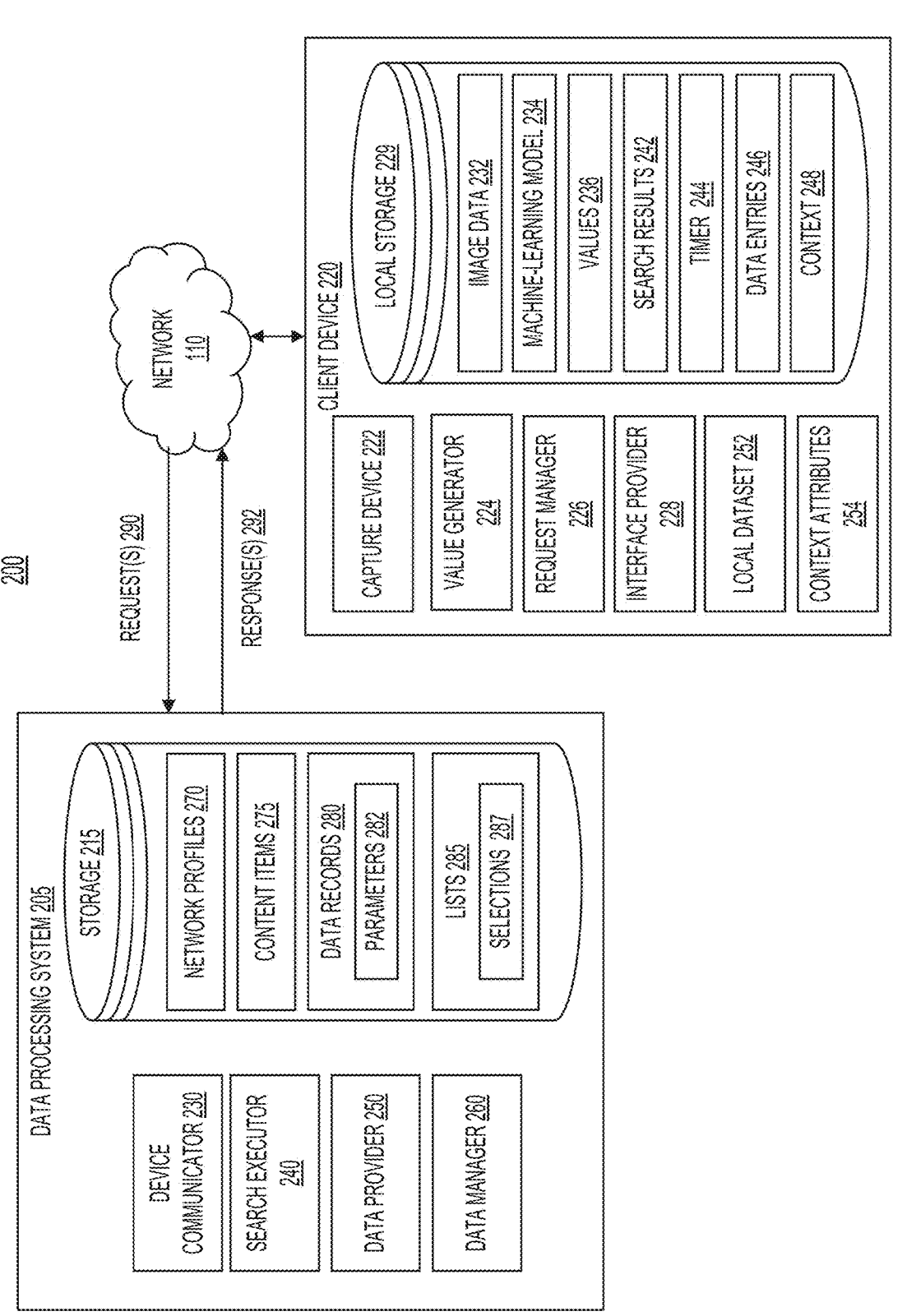
FIG. 2 illustrates a system for image-based network operations, in accordance with one or more implementations.

Referring now to FIG. 2, illustrated is a block diagram of an example system 200 for image-based network operations, in accordance with one or more implementations. The system 200 can include at least one data processing system 205, at least one client device 220, and at least one network 210. The data processing system 205 can include at least one storage 215, at least one device communicator 230, at least one search executor 240, at least one data provider 250, and at least one data manager 260. The storage 215 can include one or more network profiles 270, one or more content items 275, one or more data records 280 with one or more data record parameters 282, one or more lists 285, and one or more selections 287. The client device 220 can include at least one capture device 222, at least one value generator 224, at least one request manager 226, at least one interface provider 228, at least one local dataset 252, and one or more context attributes 254. The client device 220 can also include at least one local storage 229 containing at least one image data 232, at least one machine learning model 234, one or more generated values 236, one or more search results 242, at least one timer 244, one or more data entries 246, and at least one context 248. The system 200 can enable communication between the data processing system 205 and client device 220 through one or more request(s) 290 and one or more response(s) 292 transmitted across the network 110.

Each of the components (e.g., the data processing system 205, the network 210, storage 215, the client device 220, the capture device 222, the value generator 224, the request manager 226, the interface provider 228, the device communicator 230, the image data 232, the machine learning model 234, the generated values 236, the search executor 240, the search results 242, the timer 244, the data entries 246, the context 248, the data provider 250, the local dataset 252, the context attributes 254, the data manager 260, the network profiles 270, the content items 275, the data records 280, the data record parameters 282, the lists 285, the selections 287, the request(s) 290, the response(s) 292, components thereof, etc.) of the system 200 can be implemented using the hardware components or a combination of software with the hardware components of a computing system, such as the server 106, the client computing system 102, or the computing system 100 described in connection with FIGS. 1A-1D, or any other computing system described herein.

The data processing system 205 can include at least one processor and a memory (e.g., a processing circuit). The memory can store processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system 205 can include one or more computing devices or servers that can perform various functions as described herein. The data processing system 205 can include any or all of the components and perform any or all of the functions of the server 106, the client computing system 102, or the computing system 100 described in connection with FIGS. 1A-ID, or any other computing system described herein.

The network 210 can include computer networks such as the Internet, local, wide, metro or other area networks, intranets, satellite networks, other computer networks such as voice or data mobile phone communication networks, and combinations thereof. The data processing system 205 of the system 200 can communicate via the network 210, for example with one or more client devices 220. The network 210 may be any form of computer network that can relay information between the data processing system 205, the one or more client devices 220, and one or more information sources, such as web servers or external databases, amongst others. In some implementations, the network 210 may include the Internet and/or other types of data networks, such as a local area network (LAN), a wide area network (WAN), a cellular network, a satellite network, or other types of data networks.

The network 210 may also include any number of computing devices (e.g., computers, servers, routers, network switches, etc.) that are configured to receive and/or transmit data within the network 210. The network 210 may further include any number of hardwired and/or wireless connections. Any or all of the computing devices described herein (e.g., the data processing system 205, the one or more client devices 220, etc.) may communicate wirelessly (e.g., via Wi-Fi, cellular, radio, etc.) with a transceiver that is hardwired (e.g., via a fiber optic cable, a CAT5 cable, etc.) to other computing devices in the network 210. Any or all of the computing devices described herein (e.g., the data processing system 205, the one or more client devices 220, the server 106, the client computing system 102, the computing system 100, etc.) may also communicate wirelessly with the computing devices of the network 210 via a proxy device (e.g., a router, network switch, or gateway).

The client device 220 can include at least one processor and a memory, e.g., a processing circuit. The memory can store processor-executable instructions that, when executed by processor, cause the processor to perform one or more of the operations described herein. The processor can include a microprocessor, an ASIC, an FPGA, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The client device 220 can include one or more computing devices or servers that can perform various functions as described herein. The client device 220 can include any or all of the components and perform any or all of the functions of the client computing system 102 or the computing system 100 described in connection with FIGS. 1A-1D, or any other computing system described herein. The client device 220 may execute one or more applications (e.g., web-based applications, native applications, etc.) to perform any of the operations described herein. Although one client device 220 is shown in FIG. 2, it should be understood that the system 200 may include any number of client devices 220 that may perform any of the operations described herein.

Each client device 220 can include, but is not limited to, a mobile device (e.g., a smartphone, tablet, etc.), a television device (e.g., smart television, set-top box, et.), a personal computing device (e.g., a desktop, a laptop, etc.) or another type of computing device. Each client device 220 can be implemented using hardware or a combination of software and hardware. Each client device 220 can include a display or display portion. The display can include a display portion of a television, a display portion of a computing device, or another type of interactive display (e.g., a touchscreen, a display, etc.) and one or more input/output (I/O) devices (e.g., a mouse, a keyboard, digital keypad). The display can include one or more portions, for example, to display various graphical user interfaces (e.g., graphical user interfaces 302A, 302B, 302C of FIGS. 3A-3C, etc.), as described herein. The display can include a touch screen displaying an application, such as the gaming applications described herein. The display can include a border region (e.g., side border, top border, bottom border).

In some implementations, the display can include a touch screen display, which can display graphical content. The display can receive interactions from a player. The interactions can result in interaction data, which can be stored and transmitted by the processing circuitry of the client device 220. The interaction data can include, for example, interaction coordinates, an interaction type (e.g., click, swipe, scroll, tap, etc.), and an indication of an actionable object with which the interaction occurred. Each client device 220 can include an input device that enables a player to interact with and/or select one or more actionable objects as described herein. For example, a touchscreen display can enable interaction with one or more visual indications provided through the display of each mobile (or client) device 220, and responsive to an interaction (e.g., select, click-on, touch, hover), the client device 220 can generate an indication identifying the interaction, the selection, or an indication to of a command, among others. The touchscreen display can depict graphical elements representing an action query and generate an indication of the action chosen by the player. In some implementations, interactions received at the client device 220 can cause the client device 220 and/or the application executing thereon to transmit one or more requests 290 as described in further detail herein.

Each client device 220 can include a device identifier, which can be specific to each respective client device 220. The device identifier can include a script, code, label, or marker that identifies a particular client device 220. In some implementations, the device identifier can include a string or plurality of numbers, letters, characters or any combination numbers, letters, and characters. In some implementations, each client device 220 can have a unique device identifier. Each client device 220 can include a client application, which can be a gaming application that communicates with the data processing system 205 to play games, as described herein. The client application can include an application executing on each client device 220 or provided to the client device 220 by the data processing system 205.

The application can include a web application, a server application, a resource, a desktop, or a file. In some implementations, the application can include a local application (e.g., local to a client device 220), hosted application, Software as a Service (SaaS) application, virtual application, mobile application, and other forms of content. In some implementations, the application can include or correspond to applications provided by remote servers or third-party servers. In some implementations, the application can access the network profiles 270, the content items 275, the data records 280, the data record parameters 282, one or more lists 285, one or more selections, 287, or the network instructions 280, stored and maintained at the storage 215, and/or any of the information stored in the local storage 229, the local dataset 252, the context attributes 254, or any other information maintained/stored at the client device 220. The application can generate one or more actionable objects, such as the actionable objects (e.g., interactive objects) described herein below in connection with FIGS. 3A-3C, to a user (sometimes referred to herein as a "player") through a client device 220. Such actionable objects can include player-selectable hyperlinks, buttons, graphics, videos, images, or any other type of user interface element that generate a signal that is processed by the application executing on the respective client device 220.

In some implementations, one or more client devices 220 can establish one or more network sessions with the data processing system 205. In some implementations, the one or more network sessions can each include a channel or connection between the data processing system 205 and the one or more client devices 220. In some implementations, the one or more client devices 220 can transmit a request to join a communication session of the network sessions. The network sessions can include the execution of a virtual application, in which one or more client devices 220 can interact via communications with the data processing system 205 according to protocol of the virtual application. The protocol of the virtual application can include, but are not limited to, rules and/or instructions associated with the virtual application (e.g., an interactive network application, an interactive game, etc.). The network session may be used to perform any of the operations described herein.

In some implementations, the one or more network sessions can be or include one or more application sessions (e.g., of the virtual application), an execution session, a desktop session, a hosted desktop session, a terminal services session, a browser session, a remote desktop session, a URL session and/or a remote application session, among others. Each network session can include encrypted and/or secure sessions, which can include an encrypted file, encrypted data or traffic. Each client device 220 can use the network session established with the data processing system 205 to carry out any of the functionalities described herein. For example, the application executing on each client device 220 can perform any of the client-side operations described herein, including displaying any of the user interfaces shown in FIGS. 3A-3C, or any other types of user interfaces described herein.

Each of the client devices 220 can be computing devices configured to communicate via the network 210 to access information resources, such as web pages via a web browser, or application resources via a native application executing on a client device 220. When accessing information resources (e.g., instructions/assets for displaying/presenting, modifying, or otherwise navigating graphical user interface(s), etc.) the client device 220 can execute instructions (e.g., embedded in the native applications, in the information resources, etc.) that cause the client devices 220 to display various application interfaces, such as the user interfaces described herein below in conjunction with FIGS. 3A-3C. The application interfaces can be, for example, application interfaces that present different types of image-based search results, or other types of interactive graphical user interfaces. In general, the graphical user interfaces may include various different types of interactive or non-interactive assets (e.g., images, video, animations, graphics, audio, etc.) that is presented to a user via the input/output interfaces of a client device 220.

In response to interactions with user interface elements, the client devices 220 can transmit requests 290 which may include any of the information described herein, such as image data 232, generated values 236, search results 242, or other signals to the data processing system 205. Information transmitted by the client devices 220 may advance the state of image processing operations. Image processing operations may advance to a subsequent stage based on receiving interaction information (e.g., selection of values 316) from the client device 220. In some implementations, a client device 220 can transmit a request 290 to access image-based search functionality via the data processing system 105. The request 290 can include, for example, a request to perform a particular search operation or a request to process particular image data 232 (e.g., can include an image identifier, etc.), among other operations. The request 290 can be transmitted as or may include a hypertext transfer protocol (HTTP or HTTPS) request message, a file transfer protocol message, an email message, a text message, or any other type of message that can be transmitted via the network 210.

The client device 220 can include at least one capture device 222. The capture device 222 can include a camera, image sensor, or other optical component configured to capture visual information from the environment. The capture device 222 can be structured as an integrated hardware component of the client device 220 or as a peripheral device connected via a wired or wireless interface. In some implementations, the capture device 222 can operate in various modes including continuous capture, triggered capture based on user input, or scheduled capture at predetermined intervals. For example, the capture device 222 can capture still images of printed text such as sports statistics in a newspaper, video streams of live sporting events displayed on a television screen, or visual representations of data structures such as tournament brackets or team rosters. The capture device 222 can include additional features such as auto-focus capabilities, optical zoom functionality, or image stabilization to improve the quality of captured image data 232 for subsequent processing according to the techniques described herein.

The client device 220 can include at least one local storage 229. The local storage 229 can be a computer-readable memory that can store or maintain any of the information described herein. The local storage 229 can maintain one or more data structures, which may contain, index, or otherwise store each of the values, pluralities, sets, variables, vectors, numbers, or thresholds described herein. The local storage 229 can be accessed using one or more memory addresses, index values, or identifiers of any item, structure, or region maintained in the local storage 229. The local storage 229 can be accessed by the components of the client device 220. In some implementations, the local storage 229 can be internal to the client device 220. The local storage 229 can store the image data 232, the machine learning model 234, the generated values 236, the search results 242, the timer 244, the data entries 246, and the context 248, as described herein.

The local storage 229 can include at least one image data 232. The image data 232 can include a plurality of pixels representing visual content captured by the capture device 222. In some implementations, the image data 232 can be structured as a two-dimensional array of pixel values, with each pixel value corresponding to color and intensity information at a specific coordinate position within the captured visual field of the capture device 222. In some implementations, the image data 232 can be captured transiently, such that the image data 232 is processed in real-time but not stored for greater than a predetermined time period, for example, five seconds, ten seconds, or thirty seconds, among others. In some implementations, the image data 232 can be stored for a longer duration in response to a user selection to capture an image or record a video. The user selection can trigger the client device 220 to allocate additional memory space within the local storage 229 for persistent storage of the image data 232. The capture device 222 can generate the image data 232 at various resolutions or frame rates depending on the operational mode selected by a user or determined by the client device 220 based on available system resources. In some implementations, portions of image data 232 may be stored and/or used for processing, while other portions of image data 232 may be presented via a graphical user interface (e.g., the graphical user interface 302B of FIG. 3B) but not necessarily stored for processing. In some implementations, one or more images captured via the capture device 222 may be processed according to the timer 244, as described in further detail herein.

The local storage 229 can contain at least one machine learning model 234. The machine-learning model 234 can receive frames of image data 232 as input and generate classifications of values 236, such as text data and/or classifications of objects or features in the environment depicted in the frames. In some implementations, the machine-learning model 234 can include an optical character recognition (OCR) model. In such implementations, the machine-learning model 234 can identify and extract alphanumeric characters from captured images, including player names on jerseys, team abbreviations on scoreboards, statistical data in newspaper columns, event dates and times on tickets, venue names on signage, league names in headlines, player numbers, team rankings, win-loss records, betting odds displayed on television broadcasts, tournament brackets on printed materials, and textual content from sports websites or mobile applications displayed on screens.

In some implementations, the machine-learning model 234 can include a multi-modal language model. In such implementations, the machine-learning model 234 can process visual and/or textual information to generate contextually relevant descriptions or classifications of the frame of image data 232. Such models can analyze the overall composition of an image to determine, for example, a type of sporting event being depicted, identify the significance of visual elements within their context, generate natural language descriptions of game situations, detect/recognize the emotional tone of a sports moment, interpret visual scenes such as play formations or tactical arrangements, correlate visual elements with known entities in sports databases, understand temporal sequences in video frames, recognize branded content or sponsorship elements, interpret graphical representations of statistics or performance metrics, and generate appropriate search terms or tags that capture the semantic meaning of the visual content rather than merely identifying visible text or objects. The multi-modal language model may also generate text output (e.g., values 236) or other outputs similar to an OCR model, in some implementations.

In some implementations, the machine-learning model 234 can include an object detection or classification model. In such implementations, the machine-learning model 234 can identify and categorize visual elements (e.g., as output values 236 or data structures from which values 236 can be derived, etc.) within the image data 232 without necessarily requiring textual content. In such implementations, the machine-learning model 234 can detect a variety of sports-related objects/features, such as team names, uniforms, and their associated franchises, sports equipment such as balls, bats, or rackets to identify the type of sport, identify playing surfaces like courts, fields, or rinks, recognize athlete faces and associate them with known player profiles, detect referee or official uniforms, identify stadium or venue architectural features, recognize team logos or emblems, detect scoreboard displays even without reading specific numbers, identify broadcast network graphics or chyrons, recognize sports-specific gestures or actions such as shooting motions or pitching stances, detect crowd formations or audience reactions, and identify distinctive venue features that can be associated with specific teams or locations.

In some implementations, the machine-learning model 234 can process image data 232 depicting fantasy sports lineups displayed on screens or printed materials. The machine-learning model 234 can extract player selections, projected fantasy points, salary cap information, roster positions, or player statistics from fantasy sports applications, among others. The machine-learning model 234 can also identify wager information from captured images, such as parlay wager combinations, moneyline odds, point spreads, over/under totals, prop bet options, or payout calculations displayed on betting slips or digital interfaces, among others. In some implementations, the capture device 222 can record video of live events, such as sporting competitions, tournaments, or matches, and the machine-learning model 234 can process the captured video frames to identify teams, athletes/participants, scoring plays, game clock information, or referee signals, among others. The machine-learning model 234 can process image data 232 from live streams or video streams of sporting events displayed on television screens, mobile devices, or computer monitors to extract real-time game information, commentary captions, or statistical overlays presented during broadcasts, among others, as described in further detail herein.

The local storage 229 can contain one or more generated values 236. The generated values 236 can be stored in association with corresponding image data 232 from which the generated values 236 were derived. The generated values 236 can be generated by or derived from the output of the machine-learning model 234, such as text extracted by an optical character recognition model, object classifications from an object detection model, and/or tokens generated by a multi-modal language model (or values derived from such tokens), among others. The generated values 236 can include text identifiers, team names, player names, event dates, numerical statistics, sport types, league abbreviations, classifications, or other data that can be matched against a local dataset 252 as described in further detail herein. In some implementations, the generated values 236 can be structured as an array, a list, a dictionary, or another data structure that associates each value with a confidence score, a timestamp, and/or a position within the image data 232, among others. Examples of different values 236 are shown in connection with FIG. 3B, where the values 316 include various sports-related abbreviations and terms such as team identifiers, league names, and sport types.

The generated values 236 can be stored within the local storage 229 using any suitable data structure. In some implementations, the generated values 236 can be stored in a hierarchical structure that groups related values together, such as grouping all team names under a sports category, or grouping all player statistics under a performance metrics category, among others. The generated values 236 can be indexed for efficient retrieval during search operations, with index keys corresponding to value types, confidence scores, and/or temporal information. In some implementations, the generated values 236 can be temporarily cached in volatile memory before being committed to persistent storage based on user interactions or system determinations of value relevance. The generated values 236 can be filtered or prioritized based on predetermined criteria before being presented to a user via the graphical user interface 302B, as described in further detail herein.

In some implementations, the generated values 236 can be stored according to rankings or in association with relative location information. In some implementations, the generated values 236 can be ordered based on confidence scores assigned by the machine-learning model 234, with higher-ranked values stored at the beginning of a data structure for faster access. For example, the local storage 229 can maintain metadata for each generated value 236 indicating its source location within the image data 232, such as pixel coordinates or bounding box dimensions. In some implementations, the generated values 236 can be associated with distance estimates from the capture device 222 to corresponding objects in the environment. For example, the local storage 229 can store depth information or z-axis coordinates for each generated value 236, such that the generated values 236 can be sorted/ranked according to distance from the capture device 222. In some implementations, the relative location information can be used to filter or prioritize the generated values 236 during subsequent processing operations. The storage of location-based metadata can enable the client device 220 to perform additional contextual analysis, as described herein.

The local storage 229 can include one or more search results 242. The search results 242 can be provided by the data processing system 205 in one or more responses 292 transmitted across the network 210. In some implementations, the search results 242 can include or may be provided with structured data corresponding to content items 275 maintained at the storage 215 of the data processing system 205. In some implementations, the search results 242 can include indications of data records 280, such as wager opportunities associated with live events. The search results 242 can include various types of wagers, including money-line wagers, point spread wagers, over/under wagers, parlay wagers, prop bets, or other types of wager opportunities that may be available for the live events identified through the image-based search operations described herein.

In some implementations, the search results 242 can include indications of one or more lists 285 of selections 287, such as fantasy sports lineups or selections 287 of athletes/teams for fantasy sports lineups. For example, the search results 242 can include information about fantasy sports contests, such as daily fantasy sports contests, season-long fantasy sports leagues, or other fantasy sports competitions. The search results 242 can include information about available athletes for selection in fantasy sports contests, projected fantasy points for athletes, salary cap values for athletes in salary-cap based fantasy contests, athlete statistics relevant to fantasy scoring, or other information that may be useful for users participating in fantasy sports competitions. The search results 242 can be ranked, stored, or otherwise organized according to sport type, league, team, position, or other categorization schemes that facilitate user navigation and interaction with the search results 242.

The search results 242 can be stored within the local storage 229 using various data structures and may be presented via one or more of the graphical user interfaces described herein. In some implementations, the search results 242 can be cached within the local storage 229 to reduce latency during subsequent user interactions with the same or similar search results 242. The search results 242 can include metadata indicating relevance scores, confidence values, or rankings that determine the order in which the search results 242 are to be presented via the graphical user interface. The search results 242 can be associated with timestamps and/or expiration information such that odds for wager opportunities or availability of athletes for fantasy sports contests, are indicated as current and accurate. In some implementations, search results 242 may include instructions or commands that cause the client device 220 to retrieve updated odds and/or availability data from the data processing system 105. In some implementations, the client device 220 can periodically request updated search results 242 from the data processing system 205 to refresh the cached search results 242 stored in the local storage 229.

The local storage 229 can include one or more timers 244. The timer 244 can be a countdown timer initialized to a predetermined value, such as five seconds, fifteen seconds, thirty seconds, or other time durations, among others. The timer 244 can be initiated upon generating the values 236 from the image data 232, as described in further detail herein. The timer 244 can count down from the predetermined value to zero or another threshold value that indicates expiration of the timer 244. In some implementations, the capture device 222 can continue to capture image data 232 while the timer 244 counts down, but the captured image data 232 can be presented via the graphical user interface 302B without being used to generate subsequent or replacement values 236 during the countdown period.

The timer 244 can restrict processing operations for newly captured image data 232 until the timer 244 expires. Once the timer 244 expires, current image data 232 captured by the capture device 222 can be used to generate replacement values 236. In some implementations, the replacement values 236 can be presented via the graphical user interface 302B, such as within the value region 314 shown in FIG. 3B. The timer 244 can prevent excessive processing of rapidly changing image data 232, which can reduce computational resource usage and power consumption of the client device 220. In some implementations, the timer indicator 318 can display a visual representation of the timer 244, such as closing circle, a progress bar, a numerical countdown, or a textual indication that processing will resume after the timer 244 expires, among others.

The local storage 229 can include one or more data entries 246. The data entries 246 can be a set of data that is determined to likely correspond to one or more data record parameters 282, such as wager selections, wager amounts, or other wager parameters, of a visual representation of a data record 280 detected in the image data 232. In some implementations, the data entries 246 can be detected using the machine-learning model 234, which can identify visual patterns corresponding to wager slips, betting tickets, fantasy sports lineups, wagering brackets, and/or other structured data representations captured by the capture device 222. The data entries 246 can include specific values extracted from the image data 232, such as team names, player identifiers, odds values, point spreads, over/under totals, wager amounts, contest entry fees, wager selections, or other parameters that define the structure and content of a data record 280 of a subset thereof.

The data entries 246 can be generated and/or derived from pixels of image data 232 as described in further detail herein. In some implementations, the value generator 224 can process the image data 232 to identify regions containing structured information, such as tables, forms, or other organized visual representations of data. In some implementations, the machine-learning model 234 can be executed to identify a region of the image data 232 as corresponding to one or more wager slips, betting tickets, fantasy sports lineups, wagering brackets, and/or other structured data representations. Upon detecting that one or more regions of the image data 232 satisfy such a criterion, the value generator 224 can extract specific values from these regions using optical character recognition, object detection, or other image processing techniques implemented by the machine-learning model 234. The data entries 246 can be populated and/or modified via user input, for example, via input to a user interface, to correct any errors in the automatically extracted values and/or to add additional information not captured in the image data 232. For example, a user may adjust an extracted wager amount, modify a team selection, or add contextual information such as a preferred payment method that was not visible in the original image data 232.

The data entries 246 can be used to perform a search request 290 for similar or matching data records 280, such as wager opportunities, as described in further detail herein. In some implementations, the request manager 226 can formulate a search request 290 using the data entries 246 as search parameters, transmitting the request 290 to the data processing system 205 via the network 210. The search request 290 can include one or more the data entries 246, such as team identifiers, event dates, wager types, or other attributes that can be used to identify relevant data records 280 maintained at the storage 215. The data processing system 205 can then execute a search operation using the search executor 240 to identify data records 280 that match or are similar to the parameters specified in the data entries

246, returning the matching records as search results 242 in a response 292 transmitted back to the client device 220, as described in further detail herein.

The local storage 229 can include at least one context 248. The context 248 can be data representing information about the environment depicted in the image data 232 captured by the capture device 222. In some implementations, the context 248 can include visual information such as lighting conditions, indoor/outdoor classification, crowd density estimates, venue type identification, or detected playing surface characteristics. The context 248 can also include metadata extracted from broadcast overlays captured in the image data 232, such as network logos, scoreboard graphics, statistical displays, or replay indicators. The context 248 can further include temporal information derived from the image data 232, such as game period indicators, shot clock values, play clock values, or values (e.g., inning numbers, time remaining, etc.) that provide situational context for the captured content.

The context 248 may include location data captured via location sensors of the client device 220. In some implementations, the location data can include GPS coordinates, altitude measurements, compass orientation, or proximity to known venues or landmarks. The location data can be used to determine that the client device 220 is physically present at a specific sports venue, such as a stadium, arena, ballpark, or gymnasium, which can provide additional contextual information for processing the image data 232. In some implementations, the context 248 can include Wi-Fi network identifiers, Bluetooth beacon data, or cellular tower information that can be used to triangulate the position of the client device 220 relative to known locations. The location data can be time-stamped and stored in association with corresponding image data 232 to store a relationship between captured images and physical locations. In some implementations, the context 248 can include motion data from other sensors of the client device 220, such as accelerometers or gyroscopes, that indicate whether the client device 220 is stationary or in motion during image capture.

The context 248 may include an indication that the image data 232 shows a live stream or video content. In some implementations, the context 248 can include broadcast source identifiers detected from the image data 232. The context 248 can include indicators of whether the captured content is from a television broadcast, mobile streaming application, web-based video player, or other digital media source. In some implementations, the context 248 can include information about the display device being captured, such as screen type, aspect ratio, or resolution, which can be used to optimize processing of the image data 232. The context 248 can also include temporal markers such as broadcast timestamps, commercial break indicators, or program identifiers that help establish when the content was originally aired or streamed. In some implementations, the context 248 can include detection of broadcast-specific elements such as network watermarks, chyrons, ticker displays, or picture-in-picture configurations that indicate the content is from a professional broadcast or user-generated video.

The context 248 may include information relating to live events being watched via the live stream, or at which the client device 220 is physically present at a live event. In some implementations, the context 248 can include game state information such as current score, time remaining, possession indicators, down and distance in football games, ball and strike counts in baseball games, or set and game scores in tennis matches, among any other type of game information. The context 248 can include team identification data derived from the image data 232. In some implementations, the context 248 can include weather conditions for outdoor sporting events, such as temperature, precipitation, wind speed, or lighting conditions that might affect gameplay. The context 248 can include crowd reaction indicators derived from audio analysis or visual cues in the image data 232, such as cheering, booing, or standing ovations that might indicate significant game events. In some implementations, the context 248 can include detection of referee signals, official reviews, or other indications for specific game situations/states. The context 248 can be generated through a combination of machine learning model 234 outputs, sensor data from the client device 220, and network-provided information, and can be stored in structured data formats. For example, the context data 248 may be stored as JSON objects, XML data structures, or database records within the local storage 229.

The client device 220 can include at least one local dataset 252. The local dataset 252 can be a predetermined set of values against which the generated values 236 can be matched to identify relevant text data in the environment captured by the capture device 222. In some implementations, the local dataset 252 can include a locally or remotely stored vocabulary of text data that corresponds to attributes or categories associated with live events. The local dataset 252 can include various types of identifiers such as team names, player names, league abbreviations, sport types, venue names, event dates, statistical terms, position designations, tournament names, championship titles, or betting terminology, among others. For example, the local dataset 252 can contain text data such as "baseball," "football," "basketball," "hockey," "leagye," "quarterback," "pitcher," "point guard," "moneyline," "spread," "over/under," "parlay," or team abbreviations, among others. The local dataset 252 can be structured as a dictionary, array, hash table, or other data structure that facilitates efficient matching operations against the generated values 236 extracted from the image data 232.

The local dataset 252 can be provided by the data processing system 205 via the network 210. In some implementations, the data processing system 205 can transmit the local dataset 252 to the client device 220 during an initialization process when the client device 220 first establishes a connection with the data processing system 205. The data processing system 205 can provide updates to the local dataset 252 in response to various triggering events, such as the start of a new sports season, the addition of new teams to a league, changes in player rosters, the introduction of new betting markets, or the creation of new wager opportunities or new fantasy sports contests, among others. For example, the data processing system 205 can update the local dataset 252 to include names of newly drafted players before the start of a sports season, or to add terminology related to special events such as playoffs, championships, or tournaments that occur at specific times of the year. In some implementations, terms or values may be removed from the local dataset 252 by the data processing system 205 in response to various conditions (e.g., athlete retirement, etc.).

The local dataset 252 can be stored within the local storage 229 of the client device 220 to facilitate local comparison operations. In some implementations, the client device 220 can maintain multiple versions of the local dataset 252, each corresponding to different categories of content, such as separate datasets for different sports, leagues, or types of wagering activities. The local dataset 252 can be updated periodically according to a predetermined schedule, such as daily, weekly, or monthly updates that refresh the stored values to maintain relevance with current events. In some implementations, the client device 220 can request updates to the local dataset 252 from the data processing system 205 when the client device 220 detects that a predetermined time period has elapsed since the last update.

The data processing system 205 can include at least one storage 215. The storage 215 can be a computer-readable memory that can store or maintain any of the information described herein. The storage 215 can maintain one or more data structures, which may contain, index, or otherwise store each of the values, pluralities, sets, variables, vectors, numbers, or thresholds described herein. The storage 215 can be accessed using one or more memory addresses, index values, or identifiers of any item, structure, or region maintained in the storage 215. The storage 215 can be accessed by the components of the data processing system 205, or any other computing device described herein, via the network 210. In some implementations, the storage 215 can be internal to the data processing system 205. In some implementations, the storage 215 can exist external to the data processing system 205 and may be accessed via the network 210. For example, the storage 215 may be distributed across many different computer systems (e.g., a cloud computing system) or storage elements and may be accessed via the network 210 or a suitable computer bus interface.

The data processing system 205 can store, in one or more regions of the memory of the data processing system 205, or in the storage 215, the results of any or all computations, determinations, selections, identifications, generations, constructions, or calculations in one or more data structures indexed or identified with appropriate values. Any or all values stored in the storage 215 may be accessed by any computing device described herein, such as the data processing system 205, to perform any of the functionalities or functions described herein. In implementations where the storage 215 forms a part of a cloud computing system, the storage 215 can be a distributed storage medium in a cloud computing system and can be accessed by any of the components of the data processing system 205, by the one or more client devices 220 (e.g., via the user interface similar to that depicted in FIGS. 3A-3C, etc.), or any other computing devices described herein.

The storage 215 can include one or more network profiles 270. The network profiles 270 associated with a user (sometimes referred to herein as a "player") of a client device 220. In some implementations, the network profiles 270 may sometimes be referred to as "player profiles 270". A network profile 270 of a player can be a user profile that includes information about the player and information about one or more of the client devices 220 used to access the data processing system 205 using the network profile 270. For example, identifiers of the network profile 270 can be used to access the functionality of the data processing system 205 (e.g., by logging into the data processing system 205 via one or more web-based interfaces). The identifiers can include a username, a password, an e-mail address, a phone number, a personal identification number (PIN), a secret code-word, device identifiers for use in a two-factor authentication technique, among others.

The network profile 270 can store information about placed wagers (e.g., selected wager opportunities) represented via associations with data records 280 and fantasy sports listings (e.g., lists 285) that are provided/placed/selected by the player via requests 290 transmitted to the data processing system 205. The network profile 270 can store any information about the player, including a credit balance, wager information (e.g., an amount of a wager/side wager, a timestamp associated with a wager/side wager, a client device identifier of a client device 220 that was used to place the wager/side wager, etc.). The network profile 270 can store information about a client device 220 used to access the data processing system 205 such as an IP address, a MAC address, a GUID, a network profile name (e.g., the name of a user of the client device 220, etc.), device name, among others. For example, the network profile 270 can store location information determined based on interactions between each client device 220 and the data processing system 205. In some implementations, the network profile 270 can be created by the data processing system 205 in response to the network profile creation request transmitted by a client device 220. The network profile creation request can include any of the network profile information described herein.

The network profiles 270 can store indications of placed wagers, including wager status information associated with each wager. In some implementations, the network profiles 270 can maintain associations between placed wagers and corresponding data records 280 (and corresponding data record parameters 282) that represent the wager opportunities selected by the player. The wager status information can include details such as whether a wager is active, settled, or pending, the outcome of completed wagers, and any payouts or losses associated with settled wagers. The network profiles 270 can store timestamps indicating when each wager was placed, modified, or settled, allowing for a chronological record of a player's wagering activity. In some implementations, the network profiles 270 can include references to specific events, teams, or athletes associated with each placed wager, facilitating efficient retrieval and display of relevant wager information to the player via the client device 220.

The network profiles 270 can also store information related to fantasy sports activities, including representations of fantasy sports lineups in the form of lists 285. In some implementations, the lists 285 can contain selections 287 that correspond to individual fantasy sports picks made by the player, such as athlete selections for various roster positions in a fantasy sports contest. The network profiles 270 can maintain historical records of past fantasy sports lineups, allowing players to review their previous selections and performance. In some implementations, the network profiles 270 can store additional metadata associated with each selection 287, such as athlete statistics at the time of selection, projected fantasy points, or salary cap values in salary-based contests. The network profiles 270 can also include information about the fantasy sports contests in which the player is participating, such as contest types, entry fees, prize structures, and current standings or points accumulated by the player's fantasy lineups.

The storage 215 can include one or more content items 275. The content items 275 can include graphical elements, display instructions, and/or data structures containing information to be displayed for different data records 280, data record parameters 282, lists 285, selections 287, search results 242, or other displayable content. In some implementations, the content items 275 can include visual representations of wager opportunities, such as moneyline wagers, point spread wagers, over/under wagers, parlay wagers, or prop bets. The content items 275 can include display data/content for fantasy sports contest entries, athlete statistics, team logos, event schedules, venue information, or league standings, among others. The content items 275 may include user interface elements (or display instructions corresponding thereto) that can be transmitted to the client device 220 for presentation via one or more graphical user interfaces, such as the graphical user interfaces 302B and 302C.

The storage 215 can include one or more wager opportunities with one or more wager opportunity parameters. The storage 215 can include one or more wager opportunities with one or more wager opportunity parameters. The wager opportunities can include one or more wager opportunities with associated parameters. The wager opportunities can include event information, identifying the specific live event each wager opportunity is tied to, such as team names, game details, or live event schedules, among others. The wager opportunities can include bet options, including different types of wagers available for each event, such as moneyline, point spread, over/under, prop bets, or futures markets, among others. The wager opportunities can include odds information, for example, the payout ratio associated with each wager opportunity and how much a winning wager would return based on the stake amount. The wager opportunities can include an indication of a live event, which can function as an identifier or reference, pointing to a specific ongoing live event from the available selections.

The wager opportunity parameters can include various attributes that define the characteristics of wager opportunities represented by the wager opportunities. The wager opportunity parameters can include an indication of the type of wager, such as whether the wager opportunity is a parlay or a single bet recommendation, among others. The wager opportunity parameters can include stake amount values, representing the amount of currency to be wagered on a particular outcome. The wager opportunity parameters can include selection identifiers that specify which team, player, or outcome is being wagered upon within a particular event. The wager opportunity parameters can include odds values expressed in various formats such as decimal, fractional, or American odds notation, among others. The wager opportunity parameters can include timestamp information indicating when the wager was placed or when the odds were last updated. The wager opportunity parameters can include status indicators showing whether a wager is active, settled, or pending resolution. The wager opportunity parameters can include payout calculations that determine the potential return if the wager is successful. For example, the wager opportunity parameters can include flags or markers indicating whether a wager opportunity is configured as a parlay with multiple legs or as a single bet. The wager opportunity parameters can include counter values representing the number of wagers placed for each wager opportunity.

In some implementations, odds associated with the wager opportunities in the wager opportunities can be dynamically adjusted based on various factors, such as live event data or changes in betting volume, among others. In some implementations, changes in the state of live events may cause, the data processing system 205 can recalculate and adjust wager odds for affected wager opportunities. In some implementations, the data processing system 205 can track the popularity of specific wager types or specific wager opportunities, such as straight bet wagers, same-game parlay (SGP) wagers, quick SGP wagers, exotic wagers, or proposition wagers, among others. The data processing system 205 can track the number of times the corresponding wager types or wager opportunities have been selected. For example, each wager opportunity in the wager opportunities can include or be associated with a counter that is incremented each time the wager opportunity is placed by a player via the data processing system 205. In some implementations, the counter can be displayed as part of the content items 275 corresponding to one or more wager opportunities of the wager opportunities.

The storage 215 is shown as storing one or more data records 280. The data records 280 may include one or more wager opportunities with one or more associated wager parameters (e.g., data record parameters 282). In some implementations, the data records 280 can include placed wagers (e.g., wager opportunities selected by players), which can be associated with corresponding network profiles 270 of the players. Each data record 280 can represent a placed wager or a wager opportunity corresponding to a corresponding live event (e.g., a sporting event currently being played, an upcoming sporting event that has not yet started, etc.). The data records 280 can store or otherwise be associated with data record parameters 282, which can include information about each placed wager or wager opportunity, such as the associated live event(s), the type of wager/wager opportunity, and/or the outcome selected or possible outcomes for the wager opportunity. For example, a data record 280 can include a wager placed on a football game between Team A and Team B, with the player selecting Team A to win. In another example, a data record 280 corresponding to a wager opportunity may identity football game, and include data record parameters 282 providing possible selectable outcomes for Team A or Team B. The data record parameters 282 can also include additional information such as the date and time the wager was placed, the odds at the time of placement or current odds of the wager opportunity, and any conditions applied to the wager. In some implementations, the data record parameters 282 can specify the type of the wager or wager opportunity, such as moneyline wagers, point spread wagers, over/under wagers, parlay wagers, prop bets, or futures wagers, among others. The data records 280 may include multiple wager opportunities, such as selections of multiple outcomes for a tournament bracket or similar combination of selections for wager(s) having multiple outcomes (e.g., parlay wagers, exotic wagers, progressive parlay wagers, etc.).

The data record parameters 282 associated with these wagers/wager opportunities can include various attributes that define the characteristics of the placed wager or wager opportunity. For example, the data record parameters 282 can include the amount wagered by the player and/or possible wagering limits for wager opportunities, which can be stored as a numerical value representing the stake in a specified currency. The data record parameters 282 can also include the specific wager selections made by the player or possible outcome selections for wager opportunities, such as the team or athlete chosen in a moneyline bet, the point spread selected in a spread bet, or the combination of selections in a parlay wager. In some implementations, the data record parameters 282 can include odds values associated with each selection or possible selection, which can be represented in various formats such as decimal odds, fractional odds, or American odds notation. The data record parameters 282 can include timestamp information indicating when the wager was placed, when the wager opportunity expires, and/or when the odds were last updated. In some implementations, the data record parameters 282 can include status indicators showing whether a wager is active, settled, or pending resolution, or whether the wager opportunity is still available to wager on. The data record parameters 282 can include potential payout calculations that determine the return if one or more selected outcomes of the wager is successful. The data processing system 205 can use these data record parameters 282 to manage, process, place, or otherwise display wagers, update player balances, and/or provide accurate information to players about their active and past wagers or available wager opportunities.

The data records 280 can be stored within the storage 215 according to any suitable format or hierarchy. In some implementations, the data records 280 can be indexed by according to the identifier of the corresponding network profile 270 of the player. In some implementations, one or more of the data records 280 representing wager opportunities can be indexed by wager opportunity identifier, semantic content information, or other attributes of the wager opportunities. In some implementations, the data records 280 can be categorized by sport type, league, or competition. The data processing system 205 can maintain historical data records 280 for completed wagers, and may store indications of the current status of each data record (e.g., open, closed, etc.). In some implementations, the data records 280 can include references to specific content items 275 and/or search results 242 that were presented to the player when a corresponding wager was placed or when a corresponding wager opportunity was provided to a client device 220. The data records 280 can be accessed by any of the components of the data processing system 102 to perform various operations, such as wager opportunities, placing wagers, updating wager statuses, or calculating payouts for successful wagers, among others.

The storage 215 can include one or more lists 285. The lists 285 can include fantasy sports lineups created by players, such as daily fantasy sports lineups, season-long fantasy sports rosters, tournament brackets, or prediction lists, among others. The lists 285 can be stored in association with corresponding network profiles 270 of players that create the lists 285. In some implementations, the lists 285 can be associated with contest identifiers that identify fantasy sports contests in which the lists 285 are entered. The network profiles 270 can be stored in association with the same contest identifiers to maintain relationships between players and their contest entries. The lists 285 can be represented via content items 275 that provide visual representations of the fantasy sports lineups for display via graphical user interfaces on client devices 220. In some implementations, the data processing system 205 can generate and store multiple versions of the lists 285 for each player, with each version corresponding to a different fantasy sports contest, a different sport type, or a different contest format, among others.

The lists 285 can include one or more selections 287. The selections 287 can be selections of athletes, teams, game outcomes, statistical performance metrics, or other fantasy sports elements for a given lineup. The selections 287 can be selected from a pool of available athletes, teams, or other selectable elements. In some implementations, the selections 287 can be made by players via interactive interfaces on client devices 220, such as dropdown menus, searchable athlete databases, drag-and-drop interfaces, or category-filtered selection screens, among others. The selections 287 can include metadata such as athlete positions, team affiliations, salary cap values in salary-based contests, projected fantasy points, or historical performance statistics, among others. In some implementations, the selections 287 can be associated with specific roster positions within a fantasy sports lineup, such as quarterback, pitcher, center, goalie, or flex positions, among others. The selections 287 can be stored in structured data formats that facilitate efficient retrieval and presentation of the fantasy sports lineups via the content items 275 displayed on client devices 220.

Referring now the operations of the client device 220 to perform image-based network search operations, the client device 220 can capture image data 232 depicting an environment. The client device 220 can initiate image-based search operations in response to various user interactions with a graphical user interface (e.g., graphical user interface 302A, etc.) of an application executing on the client device. In some implementations, the client device 220 can detect a selection of the image-based search button displayed within the graphical user interface, which can trigger activation of the capture device 222 to begin capturing image data 232. The client device 220 can also initiate image-based search operations upon detecting a specific gesture on a touchscreen display, such as a long press on the search field 306, a swipe from the edge of the display, or a predefined multi-finger gesture, among others. In some implementations, the client device 220 can initiate image-based search operations based on voice commands received through a microphone of the client device 220, where the voice commands can include specific phrases such as "search what I see," "identify this game," or "find this team," among others.

The capture device 222 can capture image data 232 representing an environment. The capture device 222 can capture the image data 232 in real-time or near real-time, such that the image data 232 represents current visual information from the environment. In some implementations, the capture device 222 can continuously capture frames of image data 232 at a predetermined frame rate, such as fifteen frames per second, thirty frames per second, or sixty frames per second, among others. The image data 232 captured by the capture device 222 can be presented to a user via a graphical user interface (e.g., the graphical user interface 302B of FIG. 3B). The interface provider 228 can update the graphical user interface to display the captured image data 232 in real-time, such that the player can view the image data 232 as it is captured.

The value generator 224 can generate a set of values 236 from the image data 232. To do so, the value generator 224 can provide at least a subset of the pixels of the image data 232 as input to a machine-learning model 234. In some implementations, the value generator 224 can process the image data 232 by dividing the plurality of pixels into regions corresponding to different visual elements within the environment. In such implementations, the value generator 224 can process each region separately using the machine-learning model 234 to identify specific features such as text characters, logos, uniform colors, or other visual indicators that can be converted into the set of values 236. The value generator 224 can assign confidence scores to each generated value based on the clarity and consistency of the corresponding visual elements in the image data 232. The machine-learning model 234 may be an object detection model, an OCR model, or a multi-modal language model 234.

In some implementations, the machine-learning model 234 is an object detection model that can generate a classification of at least one object represented in the image data 232. The classification may be provided as at least one value 236. The object detection model can process the pixels of the image data 232 to identify and classify various visual elements such as team logos, sports equipment, playing surfaces, or athlete uniforms, among others. In some implementations, the machine-learning model 234 can assign confidence scores to each classification, indicating the probability that the detected object belongs to a particular category. The confidence scores can be used to rank multiple detected objects within the image data 232, with higher-confidence classifications prioritized when generating the values 236. The machine-learning model 234 can be trained on datasets containing sports-specific imagery to improve classification accuracy for objects commonly found in sporting events, broadcasts, or related media.

The value generator 224 can generate the set of values 236 based on the classifications produced by the object detection model. In some implementations, the value generator 224 can map each classification to a corresponding value 236 using a predefined lookup table or dictionary. For example, a classification of "football" can be mapped to a value 236 representing the sport type. The value generator 224 can assign confidence scores to each generated value 236 based on the confidence scores associated with the corresponding classifications. In some implementations, the value generator 224 can apply thresholding to filter out low-confidence classifications, such that only classifications exceeding a predetermined confidence threshold are used to generate values 236. In some implementations, the value generator 224 can combine multiple related classifications to generate a single value 236. For example, classifications of multiple player uniforms can be aggregated to generate a value 236 representing a specific team. The generated values 236 can include textual labels, numerical codes, or structured data objects that encapsulate the semantic information derived from the classifications of the object detection model.

In some implementations, the value generator 224 can generate the set of values 236 based at least on a token output by a multi-modal language model 234. The multi-modal language model 234 can process visual and/or textual information simultaneously to generate contextually relevant tokens that capture semantic meaning represented in the pixels of the image data 232. For example, the multi-modal language model 234 can be instructed to analyze the pixels of the image data 232 to generate tokens representing any detected team names, player positions, game situations, or scoring opportunities, even when explicit text may not be present in the image data 232. In some implementations, the local dataset 252 or a portion thereof may be provided as input to the multimodal machine-learning model 234. In some implementations, the value generator 224 can the generated tokens into structured values 236 that can be matched against the local dataset 252 for subsequent search operations. For example, tokens may numerically represent one or more words, characters, symbols, phrases, or partial words. The value generator 224 can use the mapping to reconstruct a sequence of text data, which may include values 236 and delimiters or other characters separating the detected values 236.

In some implementations, the value generator 224 can implement various preprocessing techniques before providing the image data 232 to the machine-learning model 234. In some implementations, the value generator 224 can apply image processing functions to the image data 232 improve contrast, reduce noise, and/or correct perspective distortion in the image data 232. In some implementations, the value generator 224 can one or more segmentation functions with the image data 232 based on color distributions and/or edge detection to isolate regions of interest before processing. Pre-processing can be used to improve the accuracy of the machine-learning model 234 in generating the set of values 236.

In some implementations, the value generator 224 can generate one or more values 236 if a corresponding feature is depicted in multiple frames of image data 232 over a predetermined period of time or a predetermined number of consecutive frames. The value generator 224 can use the machine-learning model 234 analyze a sequence of frames captured by the capture device 222 to identify persistent visual elements that appear consistently across the frames. For example, the value generator 224 can track the presence of text data, or of visual features such as a specific team logo, player jersey, or scoreboard information across multiple frames to ensure the detected text/feature is not a transient or erroneous detection. The predetermined period of time can be stored in configuration settings, and may be based on factors such as the frame rate of the capture device 222, in some implementations.

The value generator 224 can filter the set of values by matching a subset of the set of values to one or more predetermined values of the local dataset 252. The value generator 224 can compare each value 236 generated from the image data 232 against the predetermined values stored in the local dataset 252 to identify matches or partial matches. In some implementations, the value generator 224 can apply various matching algorithms, such as exact string matching, fuzzy matching, or semantic similarity comparisons, to determine whether a generated value 236 corresponds to a predetermined value in the local dataset 252. The value generator 224 can assign confidence scores to each match based on the degree of similarity between the generated value 236 and the corresponding predetermined value. The filtering process can reduce the set of values 236 to a subset that includes those values associate with live events or other relevant features defined in the local dataset 252.

In some implementations, the filtering operation can prioritize values 236 with higher confidence scores or greater relevance to the current context 248. In some implementations, the value generator 224 can apply contextual filters based on the context attributes 254, such that values 236 related to the current location, time, or user preferences receive higher priority during the matching process. The value generator 224 can exclude values 236 that fall below a predetermined confidence threshold or that do not match any predetermined value in the local dataset 252. The filtered subset of values can be presented to the user via a graphical user interface (e.g., the graphical user interface 302B of FIG. 3B), for example, using interactive user interface elements.

The interface provider 228 can update the graphical user interface to present the set of values with the image data 232 captured by the capture device 222. The interface provider 228 can generate a visual representation of the set of values 236 alongside the image data 232, such that a player can view both the captured environment and the extracted values 236 in the graphical user interface (e.g., the graphical user interface 302B of FIG. 3B). In some implementations, the interface provider 228 can arrange the set of values 236 in a designated region of the graphical user interface, with each value displayed as a selectable element. In some implementations, the interface provider 228 can apply visual formatting to the set of values 236, such as distinctive backgrounds, borders, or text styles, to differentiate the values from other elements of the graphical user interface. In some implementations, the interface provider 228 can position the set of values 236 in a manner that minimizes obstruction of the image data 232, for example, withing a predetermined region of the graphical user interface.

The interface provider 228 can enable user interactions with the presented set of values 236. In some implementations, the interface provider 228 can detect selection events on individual values within the set of values 236 and modify the visual appearance of selected values to indicate their selection status. The interface provider 228 can transmit indications of selected values to the request manager 226 for use in search operations, as described herein. In some implementations, the interface provider 228 can update the presentation of the set of values 236 based on changes in the image data 232, such as when the capture device 222 captures image data 232 of a different portion of the environment. In some implementations, the interface provider 228 can animate transitions between different sets of values 236 when the value generator 224 produces updated values 236 from newly captured image data 232. In some implementations, the interface provider 228 can maintain the presentation of the set of values 236 even when the image data 232 is no longer displayed, such as after a search operation has been executed.

In some implementations, the interface provider 228 can rank the values 236 presented in the graphical user interface. The interface provider 228 can determine rankings for the values 236 based on various metrics, such as proximity of detected features to the capture device 222 or confidence scores generated by the machine-learning model 234. In some implementations, the interface provider 228 can rank the values 236 according to predetermined ranking criteria specified in the local dataset 252, such that values 236 associated with specified teams, live events, or categories receive higher rankings. In some implementations, the interface provider 228 can rank the values 236 based on the frequency with which the values 236 appear in the image data 232, with more frequently detected values 236 receiving higher rankings than values 236 detected only once or twice in the image data 232.

The interface provider 228 can apply the rankings to determine the visual presentation of the values 236 within the graphical user interface. In some implementations, the interface provider 228 can arrange the values 236 in order of their rankings, with higher-ranked values positioned more prominently, such as at the beginning of a list or in a more visible location. In some implementations, the interface provider 228 can apply different visual styling to values 236 based on their rankings, such as using larger font sizes, brighter colors, or distinctive borders for higher-ranked values. In some implementations, the interface provider 228 can filter the values 236 based on the rankings, such that only values 236 exceeding a predetermined ranking threshold are presented in the graphical user interface. The rankings can be dynamically updated as new image data 232 is processed, with the interface provider 228 adjusting the presentation of the values 236 to reflect changes in the rankings over time.

The request manager 226 can execute a search operation according to at least one value 236 of the subset of the presented values 236 to generate a set of search results 242 presented via a corresponding set of content items 275. The request manager 226 can execute the search operation by transmitting a search request 290 to the data processing system 205 via the network 210. In some implementations, the search request 290 can include the at least one value 236 of the subset of the set of values as a search parameter. The data processing system 205 can process the search request 290 using the search executor 240 to identify relevant wager opportunities, fantasy sports contests, and/or fantasy sports lineup selections that correspond to the search parameter. The data processing system 205 can transmit the identified wager opportunities, fantasy sports contests, and/or fantasy sports lineup selections (and/or content items 275 associated therewith) to the client device 220 as search results 242 in a response 292. The search results 242 can include various types of content items 275, such as wager opportunities, fantasy sports contests, live event information, team statistics, or player information, among others.

The request manager 226 can execute the search operation in response to various triggering events. In some implementations, the request manager 226 can execute the search operation in response to detecting a selection of a value from the subset of the set of values via the graphical user interface. The request manager 226 can detect the selection when a user interacts with a visual representation of the value displayed on the client device 220. In some implementations, the request manager 226 can execute the search operation automatically upon determining that the subset of the set of values includes at least one value that exceeds a predetermined confidence threshold. In some implementations, the request manager 226 can also execute the search operation in response to detecting a specific gesture on a touchscreen display of the client device 220, such as a swipe gesture or a tap gesture on a designated region of the graphical user interface.

The device communicator 230 can receive the request 290 transmitted by the client device 220 via the network 210. In some implementations, the device communicator 230 can parse the received request 290 to extract search parameters, for example, the at least one value 236 selected to generate the search request 290. The device communicator 230 can validate the received request 290 to verify the request 290 contains all required fields and adheres to a predetermined format. In some implementations, the device communicator 230 can authenticate the request 290 using credentials or tokens associated with the client device 220 or a user profile. The device communicator 230 can log metadata about the received request 290, such as timestamp information, client device identifiers, or network information.

In some implementations, the device communicator 230 can authenticate the request 290 as corresponding to a network profile 270. The device communicator 230 can extract authentication information from the request 290, such as a username, password, session/authentication/access token, or device identifier, among others. The device communicator 230 can compare the extracted authentication information against credentials stored in association with network profiles 270 maintained in the storage 215. For example, the device communicator 230 can verify that a provided username and password combination matches login credentials associated with a particular network profile 270. In some implementations, the device communicator 230 can validate a session token included in the request 290 to confirm that the client device 220 has an active authenticated session corresponding to a network profile 270. In some implementations, the device communicator 230 can use multi-factor authentication techniques, such as verifying a combination of a password and a temporary code sent to a registered device or email address associated with the network profile 270. Upon successful authentication, the device communicator 230 can associate the request 290 with the corresponding network profile 270, allowing the data processing system 205 to access user-specific data and/or configuration settings when processing the request 290.

The search executor 240 can perform various search operations to generate search results 242 based on the parameters extracted from the request 290. In some implementations, the search executor 240 can query one or more databases containing wager opportunities, fantasy sports contests, and fantasy sports lineup selections using the extracted search parameters. The search executor 240 can apply filtering criteria to select the search results based on factors such as relevance scores, player preferences stored in network profiles 270, and/or contextual information (e.g., search category such as wager opportunities, lineups, lineup selections, contests, or information, among others) provided in the request 290. In some implementations, the search executor 240 can perform natural language processing on the search parameters to identify related terms or concepts that may expand the search scope. The search executor 240 can rank the search results based on various factors, such as relevance to the search parameters or popularity of the corresponding results. In some implementations, the search executor 240 can select the search results based on historical players interactions or preferences associated with the client device 220 or the corresponding network profile 270.

The data provider 250 can retrieve the identified search results 242 and associated content items 275 from the storage 215. In some implementations, the data provider 250 can access the content items 275 stored in the storage 215 that correspond to the identified wager opportunities, fantasy sports contests, and fantasy sports lineup selections. The data provider 250 can package the retrieved content items 275 as part of the search results 242 into a response 292 for transmission to the client device 220. In some implementations, the data provider 250 can apply formatting or transformation operations to the content items 275 to facilitate their presentation on the client device 220, for example, by providing operations such as resizing images, compressing data, or generating device-specific layouts. The data provider 250 can also include additional metadata with the search results 242 and content items 275, such as relevance scores, timestamps, and/or category information, among others. In some implementations, the data provider 250 can prioritize or limit the number of content items 275 included in the response 292 based on factors such as network bandwidth constraints, device capabilities of the client device 220, or preferences stored in the corresponding network profile 270.

The interface provider 228 of the client device 220 can receive the response 292 from the data processing system 205 and present the search results 242 as a set of content items 275 on the graphical user interface. The interface provider 228 can arrange the content items 275 according to relevance scores or rankings provided by the data processing system 205. In some implementations, the interface provider 228 can apply visual formatting to distinguish different types of content items 275, such as using different backgrounds, borders, or text styles for wager opportunities versus fantasy sports contests. The interface provider 228 can enable user interactions with the presented content items 275, detecting selection events on individual content items 275 and modifying their visual appearance to indicate selection status. The interface provider 228 can transmit indications of selected content items 275 to the request manager 226 for use in subsequent operations, such as generating data records 280 or executing other operations.

The request manager 226 can detect an interaction with a first content item 275 of the presented set of content items 275. The request manager 226 can determine that the interaction corresponds to a selection of the first content item 275, such as a tap gesture on a touchscreen display of the client device 220, a mouse click, or a keyboard input, among others. In some implementations, the request manager 226 can validate the selection by presenting a confirmation prompt via the interface provider 228, requiring additional user input to confirm the selection. The request manager 226 can formulate a request 290 based on the selected content item 275, including parameters such as wager type, wager amount, team selection, or contest entry information, among others. The parameters may be specified, for example, via one or more additional interactive elements presented to the player via the graphical user interface prior to transmitting the request 290. The request manager 226 can transmit the request 290 to the data processing system 205 via the network 210, causing the data processing system 205 to generate a corresponding data record 280 associated with the network profile 270 of the user. The data processing system 205 can then transmit a confirmation response 292 to the client device 220, which the interface provider 228 can present to indicate successful execution of the requested operation.

The device communicator 230 can receive the request 290 to generate the data record 280 from the client device 220 via the network 210. The device communicator 230 can parse the received request 290 to extract parameters for the data record 280, such as wager type, wager amount, team selection, event identifier, or odds values, among others. In some implementations, the device communicator 230 can validate the extracted parameters against predetermined validation rules to verify that the parameters conform to expected formats and value ranges. The device communicator 230 can authenticate the request 290 using credentials or tokens included in the request 290, associating the request 290 with a corresponding network profile 270, as described herein. The device communicator 230 can log metadata about the received request 290, including timestamp information, client device identifiers, and network information. The device communicator 230 can forward the extracted parameters and the associated network profile identifier to the data manager 260 for processing. In some implementations, the device communicator 230 can perform additional security checks, such as verifying that the client device 220 has sufficient permissions to create the requested data record 280 or confirming that rate limits for request submissions have not been exceeded.

The data manager 260 can generate the data record 280 with corresponding data record parameters 282 based on the information received from the device communicator 230. The data manager 260 can create a new data structure in the storage 215 to represent the data record 280, populating the data structure with the extracted parameters as data record parameters 282. In some implementations, the data manager 260 can assign an identifier to the data record 280 that may be stored in association with the corresponding network profile 270. The data manager 260 can update the network profile 270 associated with the request 290 to include a reference to the newly created data record 280. In some implementations, the data manager 260 can update account balance information within the network profile 270 to reflect any financial transactions associated with the data record 280, such as deducting a wager amount from an available balance. The data manager 260 can store additional metadata with the data record 280, such as creation timestamp, status indicators showing the wager as active, and potential payout calculations. In some implementations, the data manager 260 can trigger notification processes to inform the player of successful data record creation via a response 292 transmitted back to the client device 220 through the device communicator 230.

The data manager 260 can perform similar operations to generate a list 285, such as a fantasy sports lineup, based on a corresponding request 290 received from the client device 220. The data manager 260 can create a new data structure in the storage 215 to represent the list 285, populating the data structure with one or more selections 287 extracted from the request 290. In some implementations, the data manager 260 can validate each selection 287 against predefined rules or constraints, such as position limits, salary cap restrictions, or player eligibility criteria for one or more fantasy sports contests. In some implementations, the data manager 260 can assign an identifier to the list 285 for subsequent reference and retrieval. The data manager 260 can update the network profile 270 associated with the request 290 to include a reference to the newly created list 285. In some implementations, the data manager 260 can store additional metadata with the list 285, such as creation timestamp or a contest identifier. The data manager 260 can trigger the data provider 250 to retrieve relevant content items 275 associated with the selections 287, such as player statistics, recent performance data, or injury reports, among others. The data provider 250 can package these content items 275 as part of the search results 242 in a response 292 transmitted back to the client device 220 through the device communicator 230, causing the interface provider 228 to present detailed about the created fantasy sports lineup via one or more graphical user interfaces.

In some implementations, the data processing system 205 and the client device 220 can perform various operations in a distributed manner, with the allocation of tasks between the data processing system 205 and the client device 220 being interchangeable in various implementations. Although certain operations are described as being performed by the client device 220, it can be understood that any operation described herein as being performed by the client device 220 may instead be performed by the data processing system 205, or vice versa. Such operations can be facilitated by communications between the data processing system 205 and the client device 220 via the network 210.

Figure 3A:
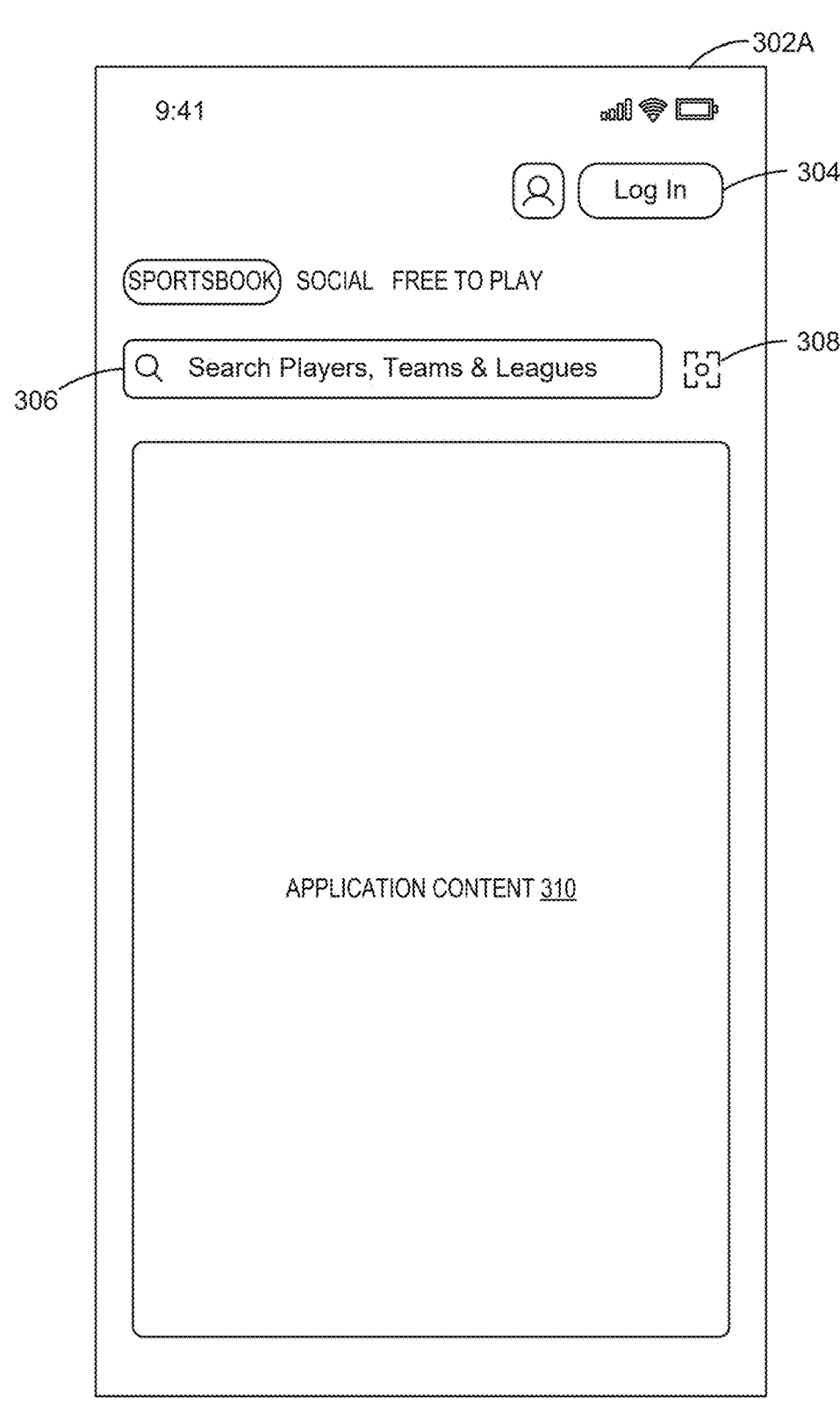
FIG. 3A shows a first graphical user interface for image-based network operations, in accordance with one or more implementations.

Referring now to FIG. 3A, illustrated is a first graphical user interface 302A for image-based network operations, in accordance with one or more implementations. The graphical user interface 302A may be presented, for example, via one or more applications executed by the client device 220 of FIG. 2. The graphical user interface 302A can include at least one login button 304, at least one search field 306, at least one image-based search button 308, and at least one application content region 310.

The graphical user interface 302A can display various elements for image-based network operations. The graphical user interface 302A can include a login button 304 positioned at the top portion of the display, which when interacted with can cause the application to communicate with one or more servers (e.g., the data processing system 205) to authenticate a player (e.g., logging in using a network profile 270). The graphical user interface 302A can present navigation options for various including categories. The graphical user interface 302A can include a search field 306 with placeholder text "Search Players, Teams & Leagues" that can receive text-based queries. The graphical user interface 302A can include an image-based search button 308, which in this example is positioned adjacent to the search field 306.

The graphical user interface 302A can include an application content region 310 occupying the majority of the screen area below the search field 306 and image-based search button 308. The application content region 310 can display various types of content such as sports information, betting opportunities, or fantasy sports lineups, among others. The application content region 310 can be updated dynamically based on interactions with other elements of the graphical user interface 302A. Upon receiving an interaction with the image-based search button 308, the graphical user interface 300A can transition to the graphical user interface 300B of FIG. 2.

Figure 3B:
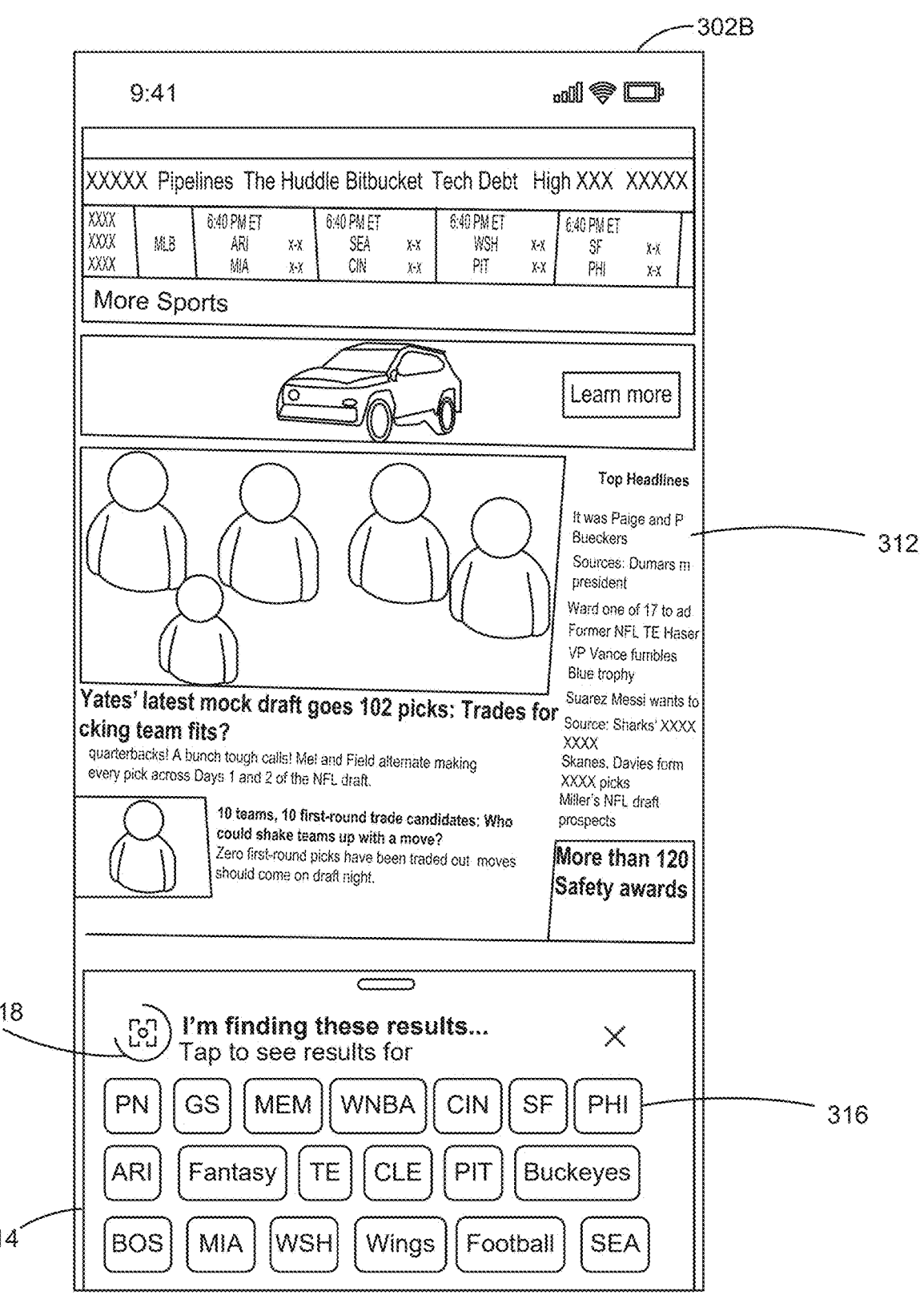
FIG. 3B shows a second graphical user interface for image-based network operations, in accordance with one or more implementations.

Referring now to FIG. 3B, illustrated is a second graphical user interface 302B for image-based network operations, in accordance with one or more implementations. The graphical user interface 302A may be presented, for example, via one or more applications executed by the client device 220 of FIG. 2. The graphical user interface 302B can include at least one image data region 312, at least one value region 314 containing one or more values 316, and at least one timer indicator 318.

The graphical user interface 302B can display various elements for image-based network operations. The graphical user interface 302B can include an image data region 312 the screen area which can present captured visual content (e.g., image data 232) from the environment. The image data region 312 can present real-time or near real-time visual information captured by a capture device (e.g., the capture device 222), The graphical user interface 302B can maintain the display of the image data region 312 while presenting extracted information in other regions of the interface, such as the value region 314. The value region 314 can be positioned at the bottom portion of the display, in this example. The value region 314 can include multiple values 316 (e.g., graphical representations of values 236) and can be presented as interactive elements such as buttons, chips, or selectable text items, among others.

The values 316 can represent attributes or categories extracted from the visual content displayed in the image data region 312. In some implementations, the values 316 in the value region 314 can be presented a horizontal scrollable arrangement to accommodate numerous extracted values. The values 316 within the value region 314 can be interactive and selectable to initiate search operations based on the selected values 316. In some implementations, the graphical user interface 302B can include a timer indicator 318. The timer indicator 318 can display visual feedback about processing status, and may indicate an amount of time until the values 316 in the value region 314 are refreshed/replaced with new values 316 based on the image data captured by the capture device, as described herein.

In some implementations, the timer indicator 318 can present a visual representation of a countdown timer, such as a circular progress bar, a horizontal/vertical progress bar, an animated icon, or numerical countdown that indicates when processing of new image data will be performed. In some implementations, the timer indicator 318 can include interactive elements such as a close button that allows users to dismiss the indicator or cancel ongoing processing operations. In some implementations, the timer indicator 318 can change appearance or display different messages based on the current stage of image processing. Upon an interaction with one of the values 316 presented in the value region 314, a search operation can be initiated and the graphical user interface 302B can transition to the graphical user interface 302C of FIG. 3C.

Figure 3C:
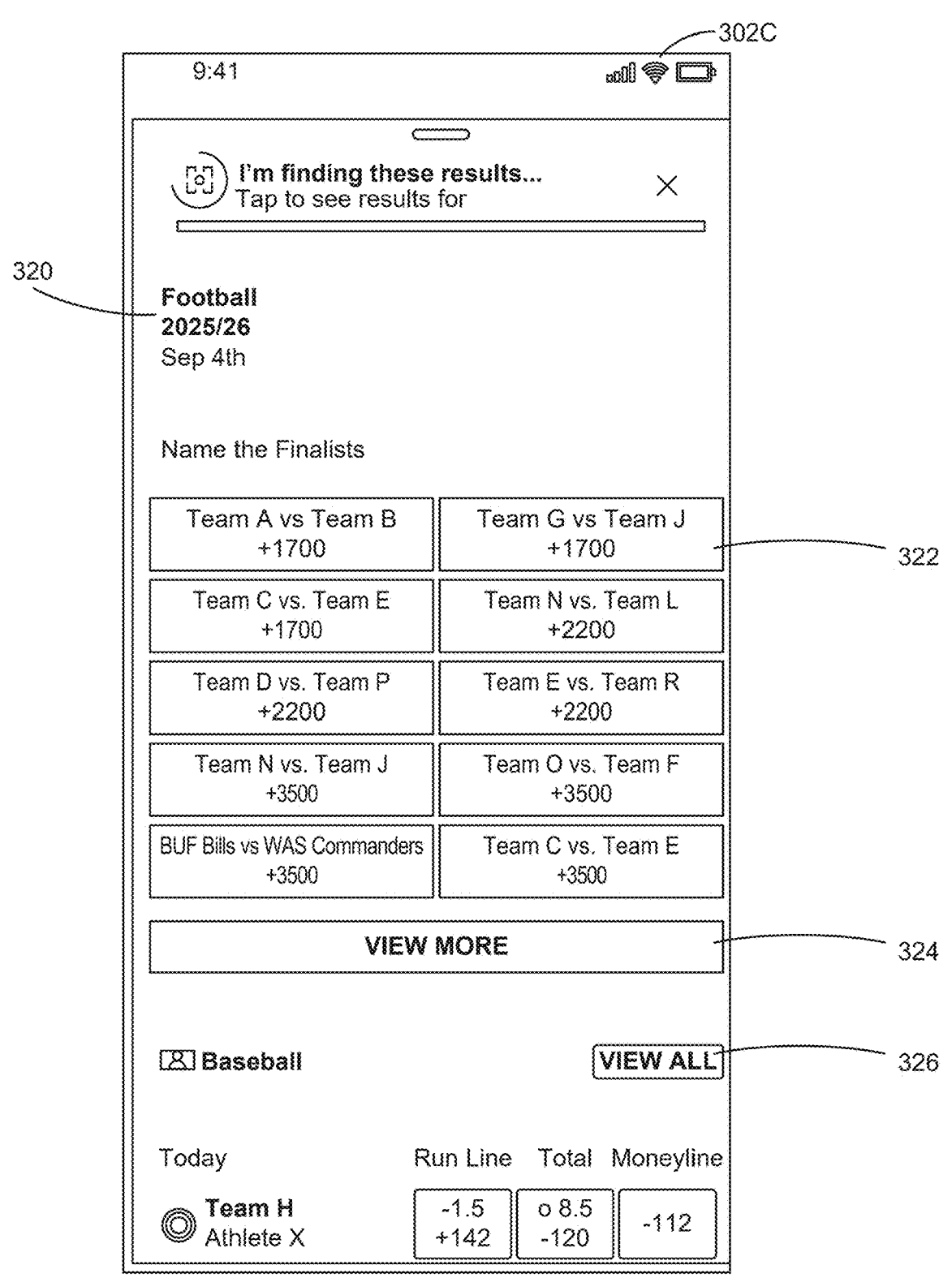
FIG. 3C shows a third graphical user interface for image-based network operations, in accordance with one or more implementations.

Referring now to FIG. 3C, illustrated is a third graphical user interface 302C for image-based network operations, in accordance with one or more implementations. The graphical user interface 302A may be presented, for example, via one or more applications executed by the client device 220 of FIG. 2. The graphical user interface 302C can include at least one selected value 320, one or more search results 322, at least one view more button 324, and at least one category view button 326.

The graphical user interface 302C can display various elements for image-based network operations. The graphical user interface 302C can include a selected value 320 positioned at the top portion of the display, which in this example presents information about a selected search parameter such as a sport type and associated date. The graphical user interface 302C can maintain the display of the selected value 320 while presenting search results in other regions of the interface, providing context for the displayed content. The graphical user interface 302C can include search results 322 (e.g., search results 242, content items 275, etc.) displayed below the selected value 320. The search results 322 can be presented in a structured format showing various content items related to the selected value 320. In this example, the search results 322 correspond to various wager opportunities. In some implementations, the search results 322 can be arranged in rows or grid layouts to facilitate comparison between different options. The search results 322 can include numerical values associated with each content item, such as point spreads, moneyline odds, or over/under totals for sporting events, among other wager parameters.

The graphical user interface 302C can include a view more button 324 positioned at the bottom of the search results 322 section, which when interacted with can cause the application to display additional search results beyond those initially presented. The graphical user interface 302C can include a category view button 326 positioned below the view more button 324. The category view button 326 can display a label indicating an alternative content category, such as a different sport type, and, when interacted with, can cause the graphical user interface 302C to navigate to a listing of content within that category. In some implementations, the category view button 326 can be followed by a preview of content from the indicated category.

Referring now to FIG. 4, depicted is an illustrative flow diagram of a method 400 of image-based network operations, in accordance with one or more implementations. The method 400 can be executed, performed, or otherwise carried out by any of the computing systems or devices described herein. In brief overview of the method 400, the method 400 can include receiving image data from a capture device (STEP 402), generating a set of values from the received image data (STEP 404), filtering the set of values by matching a subset of the set of values to one or more predetermined values (STEP 406), executing a search operation according to at least one value of the subset of the set of values (STEP 408), and updating a graphical user interface to present at least a subset of the plurality of content items (STEP 410).

The method 400 can include receiving image data (e.g., image data 232) from a capture device (e.g., a capture device 222) (STEP 402). To do so, any of the operations described in connection with the client device 220 and/or the capture device 222 of FIG. 2 may be performed. The capture device can capture one or more frames of image data at a predetermined frame rate, such as fifteen frames per second, thirty frames per second, or sixty frames per second, among others. The image data can include pixels representing visual content from an environment, which may include text, objects, or other visual elements that can be processed to extract information relevant to live events, in some circumstances.

The received image data can be stored in a local storage of a computing device executing the method 400. In some implementations, the image data can be captured transiently, such that the image data is processed in real-time but may not be stored for greater than a predetermined time period, for example, five seconds, ten seconds, or thirty seconds, among others. In some implementations, the image data can be captured in response to selecting an interface element presented on the computing device executing the method 400, such as an interaction with an interactive element corresponding to image-based search operations.

The method 400 can include generating a set of values (e.g., values 236) from the received image data (STEP 404). To do so, any of the operations described in connection with the client device 220 and/or the value generator 224 of FIG. 2 may be performed. The set of values can be generated by providing at least a subset of the pixels of the image data as input to a machine-learning model (e.g., a machine-learning model 234). The machine-learning model can process the image data to identify specific features such as text characters, logos, uniform colors, or other visual indicators that can be converted into the set of values.

In some implementations, the machine-learning model can include an OCR model that can identify and extract alphanumeric characters from the image data. In some implementations, the machine-learning model can include an object detection model that can generate classifications of objects represented in the plurality of pixels. In some implementations, the machine-learning model can include a multi-modal language model that can process visual information to generate tokens that capture semantic meaning represented in the pixels of the image data. The generated set of values can include text identifiers, team names, player names, event dates, numerical statistics, sport types, league abbreviations, classifications, or other text/category data that can be compared with predetermined values.

The method 400 can include filtering the set of values by matching a subset of the set of values to one or more predetermined values (e.g., the local dataset 252) (STEP 406). To do so, any of the operations described in connection with the client device 220 and/or the value generator 224 of FIG. 2 may be performed. The filtering can be performed by comparing each value generated from the image data against the predetermined values to identify matches or partial matches. The predetermined values can include a vocabulary of text data that corresponds to attributes or categories associated with live events, such as team names, player names, league abbreviations, sport types, venue names, event dates, statistical terms, position designations, tournament names, championship titles, or betting terminology, among others.

In some implementations, the filtering operation can apply various matching algorithms, such as exact string matching, fuzzy matching, or semantic similarity comparisons, to determine whether a generated value corresponds to a predetermined value. The filtering process can reduce the set of values to a subset that includes those values associated with live events or other relevant features defined in the predetermined values. In some implementations, the filtering operation can prioritize values with higher confidence scores or greater relevance to the current context. The filtered subset of values can be presented to a user via a graphical user interface, for example, using interactive user interface elements that can be selected to initiate search operations, as described herein.

The method 400 can include executing a search operation (according to at least one value of the subset of the set of values (STEP 408). To do so, any of the operations described in connection with the client device 220 and/or the request manager of FIG. 2 may be performed. The search operation can be executed by transmitting a search request to a data processing system via a network. The search request can include the at least one value of the subset of the set of values as a search parameter, which can be used to identify relevant content items corresponding to live events.

The search operation can be executed in response to various triggering events. In some implementations, the search operation can be executed in response to detecting a selection of a value from the subset of the set of values via the graphical user interface. In some implementations, the search operation can be executed automatically upon determining that the subset of the set of values includes at least one value that exceeds a predetermined confidence threshold. The search operation can generate a set of search results comprising a plurality of content items, with each content item corresponding to a respective live event of a plurality of live events. The content items can include various types of information, such as wager opportunities, fantasy sports contests, live event information, team statistics, or player information, among others, as described herein.

The method 400 can include updating a graphical user interface (e.g., the graphical user interface 302C) to present at least a subset of content items (e.g., content items 275) received as search results (e.g., search results 242) (STEP 410). The graphical user interface can be updated to display the content items in a structured format, with each content item presented as a selectable element that can be interacted with to perform additional operations, which may include placing a wager, generating a fantasy sports lineup or making adding a selected athlete to a fantasy sports lineup, or entering a fantasy sports lineup into a fantasy sports contest, among others. In some implementations, the content items can be arranged according to relevance scores or rankings provided by the server(s) (e.g., the data processing system 205) that executed the search operation.

The graphical user interface can present content items as interactive user interface elements. In some implementations, the graphical user interface can include additional elements such as a selected value indicator that displays information about the search parameter used to generate the search results, a view more button that can be interacted with to display additional content items, or category view buttons that can be used to navigate to different categories of content. In some implementations, the graphical user interface showing the search results can be closed to perform additional image-based search operations as described herein.

C. Systems and Methods for Local Network Search Optimization Based on Timers

Various aspects of the present disclosure may implement the use of timers to improve the performance of image-based network operations. As described herein, image data can be processed to derive values that may be used to perform network search operations. However, processing every frame of image data can be challenging because the framerate of the capture device may provide image data at rates that exceed the processing capabilities of certain computing devices. The use of timers to process images at predetermined intervals, rather than processing every frame of image data, can provide significant technical improvements in image-based network operations.

By limiting the processing of image data to specific time intervals, the system can optimize the balance between providing up-to-date information and conserving device resources. In some implementations, the timer can be initialized to a predetermined value, such as 30 seconds, and can count down to zero or another threshold value that indicates expiration of the timer. During the countdown period, the capture device may continue to capture image data, but the captured image may be restricted from further processing. The timer-based approach can improve the computational efficiency of system efficiency by reducing redundant processing of similar or identical image frames. Further details of such computational improvements are described herein.

Referring back to FIG. 2, in the context of local network search optimization based on timers, the client device 220 can execute the capture device 222 to capture image data 232 representing an environment, as described herein. The timer-based optimization techniques may be implemented when performing an image-based search according to the techniques described herein. For example, the capture device 222 can capture image data 232 in response to one or more user interactions with a graphical user interface of an application executing on the client device 220. The capture device 222 can capture the image data 232 continuously at a predetermined frame rate, such as fifteen frames per second, thirty frames per second, or sixty frames per second, among others. The image data 232 may be stored in the local storage 229 or stored transiently in RAM or video RAM (VRAM) of the client device 220 for processing, as described herein.

As described herein, the value generator 224 can generate a set of values 236 from the pixels of the image data 232. To do so, the value generator 224 can process the pixels of the image data 232 using the machine-learning model 234. In some implementations, the value generator 224 can extract text characters, generate object classifications, and/or generate semantic tokens from the image data 232 using one or more machine-learning models 234 to generate the set of values 236, as described herein. The set of values 236 can text data depicted in the image data 232, which may include team names, player names, league abbreviations, sport types, venue names, event dates, statistical terms, position designations, tournament names, or betting terminology, among others, as described herein. In some implementations, the value generator 224 can assign confidence scores to each value in the set of values 236 based on the clarity and consistency of the corresponding visual elements in the image data 232. The set of values 236 can be stored in the local storage 229 in association with the image data 232 from which the set of values 236 was derived, as described herein. The values 235 can be presented via one or more graphical user interfaces, as described herein.

In some implementations, the value generator 224 can rank the set of values 236 based on various metrics, such as the size of the visual elements from which the values 236 were derived, confidence scores assigned by the machine-learning model 234, proximity of detected features to the capture device 222, and/or frequency of appearance within the image data 232, as described herein. In some implementations, the value generator 224 can determine rankings for the values 236 according to predetermined ranking criteria specified in the local dataset 252, such that values 236 associated with specified teams, live events, or categories can receive higher rankings. The rankings can be used by the interface provider 228 to determine the visual presentation of the values 236 within the graphical user interface, with higher-ranked values potentially positioned more prominently, as described herein. In some implementations, the value generator 224 can filter the values 236 based on the rankings, such that only values 236 exceeding a predetermined ranking threshold are presented in the graphical user interface or included in search operations performed by the request manager 226.

The value generator 224 can initiate a timer 244 corresponding to the image data 232 concurrently with generating the first set of values 236. The timer 244 can be initialized according to configuration settings stored in the local storage 229, which can specify various timer parameters such as duration, countdown intervals, or expiration behaviors, among others. In some implementations, the timer 244 can be initialized based on preferences stored in a corresponding network profile 270. The value generator 224 can configure the timer 244 with a predetermined duration value, such as five seconds, fifteen seconds, or thirty seconds, among any other suitable value.

The timer 244 can be initiated using any suitable technique. In some implementations, the value generator 224 can create a timer 244 object in memory and associate the timer 244 object with a specific callback function that executes when the timer 244 expires. In another example, the timer 244 can be implemented using system-level timer services provided by an operating system of the client device 220, or can be implemented as an application-level counter that decrements at regular intervals. In some implementations, the timer 244 can be synchronized with display refresh rates of the client device 220, such that timer updates correspond to frame rendering cycles or based on capturing a predetermined number of frames via the capture device 222. The timer 244 can be associated with metadata that identifies the corresponding image data 232 and generated values 236. The timer 244 can be accessed by the interface provider 228 to update visual indicators in the graphical user interface, such as the timer indicator 318 of FIG. 3C, which can indicate the state of the timer 244 (e.g., the remaining time before additional image processing is to occur).

The value generator 224 can restrict generation of additional values from additional image data captured by the capture device 222 prior to expiration of the timer 244. In some implementations, the value generator 224 can implement this restriction by temporarily disabling processing functions that would otherwise process newly captured frames from the capture device 222. The value generator 224 can maintain the set of values 236 in memory during the restriction period, such that the first set of values 236 remains available for search operations or other operations described herein. The restriction of additional value generation can reduce computational resource usage and power consumption of the client device 220, particularly when the capture device 222 is capturing image data 232 at frame rates that would otherwise require continuous processing.

In some implementations, the interface provider 228 can maintain presentation of the set of values 236 via a graphical user interface prior to expiration of the timer 244. The interface provider 228 can present the set of values 236 with the image data 232 via a graphical user interface, similar to the graphical user interface 302B of FIG. 3B. In some implementations, the interface provider 228 can present updated image data via a graphical user interface prior to expiration of the timer 244. The interface provider 228 can continue to display the live feed of frames captured by the capture device 222 while maintaining the same set of values 236 to provide visual feedback that the capture device 222 remains active even though the values 236 are temporarily fixed. In some implementations, the interface provider 228 can display a visual indicator representing the current state of the timer 244, such as a progress bar or countdown display that shows the remaining time until new values 236 will be generated from the current image data 232.

The value generator 224 can determine that the timer 244 corresponding to the captured image data 232 has expired.

To do so, in some implementations, the value generator 224 can compare a current system time to a stored expiration time of the timer 244. In some implementations, the value generator 224 can register a callback function with the operating system of the client device 220 that is automatically invoked when the timer 244 reaches an expiration value (e.g., zero). In another example, the value generator 224 can monitor a counter value associated with the timer 244 that decrements at regular intervals until reaching a predetermined threshold value indicating expiration of the timer 244.

Upon expiration of the timer 244, the value generator 224 can access the current frame of image data 232 being captured by the capture device 222. The value generator 224 can generate, responsive to determining that the timer 244 has expired, an additional/replacement set of values 236 from the pixels of current frame received from the capture device 222. The second set of values 236 can replace the set of values 236 that were generated prior to the expiration of the timer 244. In some implementations, the second set of values 236 can be generated using the same machine-learning model 234 that was used to generate the previous set of values 236.

The interface provider 228 can update the graphical user interface to indicate the replacement set of values 236 following expiration of the timer 244. The updated interface can present the set of values 236 in the same region of the graphical user interface where the previous set of values 236 was previously displayed. In some implementations, the value generator 224 can initiate a second timer 244 corresponding to the second image data. The second timer 244 can be configured with similar duration parameters as the first timer 244. The visual indicator representing the timer can automatically be updated by the interface provider 228 to visually represent the state of the second timer 244.

The request manager 226 can execute a search operation using at least one value 236 of the set of values 236, for example, in response to an interaction with a visual representation of the value 236. The request manager 226 can formulate a search request 290 that includes the at least one value as a search parameter and transmit the search request 290 to the data processing system 205 via the network 210, as described herein. The data processing system 205 (or the components thereof) can perform the search operation to generate search results 242 comprising content items 275 corresponding to live events identified based on the selected value 236, as described herein.

In some implementations, the interface provider 228 can update the graphical user interface to prevent user interactions during the transition between different sets of values 236 generated from different image data 232. In some implementations, the interface provider 228 can display a visual indicator, such as a loading spinner, progress bar, or overlay element, to signal that the interface is temporarily locked while additional values 236 are being generated. The interface provider 228 can disable touch input, mouse clicks, or other interaction methods for a predetermined period following timer 244 expiration, such that accidental selections cannot occur during the interface update process. The interface provider 228 can maintain the display of the image data 232 in while preventing interactions with one or more regions (e.g., value region 314) of the graphical user interface until a replacement set of values 236 has been processed and rendered. The interface provider 228 can re-enable user interactions once the graphical user interface has been updated with the replacement set of values 236 to enable selection of values 236 for search operations.

Referring now to FIG. 5, depicted is an illustrative flow diagram of a method 500 for local network search optimization based on timers. The method 500 can be executed, performed, or otherwise carried out by any of the computing systems or devices described herein. In brief overview of the method 500, the method 500 can include receiving image data from a capture device (STEP 502), generating a set of values from the received image data (STEP 504), initiating a timer corresponding to the image data (STEP 506), restricting generation of additional values from additional image data captured by the capture device prior to expiration of the timer (STEP 508), determining that the timer has expired (STEP 510), generating a second set of values from second image data received from the capture device (STEP 512), and executing a search operation using at least one value of the second set of values (STEP 514).

The method 500 can include receiving image data (e.g., image data 232) from a capture device (e.g., capture device 222) (STEP 502). The image data can be received in response to an interaction with a graphical user interface of an application executing on a computing device. In some implementations, the interaction may be provided with one or more interactive elements corresponding to image-based search (e.g., the image-based search button 308 of FIG. 3A). The capture device can capture the image data at a predetermined frame rate, such as fifteen frames per second, thirty frames per second, or sixty frames per second, among others. The received image data can include pixels representing visual content from an environment, which may include text, objects, or other visual elements that can be processed to extract information relevant to live events. In some implementations, the image data can be stored in a memory of the computing device executing the method 500 for subsequent processing operations.

The method 500 can include generating a set of values from the received image data (STEP 504). The set of values can be generated by providing at least a subset of the pixels of the image data as input to a machine-learning model. The machine-learning model can process the image data to identify various features such as text characters/words/ phrases, logos, uniform colors, or other visual indicators that can be converted into the set of values, as described in connection with FIG. 2. In some implementations, the machine-learning model can include an OCR model that can identify and extract alphanumeric characters from the image data. The generated set of values can include text identifiers, team names, player names, event dates, numerical statistics, sport types, league abbreviations, classifications, or any other type of data that can be compared with predetermined values. In some implementations, the set of values can be filtered by comparing the values with one or more predetermined values (e.g., the local dataset 252), as described herein.

The method 500 can include initiating a timer corresponding to the image data (STEP 506). The timer can be initialized to a predetermined value, such as five seconds, fifteen seconds, or thirty seconds, among others. The predetermined value can be specified in configuration settings stored in memory and or a profile (e.g., a network profile 270), which can define various timer parameters such as duration, countdown intervals, and/or expiration behaviors. In some implementations, the timer can be implemented using system-level timer services provided by an operating system, or can be implemented as an application-level counter that decrements at regular intervals. The timer can be associated with metadata that identifies the corresponding image data and generated values for subsequent processing operations.

The method 500 can include restricting generation of additional values from additional image data captured by the capture device prior to expiration of the timer (STEP 508). The restriction can be implemented by temporarily disabling processing functions that would otherwise process newly captured frames from the capture device. The set of values can be maintained in memory during the restriction period, such that the first set of values remains available for search operations or other operations. In some implementations, a graphical user interface can be updated to present the set of values with the image data during the restriction period. Restricting generation of additional values can reduce computational resource usage and power consumption, particularly when the capture device is capturing image data at frame rates that would otherwise require continuous processing.

The method 500 can include determining that the timer has expired (STEP 510). The determination can be made by comparing a current system time to a stored expiration time of the timer. In some implementations, a callback function can be registered with the operating system that is automatically invoked when the timer reaches an expiration value. The expiration of the timer can cause processing operations for newly captured image data to resume to generate additional sets of values as described herein. In some implementations, a visual indicator representing the timer can be updated to reflect the expired state. The determination that the timer has expired can enable the method 500 to proceed STEP 512 to generate new values from current image data.

The method 500 can include generating a second set of values from second image data received from the capture device (STEP 512). The second set of values can be generated in response to determining that the timer has expired, using the current frame of image data being captured by the capture device. The second set of values can replace the set of values that were generated prior to the expiration of the timer. In some implementations, the second set of values can be generated using the same machine-learning model and/or approach that was used to generate the previous set of values. A graphical user interface can be updated to indicate the second set of values following expiration of the timer. In some implementations, a second timer can be initiated corresponding to the second image data to establish a cycle of periodic processing operations. For example, each time image data is processed, a new timer can be initiated according to the techniques described herein.

The method 500 can include executing a search operation using at least one value of the second set of values (STEP 514). The search operation may be executed in response to an interaction with a graphical representation of the at least one value. The search operation can be executed by transmitting a search request to a server via a network. The search request can include the selected value as a search parameter, which can be used to identify relevant content items (e.g., wager opportunities, fantasy sports lineups, etc.) corresponding to live events. The search operation can be implemented by one or more servers, which can generate a set of search results comprising a set of content items, with each content item corresponding to a respective live event. The content items can include various types of information, such as wager opportunities, fantasy sports contests, live event information, team statistics, or player information, among others, as described herein. The search results can be provided to the computing system performing the method 500 for presentation via one or more graphical user interfaces.

D. Systems and Methods for Generating Network Data Structures from Local Peripheral Signals Various aspects of the present disclosure may implement image-based processing techniques to generate data records from visual representations of those data records. The system can process image data to identify visual representations of data records and derive the structure and content of the data records from the image data. However, processing image data to identify data record representations can be challenging because of the irregular formatting and inconsistent visual presentation of data records across different sources. The system can implement technical improvements that enable efficient extraction of data record parameters from visual representations captured in image data while optimizing computational resource usage despite variations in layout, styles, structural organization, or other irregularities.

By analyzing image data to detect structured visual representations of data records, the system can automatically populate corresponding data structures with parameters derived from the visual content. In some implementations, one or more machine learning models can process image data to identify regions containing structured information, such as tables, forms, or other organized visual representations of data records. Different values can be extracted from these regions using optical character recognition, object detection, or other image processing techniques implemented using a machine-learning model or other processing operations described herein. The extracted values can be used to populate data entries corresponding to different parameters of data records, which can then be stored in local storage or transmitted to one or more servers for remote network processing. The techniques described herein can significantly improve the efficiency of data record creation from visual representations of data records that may be irregular, incomplete, or incompatible with conventional processing systems.

Referring back to FIG. 2, in the context of generating network data structures from local peripheral signals, the client device 220 can execute the capture device 222 to capture image data 232 representing an environment, as described herein. The network data structure generation techniques may be implemented when performing an image-based search according to the techniques described herein. For example, the capture device 222 can capture image data 232 in response to one or more user interactions with a graphical user interface (e.g., graphical user interface 302A of FIG. 3A, etc.) of an application executing on the client device 220. The capture device 222 can capture the image data 232 continuously at a predetermined frame rate, such as fifteen frames per second, thirty frames per second, or sixty frames per second, among others. The image data 232 may be stored in the local storage 229 or stored transiently in RAM or video RAM (VRAM) of the client device 220 for processing, as described herein.

The value generator 224 can determine that the pixels of the image data 232 depict a visual representation of a captured data record 280 satisfying a predetermined criterion. The predetermined criterion can include a classification of a specific type of data record 280, such as a bet slip, a multi-leg parlay wager, a tournament bracket, or a multi-wager bracket with multiple selections 287, among others. In some implementations, the value generator 224 can process the spatial arrangement, formatting patterns, and textual elements within the image data 232 to identify characteristic features associated with such data records 280. In some implementations, the value generator 224 can compare any identified features against predetermined templates or patterns stored in the local dataset 252 to determine whether the image data 232 satisfies the predetermined criterion. In some implementations, the value generator 224 can generate one or more confidence scores to the determination based on the number and quality of matching features detected in the image data 232, with higher confidence scores indicating a greater likelihood that the image data 232 depicts a visual representation of a captured data record 280.

In some implementations, the value generator 224 can determine that the image data 232 depicts the visual representation of the first data record 280 satisfying the predetermined criterion using a machine-learning model 234. The machine-learning model 234 can be trained on datasets including various examples of bet slips, parlay wagers, tournament brackets, and/or other structured documents or visual representations of data records 280 to recognize the visual characteristics thereof. In some implementations, the machine-learning model 234 can be an object detection model that is trained/updated to identify regions within the image data 232 that correspond to specific elements of data records 280, such as selection boxes, odds values, stake amount fields, or payout calculation sections, among others. The object detection model can generate bounding boxes around the region representing the visual representation of the data record 280 and/or the elements thereof, and can generate classifications of each element according to its function within the data record 280. In some implementations, the value generator 224 can use rule-based approaches to analyze the spatial relationships between any detected elements to determine whether the arrangement matches predetermined patterns associated with specific types of data records 280, such as the characteristic layout of a multi-leg parlay wager with multiple conditional selections 287, among any other type of possible data record 280.

In some implementations, the value generator 224 can determine that the image data 232 depicts the visual representation of the first data record 280 satisfying the predetermined criterion in response to determining that the image data 232 corresponds to a classification associated with the predetermined criterion. In some implementations, the classification can be generated by the machine-learning model 234 based on the image data 232, rather than detection of individual elements. In some implementations, the machine-learning model 234 can be a multi-modal language model that can process the visual information in the image data 232 to generate semantic output corresponding to the content thereof. The multi-modal language model can be instructed to analyze the textual elements and visual structure of the image data 232 to determine whether the image data 232 represents a specific type of data record 280. In some implementations, the value generator 224 can extract classification labels or confidence scores from the output of the multi-modal language model and can compare such classifications against predetermined threshold values to determine whether the image data 232 satisfies the predetermined criterion for a specific type of data record 280.

The value generator 224 can implement various preprocessing techniques to improve the accuracy of the determination process. In some implementations, the value generator 224 can apply image processing operations to the image data 232, such as contrast adjustment, noise reduction, and/or perspective correction, to improve the quality of the visual information before processing. In some implementations, the value generator 224 can combine multiple analysis approaches, such as rule-based pattern matching, object detection, and/or text recognition to determine whether the image data 232 depicts a visual representation of a data record 280 satisfying the predetermined criterion.

The value generator 224 can generate one or more data entries 246 (e.g., a set of data) from the first data record 280 using at least a subset of the pixels of the image data 232 corresponding to the visual representation. The data entries 246 can be indicative of or otherwise correspond to predicted data record parameters 282 of the captured data record 280. In some implementations, the data entries 246 can include indications of the type of wager represented by the captured data record 280, wager selections, wager amounts, odds values, point spreads, over/under totals, parlay/exotic/multi-leg combinations, or other parameters that define the structure and/or content of the captured data record 280. The value generator 224 can extract such parameters, for example, by processing regions of the image data 232 that are identified as corresponding to different fields or sections of the captured data record 280, such as selection boxes, stake amount fields, or odds sections, among others.

The data entries 246 can include any of the data record parameters 282 described herein, such as team identifiers, player names, event dates, wager types, odds notations, stake amounts, or potential payout values, among others. In some implementations, the value generator 224 can store the data entries 246 into a structured format that may correspond to the structure/formatting of data record parameters 282 within the data processing system 205. The value generator 224 can generate confidence scores to each data entry 246 based on to represent the predicted accuracy that the corresponding visual elements in the image data 232 represent a corresponding data record parameter 282. The confidence scores can be used to prioritize certain data entries 246 during subsequent processing operations or to flag entries that may be provided for additional verification.

In some implementations, the value generator 224 can generate the set of data entries 246 corresponding to the captured data record 280 using one or more machine-learning models 234. The machine-learning model 234 can be trained on datasets including various examples of bet slips, parlay wagers, tournament brackets, or any other type of data record 280 described herein to recognize the visual characteristics of different data record parameters 282. In some implementations, the machine-learning model 234 can comprise one or more of an OCR model, an object detection model, or a multi-modal language model. The OCR model can extract text from specific regions of the image data 232. In another example, an object detection model can be used to identify and classify visual elements such as checkboxes, selection indicators, or table structures that organize the data within the visual representation of the data record 280.

In some implementations, the value generator 224 can utilize a multi-modal language model 234 to generate the set of data entries 246 corresponding to the captured data record 280. The multi-modal language model 234 can process both visual and textual information from the image data 232 to generate contextually relevant outputs that capture the semantic meaning of the visual representation of the data record 280. In some implementations, the multi-modal language model 234 can be instructed (e.g., via predetermined configuration inputs, etc.) to generate natural language descriptions or structured outputs that correspond to different data record parameters 282 given input image data 232. For example, the multi-modal language model 234 can generate textual descriptions of wager selections, numerical representations of stake amounts, or formatted strings representing odds values, among other possible data entries 246. The value generator 224 can parse the outputs of the multi-modal language model 234 to populate the data entries 246 with the extracted information. In some implementations, the multi-modal language model 234 can be fine-tuned on domain-specific datasets to improve its accuracy in recognizing and interpreting sports betting terminology, statistical notations, or any other content that may appear in the visual representations of data records 280.

In some implementations, the value generator 224 can generate the data entries 246 through various processing techniques applied to the image data 232. In some implementations, the value generator 224 can apply template matching algorithms that compare the layout of the visual representation against predetermined templates stored in the local dataset 252. The value generator 224 can implement rule-based extraction functions that identify specific patterns associated with different data record parameters 282, such as currency symbols preceding numerical values for stake amounts or plus/minus signs preceding odds values, among other extraction techniques In some implementations, the visual representation can indicate one or more conditional events, and the set of data entries 246 can be generated to include a set of values representative of one or more selections 287 for the conditional events. The conditional events can correspond to individual legs of a multi-leg wager, such as a parlay wager, an exotic wager, a progressive parlay wager, a round robin wager, a teaser wager, or a pleaser wager, among others. The value generator 224 can process regions of the image data 232 to identify visual indicators of the conditional events, such as team matchups, player performance metrics, game totals, or point spreads, among others. In some implementations, the value generator 224 can extract information about the selections for each conditional event, where the selections can represent specific outcomes chosen for each leg of the multi-leg wager. The selections can be extracted and stored as part of corresponding data entries 246. The machine-learning model 234 can be trained to recognize common formats used to display multi-leg wagers, enabling the value generator 224 to accurately identify the relationship between the conditional events and their corresponding selections within the visual representation of the data record 280.

The interface provider 228 can present an indication of a detected data record 280 and display the extracted data entries 246 via one or more graphical user interfaces. In some implementations, the interface provider 228 can update the graphical user interface to include a visual indicator, such as a highlighted region or an overlay element, that outlines the portion of the image data 232 corresponding to the detected data record 280. The interface provider 228 can present the extracted data entries 246 in a structured format, for example, as a table or a list of values or key-value pairs, where each entry corresponds to a specific data entry 246 extracted from the data record 280 and a corresponding prediction of the type of data record parameter 282 to which it corresponds. In some implementations, the interface provider 228 can present or otherwise indicate confidence scores associated with each data entry 246, for example, using color coding or numerical indicators.

The interface provider 228 can provide interactive elements, such as editable fields or dropdown menus, that allow users to review and modify the extracted data entries 246. In some implementations, the interface provider 228 can present a side-by-side comparison of the original image data 232 and the extracted data entries 246, enabling users to verify the accuracy of the extraction process. The interface provider 228 can include interactive elements for players to confirm the extracted data or manually input missing or incorrect information. In some implementations, the interface provider 228 can dynamically update the presentation of the data entries 246 as the value generator 224 refines or updates the extraction results based on user feedback or additional processing.

In some implementations, the value generator 224 can receive a modification to at least a portion of the set of data entries 246. The modification can be received through user input via the graphical user interface, such as text edits, selection changes, or parameter adjustments to the extracted data entries 246. The value generator 224 can process the modification to determine which specific data entries 246 require updating and can validate the modified data against predetermined formatting requirements or value constraints stored in the local dataset 252. In some implementations, the value generator 224 can visually indicate the modified portions of the data entries 246 via the interface provider 228 to provide visual feedback about the changes made to the original extracted values.

The value generator 224 can update the set of data entries 246 according to the modification. The updating process can involve replacing the original values with the modified values, adjusting related parameters that depend on the modified values, and/or recalculating derived values based on the modifications. In some implementations, the value generator 224 can maintain a history of modifications to enable reverting to previous versions of the data entries 246 if needed. The value generator 224 can store the updated set of data entries 246 in the local storage 229.

The request manager 226 can transmit the set of data entries 246 to the data processing system 205, causing the data processing system 205 to identify a second data record 280 according to the set of data record parameters 282. The request manager 226 can transmit the set of data entries 246 in response to detecting an interaction with a user interface element presented via the graphical user interface. In some implementations, the user interface element can include a search button, a confirmation dialog, or a submit control that, when interacted with, triggers the transmission of the set of data entries 246 to the data processing system 205. The request manager 226 can formulate the request 290 to include the set of data entries 246 along with additional parameters such as authentication credentials, device identifiers, or other request information that may be used by the data processing system 205 in identifying the second data record 280 that corresponds to the set of data record parameters 282 represented by the data entries 246.

In some implementations, the request manager 226 can transmit the set of data entries 246 to the data processing system 205 in a request 290 to perform a search operation for one or more data records 280 corresponding to the set of data entries 246. The search operation can be executed by the search executor 240 of the data processing system 205 to identify data records 280 maintained by the data processing system 205 that match or are similar to the parameters specified in the data entries 246. In some implementations, the request manager 226 can include search criteria or filtering parameters in the request 290 to narrow the scope of the search operation performed by the data processing system 205. The request manager 226 can specify, for example, date ranges, event types, team identifiers, or other attributes that can be used to refine the search for corresponding data records 280 maintained by the data processing system 205. The data processing system 205 can then return the matching data records 280 or content items 275 representing the matching data records 280 as search results 242 in a response 292 transmitted back to the client device 220.

The search executor 240 can process the received data entries 246 to identify relevant data records 280 and/or lists 285 maintained in the storage 215. In some implementations, the search executor 240 can parse the data entries 246 to extract key attributes such as team names, player identifiers, event dates, wager types, or odds values, among others. The search executor 240 can use these extracted attributes to construct search queries that can be executed against the data records 280 and lists 285 stored in the storage 215. In some implementations, the search executor 240 can apply various matching algorithms, such as exact matching, fuzzy matching, or semantic similarity comparisons, to identify data records 280 and/or lists 285 (or selections 287 thereof) that correspond to the attributes specified in the data entries 246. The search executor 240 can assign relevance scores to each identified data record 280 and/or list 285 (or selections 287 thereof) based on the degree of similarity between the attributes in the data entries 246 and the corresponding parameters in the stored data records 280 and/or lists 285 (or selections 287 thereof).

In some implementations, the search executor 240 can utilize indexing structures or database search techniques to search through data records 280 and/or lists 285 (or selections 287 thereof) in the storage 215. The search executor 240 can implement filtering functions based on additional parameters provided in the request 290, such as date ranges, event types, or team identifiers, to narrow down the search results. In some implementations, the search executor 240 can perform multi-stage search operations, first identifying a broader set of potentially relevant data records 280 and/or lists 285 (or selections 287 thereof), and then applying more fine-grained matching criteria to refine the results. The search executor 240 can generate search results 242 that include any identified data records 280 and/or lists 285 (or selections 287 thereof), along with their corresponding relevance scores and any additional metadata that may be used for presenting the results to the player via the client device 220. In some implementations, the search executor 240 can limit the number of search results 242 based on predetermined thresholds to reduce the response time and data transfer between the data processing system 205 and the client device 220.

The interface provider 228 can present, via a graphical user interface, a content item 275 representative of the search results 242 (including any identified data records 280 and/or lists 285 (or selections 287 thereof), etc.) received from the data processing system 205. The graphical user interface can present the search results 242 provided by the data processing system 205 in response to the search request 290 transmitted by the client device 220. In some implementations, the interface provider 228 can arrange the search results 242 according to relevance scores or rankings included with the response 292 from the data processing system 205. The interface provider 228 can update the graphical user interface to display multiple content items 275 corresponding to different data records 280 identified during the search operation performed by the search executor 240.

The request manager 226 can detect a selection of a content item 275 via the graphical user interface. The selection can be received through various input mechanisms, such as a tap gesture on a touchscreen display, a mouse click, or a keyboard input, among others. In response to detecting the selection of the content item 275, the request manager 226 can transmit, to the data processing system 205, a request 290 to execute a corresponding data record 280. The request manager 226 can formulate the request 290 to include parameters such as wager type, wager amount, team selection, or event identifier, among others. In some implementations, the request manager 226 can validate the selection by presenting a confirmation prompt via the interface provider 228, requiring additional user input to confirm the selection before transmitting the request 290. The request 290 can be transmitted via the network 210 using various communication protocols, such as HTTP, HTTPS, Web-Socket, or other suitable network protocols, among others.

In some implementations, the request 290 to execute the second data record 280 can include at least one additional data record parameter 282. The additional data record parameter 282 can be specified by the player through interactive elements presented via the graphical user interface after the selection of the content item 275 but before transmission of the request 290. For example, the interface provider 228 can present a dialog with input fields for specifying wager amount, payment method, or confirmation options, among others. The request manager 226 can collect the additional data record parameter 282 from the player input and incorporate the additional data record parameter 282 into the request 290. In some implementations, the request manager 226 can apply validation rules to the additional data record parameter 282 before including the additional data record parameter 282 in the request 290, such that invalid or incomplete parameters can be identified and corrected before transmission to the data processing system 205.

Referring now to FIG. 6, depicted is an illustrative flow diagram of a method 600 for generating network data structures from local peripheral signals. The method 600 can be executed, performed, or otherwise carried out by any of the computing systems or devices described herein. In brief overview of the method 600, the method 600 can include receiving image data from a capture device (STEP 602), determining that the image data depicts a visual representation of a first data record (STEP 604), generating a set of data from the first data record using the image data (STEP 606), transmitting the set of data to at least one server (STEP 608), presenting a content item representative of the second data record received from the at least one server (STEP 610), and transmitting a request to execute the second data record in response to an interaction with the content item (STEP 612).

The method 600 can include receiving image data from a capture device (STEP 602). The image data can be received in response to an interaction with a graphical user interface of an application executing on a computing device. In some implementations, the interaction can be provided with one or more interactive elements corresponding to image-based search. The capture device can capture the image data at a predetermined frame rate, such as fifteen frames per second, thirty frames per second, or sixty frames per second, among others. The received image data can include pixels representing visual content from an environment, which may include text, objects, or other visual elements that can be processed to extract information relevant to data records. In some implementations, the image data can be stored in a memory of the computing device executing the method 600 for subsequent processing operations.

The method 600 can include determining that the image data depicts a visual representation of a first data record (STEP 604). The determination can be made by applying rule-based approaches and/or machine-learning models to the image data to identify characteristic features associated with data records. In some implementations, the features identified in the image data can be compared against predetermined templates or patterns stored in a local dataset to determine whether the image data depicts a visual representation of a data record. In some implementations, the determination can be performed using a machine-learning model trained on datasets including various examples of data records to recognize the visual characteristics thereof. In some implementations, the machine-learning model can be an object detection model that can identify regions within the image data that correspond to specific elements of data records, such as selection boxes, odds values, stake amount fields, or payout calculation sections, among others. The machine-learning model can generate confidence scores for the determination based on the number and/or quality of matching features detected in the image data.

The method 600 can include generating a set of data (e.g., data entries 246) from the first data record using the image data (STEP 606). The set of data can be generated by processing regions of the image data that are identified as corresponding to different fields or sections of the first data record. In some implementations, the set of data can include indications of the type of data record represented in the image data, selections, amounts, odds values, point spreads, over/under totals, parlay combinations, or other parameters that define the structure and content of the first data record. The set of data can be generated using one or more machine-learning models, such as optical character recognition models, object detection models, or multi-modal language models. In some implementations, the machine-learning models can extract text from specific regions of the image data or identify and classify visual elements such as checkboxes, selection indicators, or table structures that organize the data within the visual representation of the first data record. The generated set of data can be stored in a structured format that corresponds to the structure and formatting of data record parameters.

The method 600 can include transmitting the set of data to at least one server (e.g., the data processing system 205) (STEP 608). The set of data can be transmitted in response to detecting an interaction with a user interface element presented via a graphical user interface. In some implementations, the user interface element can include a search button, a confirmation dialog, or a submit control that, when interacted with, triggers the transmission of the set of data to the server. In some implementations, the set of data can be formulated into a request that includes the set of data along with additional parameters such as authentication credentials, device identifiers, or other request information that may be used by the server in identifying a second data record that corresponds to the set of data. In some implementations, the set of data can be transmitted to the server in a request to perform a search operation for one or more data records corresponding to the set of data. The search operation can be executed by the server to identify data records maintained by the server that match or are similar to the parameters specified in the set of data, as described herein.

The method 600 can include presenting a content item representative of the second data record received from the at least one server (STEP 610). The content item can correspond to one or more wager opportunities. The content item can be presented via a graphical user interface in response to receiving search results from the server. In some implementations, the graphical user interface can be updated to display the content item in a structured format, with the content item presented as a selectable element that can be interacted with to perform additional operations. The content item can be arranged according to relevance scores or rankings provided by the server that executed the search operation. In some implementations, the graphical user interface can present multiple content items corresponding to different data records identified during the search operation performed by the server.

The method 600 can include transmitting a request to execute the second data record in response to an interaction with the content item (STEP 612). The request can be formulated to include parameters such as record type, amount, selection, or event identifier, among others. In some implementations, the request can be validated by presenting a confirmation prompt via the graphical user interface, requiring additional user input to confirm the selection before transmitting the request. The request can be transmitted via a network using various communication protocols, such as HTTP, HTTPS, WebSocket, or other suitable network protocols, among others. In some implementations, the request to execute the second data record can include at least one additional data record parameter specified by the user through interactive elements presented via the graphical user interface after the selection of the content item but before transmission of the request.

E. Systems and Methods for Automatic Network Connections from Local Network Data Various aspects of the present disclosure may implement image-based processing techniques to automatically connecting network records using local network data captured via image-based techniques. Such approaches can be used to identify relevant data records according to visual representations in different formats. The system can process image data to detect visual representations of various attributers across heterogeneous formatting structures and derive the structure and content of the data records from the image data. Processing image data to identify data record representations can be technically challenging because of the irregular formatting and inconsistent visual presentation of various attributers across different sources, formats, or configurations. The system can implement technical improvements that enable efficient identification of relevant data records from visual representations captured in image data while optimizing computational resource usage despite variations in layout, styles, structural organization, or other irregularities.

By analyzing image data to detect structured visual representations of data records, the system can automatically identify corresponding data structures with parameters derived from the visual content regardless of formatting variations. Different values corresponding to various attributes or other data can be extracted from these regions using optical character recognition, object detection, or other image processing techniques implemented using a machine-learning model or other processing operations described herein. The system can implement format normalization techniques that can transform various visual representations into standardized data structures for consistent processing. The extracted values can be used to identify data records corresponding to different feature attributes detected via image data, which can then be stored in local storage or transmitted to one or more servers for remote network processing. The techniques described herein can significantly improve the efficiency and accuracy of identifying relevant network data records from visual representations that may be irregular, incomplete, or incompatible with conventional processing systems.

Referring back to FIG. 2, in the context of automatic network connections from local network data, the client device 220 can execute the capture device 222 to capture image data 232 representing an environment, as described herein. The network data structure generation techniques may be implemented when performing an image-based search according to the techniques described herein. For example, the capture device 222 can capture image data 232 in response to one or more user interactions with a graphical user interface (e.g., graphical user interface 302A of FIG. 3A, etc.) of an application executing on the client device 220. The capture device 222 can capture the image data 232 continuously at a predetermined frame rate, such as fifteen frames per second, thirty frames per second, or sixty frames per second, among others. The image data 232 may be stored in the local storage 229 or stored transiently in RAM or VRAM of the client device 220 for processing, as described herein.

The value generator 224 can determine that the pixels of the image data 232 depict a visual representation of a list 285 having one or more selections 287. In some implementations, the value generator 224 can use rule-based approaches with the image data 232 to identify characteristic features associated with fantasy sports lineups represented as lists 285 with selections 287. The value generator 224 can compare the identified features against predetermined templates or patterns stored in the local dataset 252 to determine whether the image data 232 depicts a visual representation of a list 285 having selections 287. In some implementations, the value generator 224 can assign confidence scores to the determination based on the number and quality of matching features detected in the image data 232, with higher confidence scores indicating a greater likelihood that the image data 232 depicts a visual representation of a fantasy sports lineup with athlete and/or team selections 287.

In some implementations, the value generator 224 can determine that the image data 232 depicts the visual representation of the list 285 having selections 287 using a machine-learning model 234. In some implementations, the machine-learning model 234 can be trained on datasets including various examples of fantasy sports lineups, roster configurations, or other structured representations of athlete selections 287 to recognize the visual characteristics thereof. In some implementations, the machine-learning model 234 can be an object detection model that can identify regions within the image data 232 that correspond to specific elements of fantasy sports lineups, such as athlete names, position designations, team affiliations, or statistical projections, among others. The object detection model can generate bounding boxes around the region representing the visual representation of the list 285 and/or the elements thereof, and can generate classifications of each element according to its function within the fantasy sports lineup structure.

In some implementations, the value generator 224 can utilize a multi-modal language model 234 to determine that the image data 232 depicts the visual representation of the list 285 having selections 287. The multi-modal language model 234 can be instructed to process pixels of the image data 232 to generate contextually relevant outputs that capture the semantic meaning of the visual representation of the list 285, if any. The multi-modal language model 234 can be instructed to analyze the layout, textual elements, and/or visual structure of the image data 232 to determine whether the image data 232 represents a specific type of list 285, such as a fantasy sports lineup. In some implementations, the value generator 224 can extract classification labels or confidence scores from the output of the multi-modal language model 234 and can compare such classifications against predetermined threshold values to determine whether the image data 232 depicts a visual representation of a list 285 having selections 287. In some implementations, the multi-modal language model 234 can be fine-tuned on domain-specific datasets to improve its accuracy in recognizing and interpreting fantasy sports terminology, roster structures, or any other content that may appear in the visual representations of lists 285 with selections 287. In some implementations, the list 285 may be a fantasy sports lineup that is not necessarily generated by the data processing system. For example, the list 285 may be generated by an unrelated/third-party computing system that is unaffiliated with the data processing system 205.

The value generator 224 can generate a data structure representative of the selections 287 of the detected list 285 using at least a subset of the pixels of the image data 232 corresponding to the visual representation of the list 285. The data structure can include various attributes of the selections 287, such as athlete names, team affiliations, position designations, statistical projections, or fantasy point values, among others. In some implementations, the value generator 224 can extract such attributes by processing regions of the image data 232 that correspond to different elements of the fantasy sports lineup represented by the list 285 using rule-based approaches. The value generator 224 can store the extracted attributes in a structured format that indicates the relationships between different selections 287 and any metadata associated therewith. In some implementations, the data structure can be formatted according to predetermined templates stored in the local dataset 252, such that the extracted information can be matched against existing data records 280 maintained by the data processing system 205.

In some implementations, the value generator 224 can generate the data structure using a machine-learning model 234. In some implementations, the machine-learning model 234 can be trained on datasets including various examples of fantasy sports lineups to detect visual characteristics of different attributes of predicted selections 287 within the image data 232. The value generator 224 can provide the pixels of the image data 232 as input to the machine-learning model 234, which in some implementations can identify regions containing athlete names, team identifiers, position labels, or statistical information, among others. The machine-learning model 234 can generate structured outputs that map each identified region to a corresponding attribute type. The attributes can be used by the value generator 224 to populate the data structure with properly categorized information. In some implementations, the value generator 224 can compare the attributes extracted by the machine-learning model 234 against the local dataset 252 to validate the extracted information. In some implementations, only attributes/selections/features detected via the machine-learning model (e.g., extracted text data, generated classifications, etc.) that match corresponding attributes stored in the local dataset 252 can be included in the data structure.

In some implementations, the machine-learning model 234 can include one or more of an OCR model, an object detection model, or a multimodal language model. The OCR model can extract text from one or more regions of the image data 232. The text may include athlete names, team abbreviations, or position designations that appear in the visual representation of the fantasy sports lineup. The object detection model can identify and classify visual elements such as team logos, player photographs, or structural components like roster position slots that organize the selections 287 within the visual representation of the list 285. The multimodal language model can be instructed to process visual and/or textual information from the image data 232 to generate contextually relevant outputs that capture the semantic data of the fantasy sports lineup, such as extracting athlete names, team names, lineup positions, even when presented in varied formats or layouts. In some implementations, the value generator 224 can combine the outputs from multiple machine-learning models 234 to generate the data structure representing relevant attributes of the selections 287.

The data structure generated by the value generator 224 can be structured in any suitable format. In some implementations, the data structure can be organized as a hierarchical tree where each selection 287 forms a node containing multiple attribute fields such as name, team, position, projected points, or salary cap value, among others. In some implementations, the data structure can be formatted as a table or matrix where rows correspond to individual selections 287 and columns represent different attributes of each selection 287. The value generator 224 can include metadata within the data structure, such as confidence scores for each extracted attribute or positional relationships between selections 287. In some implementations, the data structure can include references to matching entries in the local dataset 252. The value generator 224 can store the generated data structure in the local storage 229 for use in search operations or other processing tasks described herein.

In some implementations, the value generator 224 can receive a modification to at least a portion of the data structure. The modification can be received through user input via the graphical user interface, such as text edits, selection changes, or parameter adjustments to the extracted attributes of the fantasy sports lineup represented by the list 285. The value generator 224 can process the modification to determine which specific selections 287 or attributes require updating and, in some implementations, can validate the modified data against predetermined formatting requirements or value constraints stored in the local dataset 252. In some implementations, the value generator 224 can visually indicate the modified portions of the data structure via the interface provider 228 to provide visual feedback about the changes made to the original extracted values, such as highlighting modified athlete selections, team affiliations, or position designations within the fantasy sports lineup.

The value generator 224 can update the data structure according to the modification prior to transmitting the data structure to the at least one server. Updating the data structure can involve replacing the original values with the modified values, adjusting related parameters that depend on the modified selections 287, and/or recalculating derived values based on the modifications. In some implementations, the value generator 224 can maintain a history of modifications to enable reverting to previous versions of the data structure if needed. The value generator 224 can store the updated data structure in the local storage 229 for subsequent transmission to the data processing system 205, which can use the updated data structure to identify data records 280 corresponding to wager opportunities related to the athletes, teams, or events represented in the modified fantasy sports lineup, as described herein.

The request manager 226 can transmit the data structure to at least one server (e.g., the data processing system 205), causing the at least one server to execute a search operation to identify at least one data record 280 using at least one selection of the plurality of selections 287 of the list 285 as at least part of a search query. In some implementations, the request manager 226 can transmit the data structure to the data processing system 205 in response to an interaction with an indication of the at least one selection 287 presented via the graphical user interface. The request manager 226 can generate the request 290 to include the data structure along with additional parameters such as authentication credentials, device identifiers, or other request information that may be used by the data processing system 205 in identifying the data record 280 that corresponds to the selections 287 represented in the data structure. In some implementations, the request manager 226 can include search criteria or filtering parameters in the request 290 for search operation performed by the data processing system 205, such as date ranges, event types, team identifiers, or other attributes that can be used to refine the search for corresponding data records 280.

The search operation can be executed by the search executor 240 of the data processing system 205 to identify data records 280 maintained by the data processing system 205 that correspond to the athletes, teams, attributes, or events represented in the selections 287 of the detected fantasy sports lineup. In some implementations, the search executor 240 can apply various matching algorithms, such as exact matching, fuzzy matching, or semantic similarity comparisons, to identify data records 280 that correspond to the attributes specified in the selections 287. The search executor 240 can assign relevance scores to each identified data record 280 based on the degree of similarity between the attributes in the selections 287 and the corresponding parameters in the stored data records 280.

The search executor 240 can select one or more data records 280 to include in the search results 242 by mapping one or more attributes of the selection(s) 287 of the data structure to a plurality of data records 280 maintained in the storage 215. The search executor 240 can parse various attributes from the data structure, such as team identifiers, player names, position designations, and/or statistical values, among others. The search executor 240 can compare the extracted attributes against corresponding parameters stored in the data records 280 to identify matching or similar records. In some implementations, the search executor 240 can apply various matching algorithms, such as exact matching, fuzzy matching, or semantic similarity comparisons, to determine the degree of correspondence between the attributes in the selections 287 and the parameters in the data records 280. The search executor 240 can assign relevance scores to each potential match based on the number of matching attributes and the confidence level of each match. The search executor 240 can rank the identified data records 280 according to the assigned relevance scores and can select a predetermined number of highest-ranked data records 280 for inclusion in the search results 242 transmitted back to the client device 220.

The data provider 250 can transmit one or more search results 242 including the identified data records 280 to the client device 220 in one or more responses 292. The data provider 250 can retrieve the content items 275 associated with the identified data records 280 from the storage 215. In some implementations, the data provider 250 can package the retrieved content items 275 along with the search results 242 into the response 292 for transmission to the client device 220. The data provider 250 can apply formatting or transformation operations to the content items 275 to facilitate their presentation on the client device 220, for example, by providing operations such as resizing images and/or generating device-specific layouts. In some implementations, the data provider 250 can include additional metadata with the search results 242 and content items 275 in the responses 292, such as relevance scores, timestamps, or category information, among others. The data provider 250 can prioritize or limit the number of content items 275 included in the response 292 based on factors such as network bandwidth constraints, device capabilities of the client device 220, or preferences stored in the corresponding network profile 270.

The interface provider 228 can present, via a graphical user interface (e.g., the graphical user interface 302C), a content item 275 representative of the at least one data record 280 that is received from the data processing system 205. The content item 275 can be presented in a structured format, with the content item 275 displayed as a selectable element that can be interacted with to perform additional operations, such as placing a wager, generating a fantasy sports lineup, or entering a fantasy sports contest, among others. In some implementations, the interface provider 228 can arrange multiple content items 275 according to relevance scores or rankings provided by the data processing system 205, with higher-ranked content items 275 positioned more prominently within the graphical user interface.

The request manager 226 can transmit, to the data processing system 205, a request 290 to execute an operation for the data record 280 in response to an interaction with the content item 275. In some implementations, the operation can be to place a wager using the data record parameters 282 associated with the data record 280. The request manager 226 can formulate the request 290 to include specific wager parameters such as wager type, team selection, event identifier, or odds values, among others. The request manager 226 can detect the interaction with the content item 275 as any suitable input to the client device 220. The request 290 can be transmitted via the network 210 using various communication protocols, such as HTTP, HTTPS, WebSocket, or other suitable network protocols, among others.

In some implementations, the request 290 to execute the operation for the data record 280 can comprise at least one additional data record parameter 282. The additional data record parameter 282 can include a wager amount, payment method selection, confirmation options, or other wager-specific parameters that may not have been included in the original data record 280. The additional data record parameter 282 can be specified by the player through interactive elements presented via the graphical user interface after the selection of the content item 275 but before transmission of the request 290. For example, the interface provider 228 can present a dialog with input fields for specifying the wager amount or selecting a payment method from available options. The request manager 226 can collect the additional data record parameter 282 from the player input and incorporate the additional data record parameter 282 into the request 290. In some implementations, the request manager 226 can apply validation rules to the additional data record parameter 282 before including the additional data record parameter 282 in the request 290, such that invalid or incomplete parameters can be identified and corrected before transmission to the data processing system 205.

The data manager 260 can process the request 290 to place the wager according to the data record parameters 282 associated with the selected data record 280. In some implementations, the data manager 260 can validate the wager parameters against predetermined rules or constraints stored in the storage 215 to ensure compliance with regulatory requirements or system-defined limits. The data manager 260 can create a new data structure (e.g., a new data record 280) in the storage 215 to represent the placed wager, populating the data structure with the wager parameters (e.g., data record parameters 282) and any additional metadata such as timestamp information, status indicators, and/or potential payout calculations. In some implementations, the data manager 260 can update account balance information within the corresponding network profile 270 to reflect the placed wager, for example, by deducting the wager amount from an available balance. The data manager 260 can associate the created wager data structure (e.g., the data record 280) with the network profile 270, for example, by storing a reference to the data record 280 within a list of active wagers maintained in the network profile 270. In some implementations, the data manager 260 can generate an identifier for the placed wager and store this identifier in association with both the data record 280 corresponding to the placed wager and the network profile 270.

In some implementations, rather than requesting a search operation for a data record 280 (e.g., a search operation for a wager opportunity), upon an interaction with one or more of the detected lists 285 and/or selections thereof 287 presented in a graphical user interface, the request manager 226 can transmit one or more requests 290 for one or more corresponding lists 285 of selections 287 maintained at the data processing system 205. The request manager 226 can generate the request 290 in response to any type of interaction, such as a long press on a detected selection 287 or a tap on a dedicated interface element associated with the detected list 285 presented via the graphical user interface (e.g., the graphical user interface 302B, etc.). In some implementations, the request manager 226 can include metadata with the request 290, such as timestamps, device identifiers, or network profile information that can be used by the data processing system 205 to associate the requested list 285 with the corresponding network profile 270 of the player.

The request manager 226 can transmit the request 290 to search for one or more selections 287 maintained by the data processing system 205 to reconstruct the list 285 detected in the image data 232. For example, the request can be a request to reconstruct a fantasy sports lineup detected in the image data 232 that was originally created by a third-party computing system unaffiliated with the data processing system 205. In some implementations, the machine-learning models 234 can determine, using classification techniques, that the list 285 detected in the image data 232 originated from a computing system other than the data processing system 205. Such classifications be included in the request and/or data structure corresponding to the list 285.

In some implementations, the request manager 226 can include additional parameters with the request 290, such as contest type preferences, entry fee ranges/thresholds (if any), and/or lineup modification options that can be applied when generating the corresponding list 285 at the data processing system 205. In some implementations, the request manager 226 can display a confirmation dialog/interface via the interface provider 228 before transmitting the request 290, which may include interactive elements and/or graphical elements relating to any detected selections 287 and/or prompt for modifications, if any. The confirmation dialog can include interactive elements for adjusting parameters of the request 290, The request manager 226 can transmit the request 290 to the data processing system 205, which can process the request 290 to identify, generate, or update a corresponding list 285 associated with the network profile 270 of the player.

The search executor 240 can access lists 285 and/or possible selections 287 maintained in the storage 215 to reconstruct or generate one or more candidate lists with candidate selections that satisfy the request 290. In some implementations, the search executor 240 can analyze the attributes of the detected list 285 and selections 287 to identify similar or compatible lists 285 and selections 287 stored in the storage 215. The search executor 240 can apply various matching algorithms, such as fuzzy matching or semantic similarity comparisons, to find potential replacements or alternatives for each selection 287 in the detected list 285. For example, if the detected list 285 includes a selection 287 for a specific quarterback, the search executor 240 can identify other quarterbacks with similar statistical profiles, team affiliations, or projected fantasy points as potential alternatives. In some implementations, the search executor 240 can consider factors such as recent performance trends, injury status, or upcoming matchups when identifying candidate selections 287 for the reconstructed list 285.

In some implementations, the request 290 can specify/ identify a fantasy sports contest, and the search executor 240 can apply the constraints of the contest when searching for and constructing valid results. For example, if the specified contest has a salary cap, the search executor 240 can filter potential selections 287 based on their assigned salary values such that the reconstructed list 285 remains within the cap limit. In another example, if the contest requires a specific lineup configuration, such as two running backs, three wide receivers, and one tight end, the search executor 240 can structure its search queries to identify and include selections 287 that fulfill these positional requirements. In some implementations, the search executor 240 can also access contest-specific scoring rules when evaluating potential selections 287, and can prioritize selections 287 that may correspond to higher projected points based on the scoring functions of the specified fantasy sports contest. In some implementations, the search executor 240 can generate multiple candidate lists 285 that satisfy both the attributes of the detected list 285 and the constraints of the specified contest, which can be provided as part of search results 242. The search results 242 including the candidate list(s) 285 and/or selections(s) 287 can be provided to the requesting client device 220 in one or more responses 292.

In some implementations, the request manager 226 can receive, from the data processing system 205, one or more content items 275 respectively corresponding to the candidate selections 287 of the candidate list 285 identified by the data processing system 205. The content items 275 can include visual representations of each selection 287, such as athlete profiles, team logos, or statistical information associated with the selections 287. In some implementations, the content items 275 can include additional metadata such as position designations, salary cap values, or projected fantasy points for each selection 287. The request manager 226 can process the received content items 275 to extract relevant attributes for presentation via the graphical user interface. In some implementations, the request manager 226 can store the received content items 275 in the local storage 229 for subsequent access during interactions with the presented selections 287.

The interface provider 228 can present the lists 285 and/or selections 287 via a graphical user interface (e.g., the graphical user interface 302C). The interface provider 228 can arrange the selections 287 according to various any suitable arrangement, and may sort various selections 287 and/or candidate lineup(s) (e.g., candidate lists 285) by position, team affiliation, projected fantasy points, or salary cap value, among others. In some implementations, the interface provider 228 can apply visual formatting to distinguish different types of selections 287, such as using different backgrounds, borders, or text styles for different positions or teams. The interface provider 228 can include interactive elements that enable interactions with the presented selections 287. The interface provider 228 can detect selection events on individual selections 287 and/or candidate lists 285 and can modify the visual appearance thereof to indicate selection status. In some implementations, the interface provider 228 can present interactive elements alongside the selections 287, such as buttons for adding selections to a fantasy sports lineup, viewing detailed statistics, and/or comparing multiple candidate selection(s) 287 and/or list(s) 285.

In some implementations, responsive to the interaction, the request manager 226 can transmit a second data structure to the data processing system 205, causing the data processing system 205 to generate a second list 285 for the network profile 270 of the client device 220 that includes at least one selection 287 of the candidate selection(s) 287 and/or candidate list(s) 285. The second data structure can include identifiers for the selected selections 287, along with any additional parameters specified by the player through the graphical user interface. The data manager 260 of the data processing system 205 can process the second data structure to create a new list 285 associated with the network profile 270, populating the new list 285 with the specified selections 287. In some implementations, the data manager 260 can validate the selections 287 against predetermined rules or constraints, such as position limits, salary cap restrictions, or player eligibility criteria for fantasy sports contests. The data manager 260 can store the generated list 285 in the storage 215 and can associate the list 285 with the network profile 270 for subsequent access and modification by the player. In some implementations, the data manager 260 can generate and/or update one or more specified fantasy sports contests (e.g., identified in the second data structure) to enter the selection(s) 287 and/or list(s) 285 into the specified fantasy sports contests.

Referring now to FIG. 7, depicted is an illustrative flow diagram of a method 700 for automatic network connections from local network data. The method 700 can be executed, performed, or otherwise carried out by any of the computing systems or devices described herein. In brief overview of the method 700, the method 700 can include receiving image data from a capture device (STEP 702), determining that the image data depicts a visual representation of a list having a plurality of selections (STEP 704), generating a data structure representative of the selections (STEP 706), transmitting the data structure to at least one server (STEP 708), presenting a content item representative of the at least one data record (STEP 710), and transmitting a request to execute an operation for the data record in response to an interaction with the content item (STEP 712).

The method 700 can include receiving image data from a capture device (STEP 702). The image data can be captured, for example, in response to an interaction with a graphical user interface of an application executing on a computing device. In some implementations, the interaction can be provided with one or more interactive elements corresponding to image-based search. The capture device can capture the image data at a predetermined frame rate, such as fifteen frames per second, thirty frames per second, or sixty frames per second, among others. The received image data can include pixels representing visual content from an environment, which may include text, objects, or other visual elements that can be processed to extract information relevant to lists and selections (e.g., fantasy sports lineups). In some implementations, the image data can be stored in a memory of the computing device executing the method 700 for subsequent processing operations.

The method 700 can include determining that the image data depicts a visual representation of a list having a plurality of selections (STEP 704). The determination can be made by applying rule-based approaches and machine-learning models to the image data to identify characteristic features associated with lists having selections. In some implementations, the features identified in the image data can be compared against predetermined templates or patterns stored in a local dataset to determine whether the image data depicts a visual representation of a list having selections. In some implementations, the determination can be performed using a machine-learning model trained on datasets including various examples of lists with selections to recognize the visual characteristics thereof. The machine-learning model can generate confidence scores for the determination based on the number and/or quality of matching features detected in the image data, with higher confidence scores indicating a greater likelihood that the image data depicts a visual representation of a list having selections.

The method 700 can include generating a data structure representative of the selections (STEP 706). The data structure can be generated by processing regions of the image data that are identified as corresponding to different elements of the list. In some implementations, the data structure can include indications of the type of list represented in the image data, the selections within the list, and/or attributes associated with each selection. The data structure can be generated using one or more machine-learning models, such as optical character recognition models, object detection models, or multi-modal language models. In some implementations, the machine-learning models can extract text and/or derive attributes from the image data and/or identify and classify visual elements such as selection indicators or structural components that organize the selections within the visual representation of the list. The generated data structure can be stored in a structured format that corresponds to the organization and relationships between the selections in the list.

The method 700 can include transmitting the data structure to at least one server (e.g., the data processing system 205) (STEP 708). The data structure can be transmitted in response to detecting an interaction with a user interface element presented via a graphical user interface. In some implementations, the user interface element can include a search button, a confirmation dialog, or a submit control that, when interacted with, triggers the transmission of the data structure to the server. In some implementations, the data structure can be formulated into a request that includes the data structure along with additional parameters such as authentication credentials, device identifiers, or other request information that may be used by the server in identifying data records that correspond to the selections in the list. The server can execute a search operation using at least one selection of the plurality of selections of the list as at least part of a search query to identify relevant data records maintained by the server.

The method 700 can include presenting a content item representative of the at least one data record (STEP 710). The content item can be presented via a graphical user interface in response to receiving search results from the server. In some implementations, the graphical user interface can be updated to display the content item in a structured format, with the content item presented as a selectable element that can be interacted with to perform additional operations. The content item(s) can be arranged according to relevance scores or rankings provided by the server that executed the search operation. In some implementations, the graphical user interface can present multiple content items corresponding to different data records identified during the search operation performed by the server. The content items can include various types of information, such as wager opportunities, fantasy sports contests, live event information, team statistics, or player information, among others.

The method 700 can include transmitting a request to execute an operation for the data record in response to an interaction with the content item (STEP 712). The request can be formulated to include parameters such as record type, amount, selection, or event identifier, among others. In some implementations, the request can be validated by presenting a confirmation prompt via the graphical user interface, requiring additional user input to confirm the selection before transmitting the request. The request can be transmitted via a network using various communication protocols, such as HTTP, HTTPS, WebSocket, or other suitable network protocols, among others. In some implementations, the request to execute the operation for the data record can include at least one additional data record parameter specified by the user through interactive elements presented via the graphical user interface after the selection of the content item but before transmission of the request. The operation can include placing a wager, generating a fantasy sports lineup, or entering a fantasy sports contest, among other possible operations that can be performed with the data record.

F. Systems and Methods for Data Structure Searching Based on Network Content

Various aspects of the present disclosure may implement the use of additional peripheral sensors to improve the performance of image-based network operations. As described herein, image data can be processed to derive values that may be used to perform network search operations. However, processing image data without contextual awareness can be challenging because the visual information alone may lack sufficient environmental or situational context needed for accurate interpretation by computing devices. The use of data from various sensors to generate contextual parameters for image processing, rather than relying solely on visual data, can provide significant technical improvements in image-based network operations.

By augmenting image processing with contextual data from peripheral sensors such as accelerometers, gyroscopes, GPS receivers, ambient light sensors, or proximity detectors, the system can improve the performance of image-based network operations. In some implementations, the peripheral sensor data can be used to generate spatial orientation parameters, location coordinates, and/or environmental conditions. During the image processing operations, the capture device may capture various supplementary sensor data, which can be used in connection with image processing to improve the accuracy of data structure generation. The multi-sensor contextual approach can improve the computational efficiency of system operations by reducing ambiguity in image interpretation and enabling more precise matching against network data structures. Further details of such computational improvements are described herein.

Referring back to FIG. 2, in the context of data structure searching based on additional network content, the client device 220 can execute the capture device 222 to capture image data 232 representing an environment, as described herein. The network data structure generation techniques may be implemented when performing an image-based search according to the techniques described herein. For example, the capture device 222 can capture image data 232 in response to one or more user interactions with a graphical user interface (e.g., graphical user interface 302A of FIG. 3A, etc.) of an application executing on the client device 220. The capture device 222 can capture the image data 232 continuously at a predetermined frame rate, such as fifteen frames per second, thirty frames per second, or sixty frames per second, among others. The image data 232 may be stored in the local storage 229 or stored transiently in RAM or VRAM of the client device 220 for processing, as described herein.

The value generator 224 can determine a context 248 for the image data 232 using the pixels of the image data 232. The value generator 224 can process the pixels of the image data 232 using one or more machine-learning models 234 to classify the context 248 as corresponding to a live event. In some implementations, the value generator 224 can use an object detection model 234 (e.g., alone or in connection with rule-based techniques) to identify visual elements such as stadium seating, playing surfaces, broadcast graphics, scoreboard displays, or network logos that indicate the presence of a live sporting event. In some implementations, the value generator 224 can use a multi-modal language model 234 to analyze the overall composition of the image data 232 and generate semantic classifications of the depicted environment, such as "basketball arena," "football stadium," or "baseball field," among others. In some implementations, the value generator 224 can combine outputs from multiple machine-learning models 234 to improve the accuracy of context determination, for example, by cross-validating classifications from an object detection model with semantic outputs from a multi-modal language model. In some implementations, the value generator 224 can detect visual patterns associated with broadcast overlays, such as score bugs, statistical displays, or replay indicators, to classify the context 248 as depicting a live stream of a sporting event rather than direct presence at the event.

The value generator 224 can classify the context 248 based on various environmental indicators detected in the image data 232. In some implementations, the value generator 224 can determine that the context 248 corresponds to physical presence at a live event based on detecting specific visual cues such as proximity to playing surfaces, unmediated views of athletes, or the absence of broadcast graphics typically present in televised content. In some implementations, the value generator 224 can use one or more machine-learning models 234 to identify characteristic lighting conditions associated with indoor arenas versus outdoor stadiums to further refine the context classification. In some implementations, the value generator 224 can use similar techniques to detect crowd density, seating arrangements, or venue-specific architectural features to determine the specific type of sporting venue depicted in the image data 232. In some implementations, the value generator 224 can use machine-learning models 234 to identify visual indicators of game state, such as period indicators, shot clock displays, down markers, or inning numbers to establish the temporal context within the live event.

The value generator 224 can incorporate additional sensor data from the client device 220 to determine the context 248. In some implementations, the value generator 224 can access location data from GPS sensors to determine proximity to known sporting venues (e.g., stored in the local dataset 252, etc.), which can be compared against venue information extracted from the image data 232 to confirm the context classification. The value generator 224 can use time-of-day information from the client device 220 to correlate with scheduled start times of known sporting events (e.g., included in the local dataset 252). The value generator 224 can process Wi-Fi network identifiers or Bluetooth beacon data to determine whether the client device 220 is connected to venue-specific networks (e.g., as confirmed via communications with the data processing system 205 and/or indicated in the local dataset 252). The value generator 224 can store the determined context 248 in the local storage 229 for use in subsequent processing operations.

In some implementations, the value generator 224 can classify the context 248 as not corresponding to any type of live event or any other image-based processing task described herein. In such circumstances, the value generator 224 can determine that the context 248 does not satisfy a predetermined context condition based on the analysis of the image data 232 and any additional sensor data. For example, the value generator 224 can determine that the image data 232 depicts a non-sports related scene, such as a residential interior, a natural landscape, or any other type of environment. In such cases, the value generator 224 can generate a classification indicating that the context 248 is irrelevant or unsuitable for the image-based processing tasks described herein. In some implementations, the interface provider 228 can present an indication of the irrelevant context via the graphical user interface. For example, the interface provider 228 can display a message such as "No relevant context detected" within a designated region of the graphical user interface. In some implementations, the interface provider 228 can present a visual indicator, such as a grayed-out or otherwise deactivated interface element, to indicate that the current image data 232 cannot be used for the intended image-based processing tasks.

In some implementations, the request manager 226 can transmit the image data 232 to the data processing system 205 for context classification. The data processing system 205 can process the received image data 232 using one or more machine-learning models 234 to generate the context 248. In some implementations, the data processing system 205 can employ similar techniques as the value generator 224, such as using object detection models to identify visual elements indicative of live events, or multi-modal language models to generate semantic classifications of the depicted environment. The data processing system 205 can incorporate additional data sources, such as event schedules, venue databases, or real-time sports data feeds, to enhance the accuracy of context determination. The device communicator 230 can transmit the generated context 248 back to the client device 220 in a response 292. The request manager 226 can receive the context 248 from the data processing system 205 and store the context 248 in the local storage 229 for use in subsequent processing operations, such as filtering generated values 236 or formulating search requests 290 that incorporate the received contextual parameters.

The value generator 224 can generate a set of context attributes 254 corresponding to the context 248 responsive to determining that the context 248 satisfies a context condition. The context condition can include detection of various visual elements within the image data 232 that indicate relevance to sporting events, such as playing fields, stadium seating, team uniforms, scoreboard displays, or broadcast graphics, among others. In some implementations, the value generator 224 can apply one or more machine-learning models 234 to analyze the composition of the image data 232 and classify the depicted environment according to predetermined categories stored in the local dataset 252, using the techniques described herein. The context attributes 254 can include various parameters such as sport type, league identification, venue classification, broadcast source identification, or game state indicators, among others, that provide contextual information for subsequent search operations.

In some implementations, the value generator 224 can determine that the pixels depict the context 248 satisfying the context condition based on the pixels depicting a broadcast of a live event. The value generator 224 can detect visual elements that correspond to broadcast content, such as network logos, chyrons, statistical overlays, replay indicators, or picture-in-picture configurations, among others. In some implementations, the value generator 224 can use the machine-learning model 234 to identify specific formatting patterns or screen layouts associated with particular broadcast networks or streaming platforms. The context attributes 254 generated for broadcast content can include broadcast source identifiers, program identifiers, broadcast time-stamps, commercial break indicators, or picture quality parameters, among others, which can be used to refine search operations or filter search results 242 based on the specific broadcast being viewed.

The context attributes 254 corresponding to the broadcast content can be determined using various detection techniques applied to the image data 232, including the use of one or more machine-learning models 234. The value generator 224 can identify broadcast source identifiers by detecting network logos, watermarks, or characteristic graphical elements positioned in consistent screen locations across multiple frames. The value generator 224 can extract program identifiers from text overlays, title cards, or other characteristic graphical elements that may appear during live event broadcasts. In some implementations, the value generator 224 can detect broadcast timestamps from clock displays, countdown timers, or time indicators embedded within score or information panels. The machine-learning model 234 can be trained/updated to detect such broadcast-specific elements across different network presentations, sporting events, or viewing platforms, enabling more precise contextual classification of the captured content. In some implementations, rather than being captured by the capture device 222, the image data 232 may be captured as one or more frames of a live stream (e.g., a live stream of a live event, etc.).

In some implementations, the value generator 224 can generate the set of attributes corresponding to the context 248 in response to an interaction with the graphical user interface. The interaction can include any type of interaction, including tap, touch, or click interactions, among others. In some implementations, the value generator 224 can present preliminary context classifications via the interface provider 228 and can refine the context attributes 254 based on selections or corrections provided via the graphical user interface. In some implementations, the value generator 224 can generate the set of context attributes 254 to include at least an identifier of the live event. The live event identifier can be derived from various visual elements within the image data 232, such as team names, venue information, date indicators, or matchup graphics displayed during broadcasts. In some implementations, the value generator 224 can combine multiple detected elements to determine a specific event identifier, for example, by correlating team names with date information to identify a particular game within a season schedule. The context attributes 254 can include temporal information related to the live event, such as game period indicators, time remaining, inning numbers, quarter designations, or match stage identifiers, among others. The value generator 224 can store the generated context attributes 254 in the local storage 229 for use in subsequent search operations or for transmission to the data processing system 205 as part of search requests 290.

The request manager 226 can transmit, to the data processing system 205, a search request 290 including the set of context attributes 254 corresponding to the context 248. The search request 290 can be transmitted in response to various interactions with the graphical user interface. In some implementations, the request manager 226 can formulate the search request 290 to include authentication credentials, device identifiers, or network profile 270 information that can be used by the data processing system 205 to associate the search request 290 with a corresponding network profile 270. The request manager 226 can include additional parameters with the search request 290, such as sorting preferences, filtering criteria, or display options that can be applied when generating search results 242 at the data processing system 205.

In some implementations, the search request 290 can identify a search category. The search category may specify a search operation for one or more data records 280 (e.g., wager opportunities) or a search request for one or more lineups or selections for lineups (e.g., lists 285, selections 287, etc.). The search category can be specified explicitly through user selection of category-specific interface elements, such as tabs labeled "wagers," "fantasy," or "lineups," among others. In some implementations, the search category can be determined implicitly based on the context attributes 254, such that searches within a sports venue context may default to wager opportunities, while searches within a fantasy sports application context may default to lineup selections. The request manager 226 can store the selected search category in the local storage 229.

The search executor 240 can process the received search request 290 to identify relevant data records 280 or lists 285 maintained in the storage 215. In some implementations, the search executor 240 can parse the context attributes 254 to extract key parameters such as sport type, league identification, team names, or event dates, among others. The search executor 240 can use such extracted parameters to generate search queries that can be executed against the data records 280 and/or lists 285 stored in the storage 215. In some implementations, the search executor 240 can apply various matching algorithms, such as exact matching, fuzzy matching, or semantic similarity comparisons, to identify data records 280 or lists 285 (or one or more candidate selections 287) that correspond to the context attributes 254 specified in the search request 290. The search executor 240 can assign relevance scores to each identified data record 280, list 285, or candidate selection 287 based on the degree of similarity between the context attributes 254 and the corresponding parameters in the stored data.

In implementations where the search request included a lineup search category, the request manager 226 can receive, from the data processing system 205, the one or more lists 285 or the one or more selections 287 in one or more responses 292 to the second search request 290. The received lists 285 or selections 287 can include fantasy sports lineups, athlete rosters, tournament brackets, or prediction lists that match the context attributes 254 specified in the search request 290. In some implementations, the interface provider 228 can present the received lists 285 or selections 287 via the graphical user interface, arranging the content according to relevance scores or rankings provided by the data processing system 205. The interface provider

228 can apply visual formatting to distinguish different types of lists 285 or selections 287. The lists 285 and/or selections 287 may be presented via one or more content items 275, which may be referenced or included in the one or more responses 292. The interface provider 228 can provide interactive elements that enable interactions with the presented lists 285 and/or selections 287, which may be used to indicate requests to generate one or more lineups or confirm selections thereof.

In implementations where the search request included a wager opportunity search category, the request manager 226 can receive, from the data processing system 205, a set of data records 280 in response to the search request 290. The set of data records 280 can be selected according to the search category, the live event identified in the search request 290, and/or the set of context attributes 254. The data processing system 205 can process the search request 290 using the search executor 240 to identify relevant data records 280 corresponding to wager opportunities, such as moneyline wagers, point spread wagers, over/under wagers, parlay wagers, or prop bets, among others. The search executor 240 can apply various matching algorithms, such as exact matching, fuzzy matching, or semantic similarity comparisons, to identify data records 280 that correspond to the context attributes 254 specified in the search request 290.

The data provider 250 can transmit search results 242 including indications of the identified data records 280 to the client device 220 in one or more responses 292. In some implementations, the data provider 250 can retrieve one or more content items 275 associated with the identified data records 280 from the storage 215. In some implementations, the data provider 250 can package the retrieved content items 275 along with the search results 242 into the response 292 for transmission to the client device 220. In some implementations, references or identifiers of the content items 275 may be included in the search results 242. The data provider 250 can apply formatting or transformation operations to the content items 275 to facilitate their presentation on the client device 220, for example, by providing operations such as resizing images, compressing data, or generating device-specific layouts. In some implementations, the data provider 250 can include additional metadata with the search results 242 and content items 275 in the responses 292, such as relevance scores, timestamps, or category information, among others. The data provider 250 can prioritize or limit the number of content items 275 included in the response 292 based on factors such as network bandwidth constraints, device capabilities of the client device 220, or preferences stored in the corresponding network profile 270, as described herein.

The interface provider 228 can present the set of content items 275 representative of the set of data records 280 identified in the search results 242 via a graphical user interface. The content items 275 can be arranged according to relevance scores or rankings provided by the data processing system 205. In some implementations, the interface provider 228 can apply visual formatting to distinguish different types of content items 275, such as using different backgrounds, borders, or text styles for different types of wager opportunities, as described herein. The interface provider 228 can provide interactive elements that enable interactions with the presented content items 275.

In some implementations, the request manager 226 can detect an interaction with a first content item of the set of content items 275. In some implementations, the request manager 226 can validate the interaction by presenting a confirmation prompt/interface via the interface provider

228, which may include interactive elements that receive additional input to confirm the selection before proceeding with subsequent operations. The confirmation prompt/interface can include interactive elements for specifying additional parameters, such as wager amount, payment method, or confirmation options, among others, that may be used to complete the requested operation.

In some implementations, the request manager 226 can receive an interaction with at least one data record 280 of the set of data records 280. Upon receiving the interaction, the request manager 226 can transmit, to the data processing system 205, a request 290 to execute an operation for the corresponding data record 280 (e.g., to place a wager for the wager opportunity) in response to the interaction. The operation can include placing a wager using the data record parameters 282 associated with the data record 280, such as wager type, team selection, event identifier, or odds values, among others. The data processing system 205 can process the request 290 to place the wager according to the data record parameters 282, creating a new data structure in the storage 215 to represent the placed wager and updating account balance information within the corresponding network profile 270 to reflect the placed wager.

Figure 8:
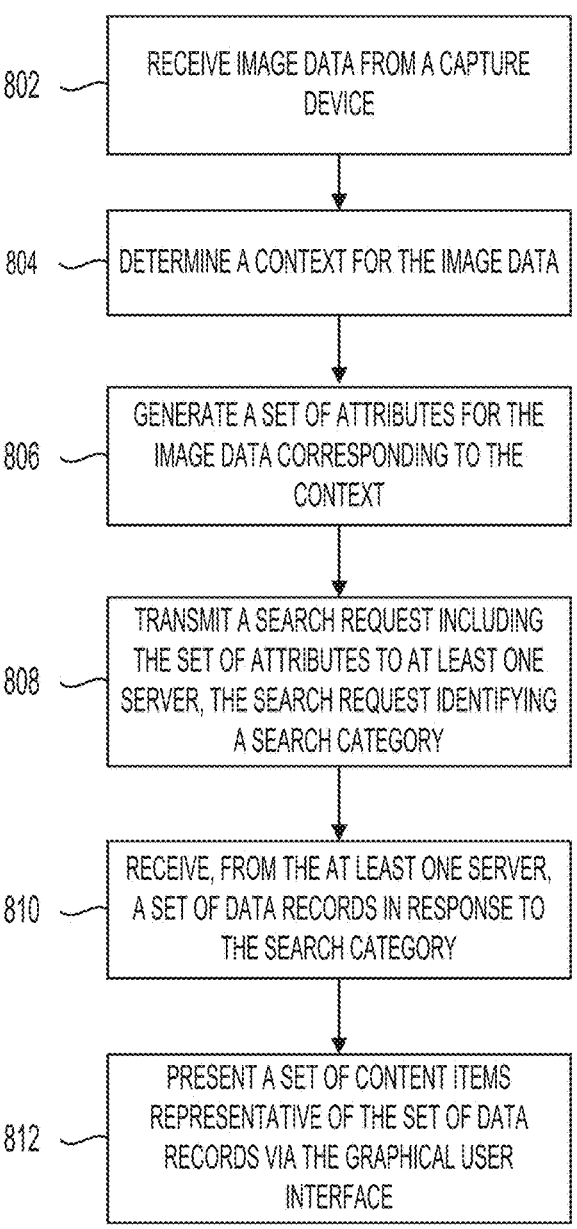
FIG. 8 illustrates a flowchart of a method for data structure searching based on network content, in accordance with one or more implementations.

Referring now to FIG. 8, depicted is an illustrative flow diagram of a method 800 for data structure searching based on network content. The method 800 can be executed, performed, or otherwise carried out by any of the computing systems or devices described herein. In brief overview of the method 800, the method 800 can include receiving image data from a capture device (STEP 802), determining a context for the image data (STEP 804), generating a set of attributes for the image data corresponding to the determined context (STEP 806), transmitting a search request to at least one server (STEP 808), receiving a set of data records from the at least one server in response to the search category (STEP 810), and presenting a set of content items representative of the set of data records via the graphical user interface (STEP 812).

The method 800 can include receiving image data from a capture device (STEP 802). The image data can be received in response to an interaction with a graphical user interface of an application executing on a computing device. In some implementations, the interaction can be provided with one or more interactive elements corresponding to image-based search. The capture device can capture the image data at a predetermined frame rate, such as fifteen frames per second, thirty frames per second, or sixty frames per second, among others. The received image data can include pixels representing visual content from an environment, which may include text, objects, or other visual elements that can be processed to extract information relevant to live events. In some implementations, the image data can be stored in a memory of the computing device executing the method 800 for subsequent processing operations. In some implementations, the image data may be frames from a live stream presented via the computing device performing the operations of the method 800.

The method 800 can include determining a context for the image data (STEP 804). The determination can be made by applying rule-based approaches and machine-learning models to the image data to identify characteristic features associated with live events. In some implementations, the features identified in the image data can be compared against predetermined templates or patterns stored in a local dataset to determine the context of the image data. In some implementations, the determination can be performed using one or more machine-learning models trained on datasets including various examples of live events to recognize the visual characteristics thereof. In some implementations, the machine-learning model(s) can generate confidence scores for the determination based on the number and quality of matching features detected in the image data, with higher confidence scores indicating a greater likelihood that the image data depicts a specific context such as a sporting event, broadcast content, or venue environment.

The method 800 can include generating a set of attributes for the image data corresponding to the determined context (STEP 806). The set of attributes can be generated in response to determining that the context satisfies a predetermined context condition. In some implementations, the context condition can include detection of various visual elements within the image data that indicate relevance to sporting events, such as playing fields, stadium seating, team uniforms, scoreboard displays, or broadcast graphics, among others. The set of attributes can include various parameters such as sport type, league identification, venue classification, broadcast source identification, or game state indicators, among others, that provide contextual information for subsequent search operations. In some implementations, the set of attributes can include at least an identifier of a live event, which can be derived from various visual elements within the image data, such as team names, venue information, date indicators, or matchup graphics displayed during broadcasts.

The method 800 can include transmitting a search request to at least one server (STEP 808). The search request can be transmitted in response to various interactions with a graphical user interface. In some implementations, the search request can include the set of attributes corresponding to the determined context, along with authentication credentials, device identifiers, or user profile information. The search request can identify a search category, such as wager opportunities, fantasy sports contests, or information about live events, among others. The search category can be specified explicitly through user selection of category-specific interface elements or determined implicitly based on the context attributes. The search request can cause the at least one server to map the set of attributes to at least one live event and identify relevant data records and/or lineups/lineup selections according to the search category and the identified live event.

The method 800 can include receiving a set of data records from the at least one server in response to the search category (STEP 810). The set of data records can be selected according to the search category, the live event identified based on the set of attributes, and any additional parameters specified in the search request. In some implementations, the data records can include wager opportunities, fantasy sports contests, live event information, team statistics, or player information, among others, depending on the specified search category. The data records can be received along with content items that provide visual representations of the data records for display via a graphical user interface. In some implementations, the received data records can include metadata such as relevance scores, timestamps, or category information that can be used to organize and present the data records to a user.

The method 800 can include presenting a set of content items representative of the set of data records via the graphical user interface (STEP 812). The content items can be arranged according to relevance scores or rankings provided by the server that executed the search operation. In some implementations, the graphical user interface can be updated to display the content items in a structured format, with each content item presented as a selectable element that can be interacted with to perform additional operations. The content items can include various types of information, such as wager opportunities, fantasy sports contests, live event information, team statistics, or player information, among others, depending on the search category specified in the search request. In some implementations, the graphical user interface can include additional elements such as a selected value indicator that presents information about the search parameters used to generate the search results, a view more button that can be interacted with to display additional content items, or category view buttons that can be used to navigate to different categories of content.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus," "data processing system," "client device," "computing platform," "computing device," or "device" encompass all kinds of apparatuses, devices, and machines for processing data, including by way of example a programmable processor, a computer, a system on a chip, or multiple ones, or combinations, of the foregoing. The apparatus can include special purpose logic circuitry (e.g., an FPGA, an ASIC, etc.). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as the data processing system 205 can include clients and servers. For example, the data processing system 205 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a user interacting with the client device). Data generated at the client device (e.g., a result of an interaction, computation, or any other event or computation) can be received from the client device at the server, and vice versa.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the various computing systems described herein can include a single module, a logic device having one or more processing modules, or one or more servers.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for the various implementations described herein, the systems and methods described herein may be applied to other environments. The foregoing implementations are illustrative rather than limiting of the described systems and methods. The scope of the systems and methods described herein may thus be indicated by the appended claims, rather than the foregoing description, and changes that come within the meaning and range of equivalency of the claims are embraced therein.

What is claimed is:

1. A system, comprising:
one or more processors coupled to non-transitory memory, the one or more processors configured to:
receive image data from a capture device, the image data comprising a plurality of pixels representing an environment;
generate a set of values from the plurality of pixels of the image data, each value of the set of values representative of an attribute or category associated with one of a plurality of live events;
filter the set of values by matching a subset of the set of values to one or more predetermined values;
update a graphical user interface to indicate at least one of the set of values upon determining that a first feature is represented in a set of images captured using the capture device over a predetermined time period;
execute, based on determining that the first feature is represented in the set of images over the predetermined time period, a search operation according to at least one value of the subset of the set of values to generate a set of search results comprising a plurality of content items, each content item of the plurality of content items corresponding to a respective live event of the plurality of live events; and
update the graphical user interface to present at least a subset of the plurality of content items.

2. The system of claim 1, wherein the one or more processors are further configured to generate the set of values by providing at least a subset of the plurality of pixels of the image data as input to a machine-learning model.

3. The system of claim 2, wherein the machine-learning model comprises an optical character recognition model.

4. The system of claim 2, wherein the machine-learning model is an object detection model configured to generate a classification of at least one object represented in the plurality of pixels, wherein at least one of the set of values corresponds to the classification.

5. The system of claim 2, wherein the machine-learning model comprises a multi-modal language model configured to generate at least one token as output using at least the plurality of pixels as input, wherein the set of values is generated based at least on the token.

6. The system of claim 1, wherein the one or more processors are further configured to:
receive an update to the one or more predetermined values from at least one server.

7. The system of claim 1, wherein the one or more processors are further configured to:
detect an interaction with a first graphical element representing a first search result of the set of search results; and
transmit, to at least one server, a request to generate a data record corresponding to the first search result.

8. The system of claim 1, wherein the one or more processors are further configured to update the graphical user interface to present the set of values with the image data captured by the capture device.

9. A method, comprising:

receiving, by one or more processors coupled to non-transitory memory, image data from a capture device, the image data comprising a plurality of pixels representing an environment;

generating, by the one or more processors, a set of values from the plurality of pixels of the image data, each value of the set of values representative of an attribute or category associated with one of a plurality of live events;

filtering, by the one or more processors, the set of values by matching a subset of the set of values to one or more predetermined values;

updating, by the one or more processors, a graphical user interface to indicate at least one of the set of values upon determining that a first feature is represented in a set of images captured using the capture device over a predetermined time period;

executing, based on determining that the first feature is represented in the set of images over the predetermined time period, by the one or more processors, a search operation according to at least one value of the subset of the set of values to generate a set of search results comprising a plurality of content items, each content item of the plurality of content items corresponding to a respective live event of the plurality of live events; and updating, by the one or more processors, the graphical user interface to present at least a subset of the plurality of content items.

10. The method of claim 9, further comprising generating, by the one or more processors, the set of values by providing at least a subset of the plurality of pixels of the image data as input to a machine-learning model.

11. The method of claim 10, wherein the machine-learning model comprises an optical character recognition model.

12. The method of claim 10, wherein the machine-learning model is an object detection model configured to generate a classification of at least one object represented in the plurality of pixels, wherein at least one of the set of values corresponds to the classification.

13. The method of claim 10, wherein the machine-learning model comprises a multi-modal language model configured to generate at least one token as output using at least the plurality of pixels as input, wherein the set of values is generated based at least on the token.

14. The method of claim 9, further comprising receiving, by the one or more processors, an update to the one or more predetermined values from at least one server.

15. The method of claim 9, further comprising:

detecting, by the one or more processors, an interaction with a first graphical element representing a first search result of the set of search results; and transmitting, by the one or more processors, to at least one server, a request to generate a data record corresponding to the first search result.

16. The method of claim 9, further comprising updating, by the one or more processors, the graphical user interface to present the set of values with the image data captured by the capture device.

* * * * *